US010089581B2

(12) United States Patent
Flores et al.

(10) Patent No.: US 10,089,581 B2
(45) Date of Patent: *Oct. 2, 2018

(54) DATA DRIVEN CLASSIFICATION AND DATA QUALITY CHECKING SYSTEM

(71) Applicant: The Boeing Company, Chicago, IL (US)

(72) Inventors: Jaime A. Flores, Auburn, WA (US); Brian Warn, Seattle, WA (US); Danielle C. Young, Bear, DE (US); Patrick N. Harris, Bonney Lake, WA (US)

(73) Assignee: The Boeing Company, Chicago, IL (US)

( * ) Notice: Subject to any disclaimer, the term of this patent is extended or adjusted under 35 U.S.C. 154(b) by 405 days.

This patent is subject to a terminal disclaimer.

(21) Appl. No.: 14/788,750

(22) Filed: Jun. 30, 2015

(65) Prior Publication Data
US 2017/0004413 A1    Jan. 5, 2017

(51) Int. Cl.
*G06N 99/00* (2010.01)
*G06F 17/30* (2006.01)
*G06N 5/04* (2006.01)

(52) U.S. Cl.
CPC ..... *G06N 99/005* (2013.01); *G06F 17/30371* (2013.01); *G06F 17/30598* (2013.01); *G06N 5/04* (2013.01)

(58) Field of Classification Search
CPC .. G06N 99/005; G06N 5/04; G06F 17/30371; G06F 17/30598; G06F 17/3053; G06F 17/2785
See application file for complete search history.

(56) References Cited

U.S. PATENT DOCUMENTS

| 6,446,061 B1* | 9/2002 | Doerre | G06F 17/3071 |
| | | | 707/738 |
| 8,352,488 B2 | 1/2013 | Fleming et al. | |
| 8,527,695 B2 | 9/2013 | Nakamoto et al. | |
| 8,838,490 B2 | 9/2014 | Quadracci et al. | |
| 8,843,347 B2 | 9/2014 | Safa-Bakhsh et al. | |
| 8,886,657 B2 | 11/2014 | Warn | |
| 8,909,609 B2 | 12/2014 | Fleming et al. | |
| 8,935,282 B2 | 1/2015 | Whelan et al. | |
| 9,390,112 B1* | 7/2016 | Daly | G06F 17/30303 |
| 2008/0189260 A1* | 8/2008 | Arnold | G06F 17/30265 |

(Continued)

*Primary Examiner* — Kakali Chaki
*Assistant Examiner* — Ying Yu Chen

(57) ABSTRACT

A computer implemented data driven classification and data quality checking system is provided. The system has an interface application enabled to receive data and has an associative memory software. The system has a data driven associative memory model configured to categorize one or more fields of received data and to analyze the received data. The system has a data quality rating metric associated with the received data. The system has a machine learning data quality checker for the received data, and is configured to add the received data to a pool of neighboring data, if the data quality rating metric is greater than or equal to a data quality rating metric threshold. The machine learning data quality checker is configured to generate and communicate an alert of a potential error in the received data, if the data quality rating metric is less than the data quality rating metric threshold.

20 Claims, 14 Drawing Sheets

(56) References Cited

U.S. PATENT DOCUMENTS

| | | | |
|---|---|---|---|
| 2010/0257006 A1* | 10/2010 | Quadracci | G06N 3/00 |
| | | | 705/7.33 |
| 2013/0067039 A1* | 3/2013 | Hartzler | G06Q 10/10 |
| | | | 709/219 |
| 2013/0279796 A1* | 10/2013 | Kaizerman | G06K 9/033 |
| | | | 382/149 |
| 2015/0032738 A1* | 1/2015 | Nachnani | G06F 17/30554 |
| | | | 707/723 |

* cited by examiner

SEGMENTED PREDICTIVE MODEL 34c
SEGMENTED INTO STAR RATING SYSTEM 44

192

PREDICTIVE MODEL ACCURACY 197

| STARS 48 | CORRECT 194 | INCORRECT 195 | TOTAL 196 | % ACCURACY 197a | % CUMULATIVE ACCURACY 197b |
|---|---|---|---|---|---|
| ***** (5) | 50 | 0 | 50 | 100 | 100 |
| **** (4) | 90 | 10 | 100 | 90 | 93.33333333 |
| *** (3) | 100 | 50 | 150 | 66.666667 | 80 |
| ** (2) | 25 | 75 | 100 | 25 | 66.25 |
| * (1) | 0 | 50 | 50 | 0 | 58.88888889 |
| TOTAL | 265 | 185 | 450 | 58.888889 | |

DATA DRIVEN CLASSIFICATION AND DATA QUALITY CHECKING SYSTEM

CROSS REFERENCE TO RELATED APPLICATION

This nonprovisional patent application is related to contemporaneously filed U.S. nonprovisional patent application Ser. No. 14/788,764, titled DATA DRIVEN CLASSIFICATION AND DATA QUALITY CHECKING METHOD, filed on Jun. 30, 2015, the contents of which are hereby incorporated by reference in its entirety.

BACKGROUND

1) Field of the Disclosure

The disclosure relates generally to machine learning data classification systems and methods, and more particularly, to a computer implemented data driven classification and data quality checking system and method that uses associative memory.

2) Description of Related Art

Data that is high quality, accurate and correctly entered and received into a data driven classification or management system is of great value to numerous industries, since low quality, incorrectly input data having errors can be expensive to fix and difficult to use in making industry or technical data decisions. Data quality errors may occur in data entry systems that require assigning categories to the data, if there are too many categories to choose from. In addition, data quality errors may occur if there is inconsistent training, inconsistent technical background, and inconsistent levels of experience among data entry personnel. Moreover, data quality errors may occur from simple human error due to tiredness or lack of concentration.

Known systems and methods exist for improving data quality and errors. For example, rule-based data standardization systems with coded rules for handling patterns or for handling predetermined lists exist. However, such rule-based systems may not be feasible for complex, machine learned data driven classification and management systems because they may be expensive to maintain and expensive to derive the rules from manually. In addition, handling patterns in pattern-based systems may be laborious and time consuming, particularly for highly specialized data sets.

Thus, it would be advantageous to have a data driven classification and data quality checking system and method that is not a rule-based system or method and that improves the quality, accuracy, and correctness of data entry such as involving users manually labeling or categorizing information.

In addition, data driven classification or management systems, such as machine learning systems, may typically use predictive models or classifiers to predict future behavior or outcomes. A business or industry process may require that a predictive model or classifier reach a minimum level of accuracy. However, most predictive models or classifiers are evaluated at their overall level of accuracy.

Known systems and methods exist that just calculate the overall accuracy of the predictive model or classifier and assume that all the decisions made by the predictive model or classifier are equally difficult. Thus, if a business or industry process requires a high level of accuracy, and if the overall level of accuracy is not met, the predictive model or classifier is unusable until that level is achieved. Attempting to reach the overall level of accuracy may be expensive, difficult, and sometimes unattainable.

Thus, it would be advantageous to have a data driven classification and data quality checking system and method that does not assume that all of the decisions made by the predictive model or classifier are equally difficult and that solves the issue when a business or industry process requires that the accuracy of the predictive model or classifier requires a high level of accuracy.

Further, data driven classification or management systems, such as machine learning systems, typically require classification or scoring of records to be able to present the classified or scored records to downstream systems in a consistent manner. Known systems and methods exist for classification and scoring of records, for example, spreadsheet-based solutions. In such solutions, analysts and other users review entries record-by-record. Such record review approaches may be tedious since every record must be reviewed and scored individually, it may be difficult to easily understand how others have previously scored similar records, it may be difficult for an individual to remain consistent in his or her own scoring decisions for similar records, and it may be difficult to group similar records, particularly, similar records in which no consistent or normalized way exists to identify all similar records in a data set together for scoring. With these drawbacks, a user or analyst may spend most of the workday, where many such records require such scoring, performing the actual scoring tasks. The analyst may not be able to spend much time as a percentage of the workday performing the actual in-depth analysis that generates deep understanding of the underlying issues in order to provide a more complete resolution to a given class of problems.

Thus, it would be advantageous to have a data driven classification and data quality checking system and method that provides the capability to group similar records together to facilitate batch classifying or scoring of the similar records to be able to present the classified or scored records to downstream systems with greater consistency.

Further, data driven classification or management systems, such as machine learning systems, often use free text data as sources of data for input into the system. However, such free text data may need to be "cleaned" and/or normalized into a domain vocabulary that enables downstream systems that utilize free text data to generate more effective results.

Known systems and methods exist for "cleaning" and normalizing free text data, for example, systems and methods that identify terms and phrases, such as city names, geographic place names, aircraft model identifiers, and other terms and phrases, and that also recognize parts of speech, such as nouns, verbs, adjectives, adverbs, conjunctions, and articles. However, such known systems and methods do not recognize abbreviations, domain-specific phrases, regional terms and phrases, without pre-identifying them or applying rules or other data extraction, transformation, and loading techniques to identify these text patterns.

Thus, it would be advantageous to have a data driven classification and data quality checking system and method that provides a simple approach for developing a domain vocabulary from free text data for use in downstream systems.

Moreover, data driven classification or management systems, such as machine learning systems, may use an associative memory system using artificial intelligence, a neural network, fuzzy logic, and/or other suitable technologies capable of forming associations between pieces of data and then retrieving different pieces of data based on the associations. The different pieces of data in the associative memory system may come from various sources of data.

Where industries employ associative memory approaches to perform data classification, it is desirable to develop a control set for the associative memory records or instances the industry uses. Known systems and methods exist for developing a control set for use with an associative memory, for example, developing a control set consisting of a random selection of a specified percent of records. However, such control set does not typically cover the diversity of records necessary for the associative memory to perform well over an unscored data set. In addition, many of the selected records may be very similar, which may result in the associative memory inaccurately scoring the records with few or no neighbors or low similarity of the records.

Another known method for developing a control set for an associative memory involves searching for keywords and adding a sampling of those records to the control set in an interactive fashion to educate the associative memory on one group of components at a time. However, such known method may be slow, inaccurate, and difficult to calculate the total effort required.

Thus, it would be advantageous to have a data driven classification and data quality checking system and method with a control set for an associative memory that has a desired and required diversity, accuracy and size, and that facilitates the associative memory in accurately scoring additional and future records.

Accordingly, there is a need in the art for a data driven classification and data quality checking system and method that have improved accuracy and quality, are reliable and efficient, and that provide advantages over known systems and methods.

SUMMARY

Example implementations of this disclosure provide a data driven classification and data quality checking system and method that have improved accuracy and quality, and are reliable and efficient. As discussed in the below detailed description, embodiments of the data driven classification and data quality checking system and method may provide significant advantages over existing systems and methods.

In one exemplary embodiment there is provided a computer implemented data driven classification and data quality checking system. The computer implemented data driven classification and data quality checking system comprises an interface application enabled to receive data. The computer implemented data driven classification and data quality checking system further comprises an associative memory software in communication with the interface application.

The computer implemented data driven classification and data quality checking system further comprises a data driven associative memory model learned using the associative memory software. The data driven associative memory model is configured to categorize one or more fields of the received data and is configured to analyze the received data.

The computer implemented data driven classification and data quality checking system further comprises a data quality rating metric associated with the received data and calculated by the data driven associative memory model, by comparing the received data with a pool of neighboring data in the category of field of the received data. The computer implemented data driven classification and data quality checking system further comprises a machine learning data quality checker for the received data, enabled by the data driven associative memory model, and coupled to the interface application.

The machine learning data quality checker is configured to add the received data to the pool of neighboring data, if the data quality rating metric is greater than or equal to a data quality rating metric threshold. The machine learning data quality checker is configured to generate and communicate, via the interface application, an alert of a potential error in the received data in the category of field of the received data, if the data quality rating metric is less than the data quality rating metric threshold.

In another embodiment there is provided a computer implemented data driven classification and data quality checking system comprising an interface application enabled to receive data, and an associative memory software in communication with the interface application, and incorporating an associative memory and a machine learning algorithm. The computer implemented data driven classification and data quality checking system further comprises a predictive model learned using the associative memory, and configured to predict a model predicted classification for a classification of an instance of received data and configured to make predictive model decisions.

The computer implemented data driven classification and data quality checking system further comprises a prediction quality rating metric calculated by the predictive model to include measurements of a strength and an assurance that establish a correctness of the model predicted classification. If the prediction quality rating metric is greater than or equal to a prediction quality rating metric threshold, then the model predicted classification is accepted and applied. If the prediction quality rating metric is less than the prediction quality rating metric threshold, then the model predicted classification is rejected.

In another embodiment there is provided a computer implemented data driven classification and data quality checking system comprising a computer system having one or more computers coupled to and enabling operation of an interface application coupled to an associative memory software. The interface application is enabled to receive data. The associative memory software incorporates an associative memory and a machine learning algorithm enabled to identify patterns of similarities in the received data.

The computer implemented data driven classification and data quality checking system further comprises a domain vocabulary processing tool in communication with the interface application and coupled to the associative memory of the associative memory software. The domain vocabulary processing tool is configured to extract relevant domain-specific terms and domain-specific phrases, and their respective variant terms and variant phrases, from a remaining free text data or a remaining source text, which have been parsed. The domain vocabulary processing tool is further configured to normalize the domain-specific terms and the domain-specific phrases, and their respective variant terms and variant phrases, into canonical designations and corresponding variants for input into the associative memory.

The computer implemented data driven classification and data quality checking system further comprises a control set in communication with the interface application and coupled to the associative memory of the associative memory software. The control set comprises a diverse data set and is configured to classify new data sets. The diverse data set comprises a plurality of predefined data from a plurality of relevant categories generated by the associative memory, and a plurality of nonassociated data not associated with the relevant categories, defining a canonical phrase data set representative of canonical phrases associated with the associative memory.

The computer implemented data driven classification and data quality checking system further comprise a data driven associative memory model learned using the associative memory software and configured to categorize one or more fields of the received data. The data driven associative memory model comprises a predictive model configured to predict a model predicted classification for a classification of an instance of the received data.

The computer implemented data driven classification and data quality checking system further comprises one or more quality rating metrics. One quality rating metric includes a data quality rating metric calculated by the data driven associative memory model, as a function of comparing the received data with a pool of neighboring data in the category of field of the received data. Another quality rating metric includes a prediction quality rating metric calculated by the predictive model to include measurements of a strength and an assurance that establish a correctness of the model predicted classification.

The computer implemented data driven classification and data quality checking system further comprises a machine learning data quality checker for the received data, enabled by the data driven associative memory model and coupled to the interface application. The machine learning data quality checker is configured to accept and add the received data to the pool of neighboring data, if the data quality rating metric is greater than or equal to a data quality rating metric threshold. The machine learning data quality checker is further configured to accept and apply the model predicted classification, if the correctness of the model predicted classification is established, and if the prediction quality rating metric is greater than or equal to a prediction quality rating metric threshold.

The machine learning data quality checker is further configured to generate and communicate, via the interface application, an alert of a potential error in the received data in the category of field of the received data, if the data quality rating metric is less than the data quality rating metric threshold. The machine learning data quality checker is further configured to generate and communicate, via the interface application, an alert of a classification potential error in the classification of the instance of the received data, if the correctness of the model predicted classification is not established, or if the prediction quality rating metric is less than the prediction quality rating metric threshold.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 3 is a table showing an example of a segmented predictive model segmented into star rating accuracy levels of a star rating system that may be included in one or more embodiments of the computer implemented data driven classification and data quality checking system of the disclosure;

Each figure shown in this disclosure shows a variation of an aspect of the embodiments presented, and only differences will be discussed in detail.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and fully convey the scope of the disclosure to those skilled in the art.

Figure 1A:
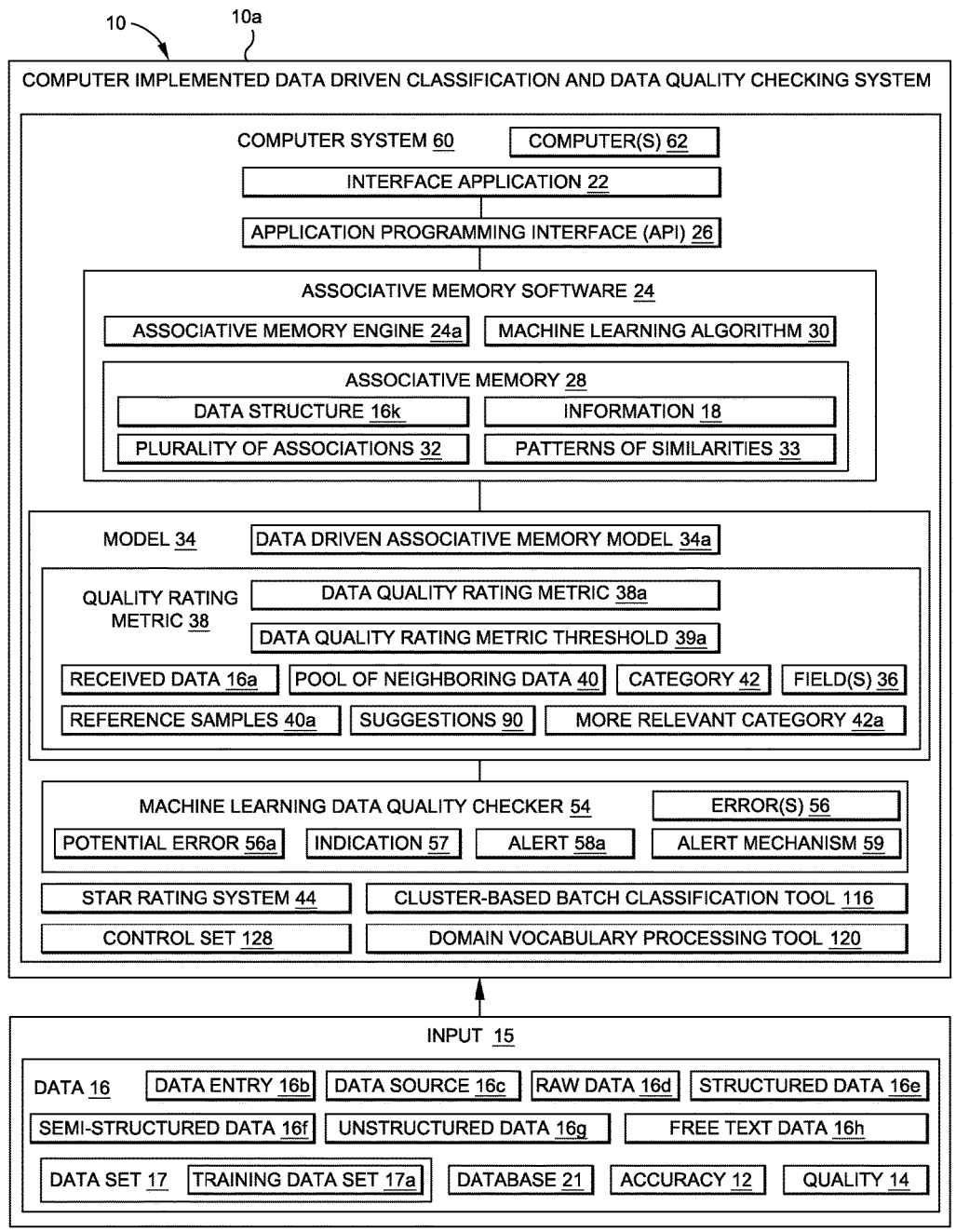
FIG. 1A is an illustration of a functional block diagram showing an exemplary embodiment of a computer implemented data driven classification and data quality checking system of the disclosure with an embodiment of a quality rating metric.

Now referring to the Figures, FIG. 1A is an illustration of a functional block diagram showing an exemplary embodiment of a computer implemented data driven classification and data quality checking system 10, such as in the form of computer implemented data driven classification and data quality checking system 10a, of the disclosure, with an embodiment of a quality rating metric 38, such as in the form of a data quality rating metric 38a.

As shown in FIG. 1A, the computer implemented data driven classification and data quality checking system 10 comprises an interface application 22 enabled to receive data 16. The computer implemented data driven classification and data quality checking system 10 is preferably configured to improve accuracy 12 and quality 14 of an input 15 of data 16. The data 16 (see FIG. 1A) is preferably input and received into the computer implemented data driven classification and data quality checking system 10 (see FIG. 1A) as received data 16a (see FIG. 1A), or data entry 16b (see FIG. 1A). The data 16 (see FIG. 1A) may be input manually by a user, may be input automatically by one or more separate automated systems, automated computer programs, or automated devices, or may be input via another suitable program or system.

As the data 16 (see FIG. 1A) is input into the computer implemented data driven classification and data quality checking system 10 (see FIG. 1A), and once the data 16 (see FIG. 1A) is input and received, the data 16 (see FIG. 1A) is referred to herein as received data 16a or data entry 16b (see FIG. 1A). The data 16 (see FIG. 1A) may be obtained from a data source 16c (see FIG. 1A) that provides a source of the data 16 (see FIG. 1A). The data source 16c (see FIG. 1A) may comprise one or more databases 21 (see FIG. 1A), a computer file, a table, a spreadsheet, a report, a slide presentation, a data stream, an image, a video, an array, a tree, a log, or other suitable data sources of primarily digitized data. The one or more databases 21 (see FIG. 1A) may comprise database programs, database engines, desktop databases, server databases, SQL (Structured Query Language) databases, or other suitable databases or directories. Examples of databases 21 (see FIG. 1A) that may be used in the computer implemented data driven classification and data quality checking system 10 may include a records database or a parts management database, such as an aircraft parts management database.

As shown in FIG. 1A, the data 16 may comprise at least one of raw data 16d, structured data 16e, semi-structured data 16f, unstructured data 16g, free text data 16h, or another suitable type of data 16. Raw data 16d (see FIG. 1A) comprises data 16 (see FIG. 1A) that has not been subjected to processing or any other manipulation. Structured data 16e (see FIG. 1A) comprises data 16 (see FIG. 1A) that resides in a fixed field within a record or a computer file, for example, data 16 (see FIG. 1A) contained in spreadsheets. Semi-structured data 16f (see FIG. 1A) comprises a type of structured data 16e (see FIG. 1A) where the data 16 (see FIG. 1A) does not have a rigid structure, for example, with semi-structured data 16f (see FIG. 1A), tags or other types of markers may be used to identify certain elements within the data 16 (see FIG. 1A). Unstructured data 16g (see FIG. 1A) comprises data 16 (see FIG. 1A) that is not organized in a predefined manner, such as in a database 21 (see FIG. 1A) or some other type of data structure, for example, documents, word processing documents, journals, books, records, images, files, audio, video, web pages, metadata, blog entries, and other data in an unstructured form. Free text data 16h (see FIG. 1A) comprises alphanumeric data that is unstructured and in a free form, for example, the body of an email message.

Figure 2:
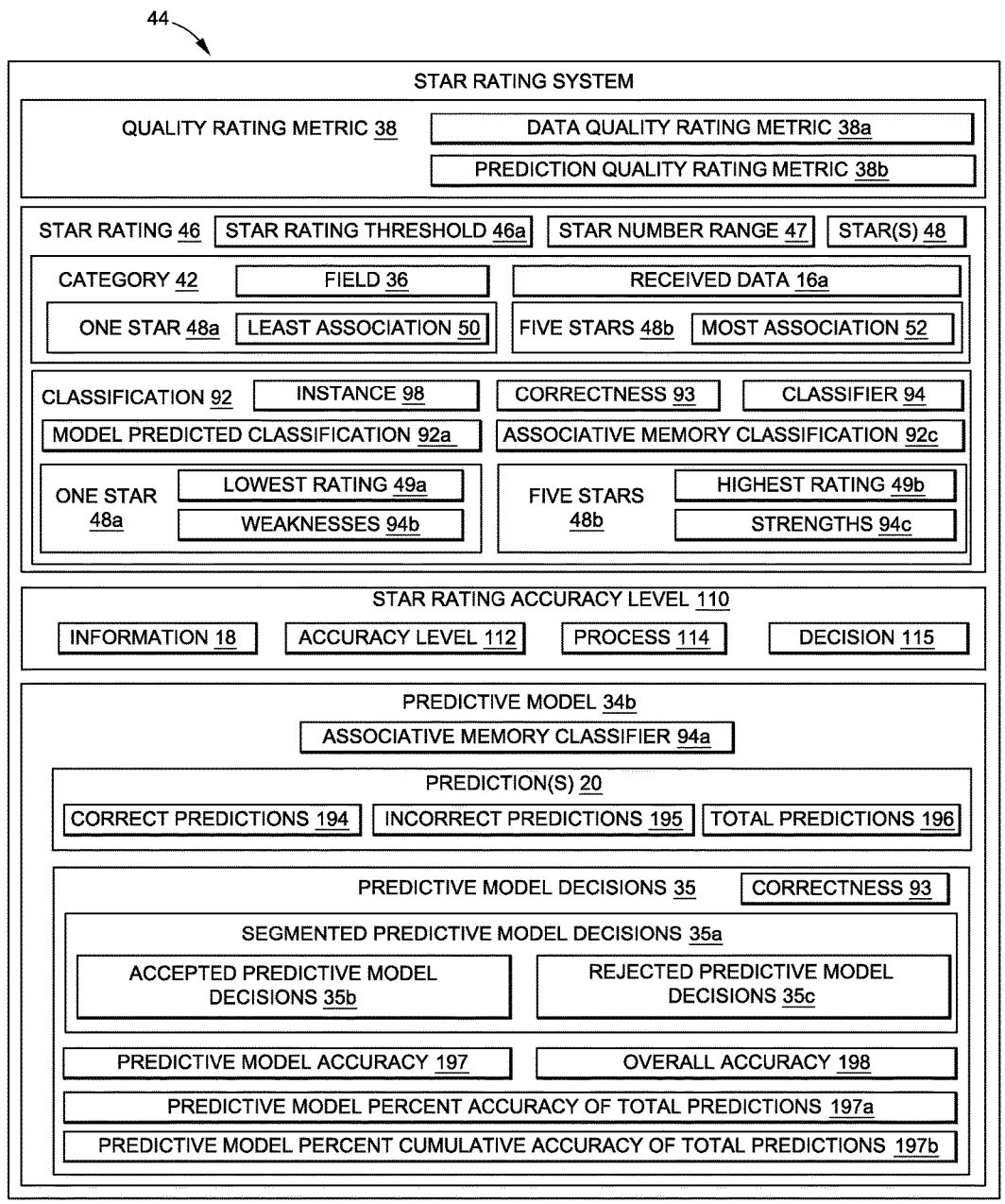
FIG. 2 is an illustration of a functional block diagram showing an exemplary embodiment of a star rating system that may be included in one or more embodiments of the computer implemented data driven classification and data quality checking system of the disclosure.

The data 16 (see FIG. 1A) is collected and analyzed to create information 18 (see FIG. 1A), such as information suitable for making decisions 115 (see FIG. 2). Data 16 (see FIG. 1A) may be distinguished from knowledge, which is derived from extensive amounts of experience dealing with information on a subject.

The data 16 (see FIG. 1A) may be collected and organized in a specific way and referred to as a data set 17 (see FIG. 1A). A type of data set 17 (see FIG. 1A) that may be used in the computer implemented data driven classification and data quality checking system 10 (see FIG. 1A) includes a training data set 17a (see FIG. 1A). The training data set 17a (see FIG. 1A) disclosed herein comprises a set of data 16 (see FIG. 1A) containing one or more instances 98 (see FIG. 1B) or observations 97 (see FIG. 1B) whose category 42 (see FIG. 1A) membership is known or preidentified and that may be used to build and train or learn a model 34 (see FIG. 1A), such as a data driven associative memory model 34a (see FIG. 1A).

As shown in FIG. 1A, the computer implemented data driven classification and data quality checking system 10 comprises the interface application 22 enabled to receive the data 16, such as in the form of received data 16a, or data entry 16b, where the interface application 22 is preferably operable via a computer system 60 having one or more computers 62. The interface application 22 (see FIG. 1A) preferably comprises a computer software program or program code configured for use in the computer implemented data driven classification and data quality checking system 10 (see FIG. 1A). The interface application 22 (see FIG. 1A) may comprise hardware, software instructions, one or more algorithms, or a combination thereof. When executed by a computer 62 (see FIGS. 1A, 8) in the computer system 60 (see FIGS. 1A, 8), the interface application 22 (see FIG. 1A) is configured to operably receive the input 15 (see FIG. 1A) of data 16 (see FIG. 1A), such as in the form of received data 16a (see FIG. 1A), or data entry 16b (see FIG. 1A).

Figure 1B:
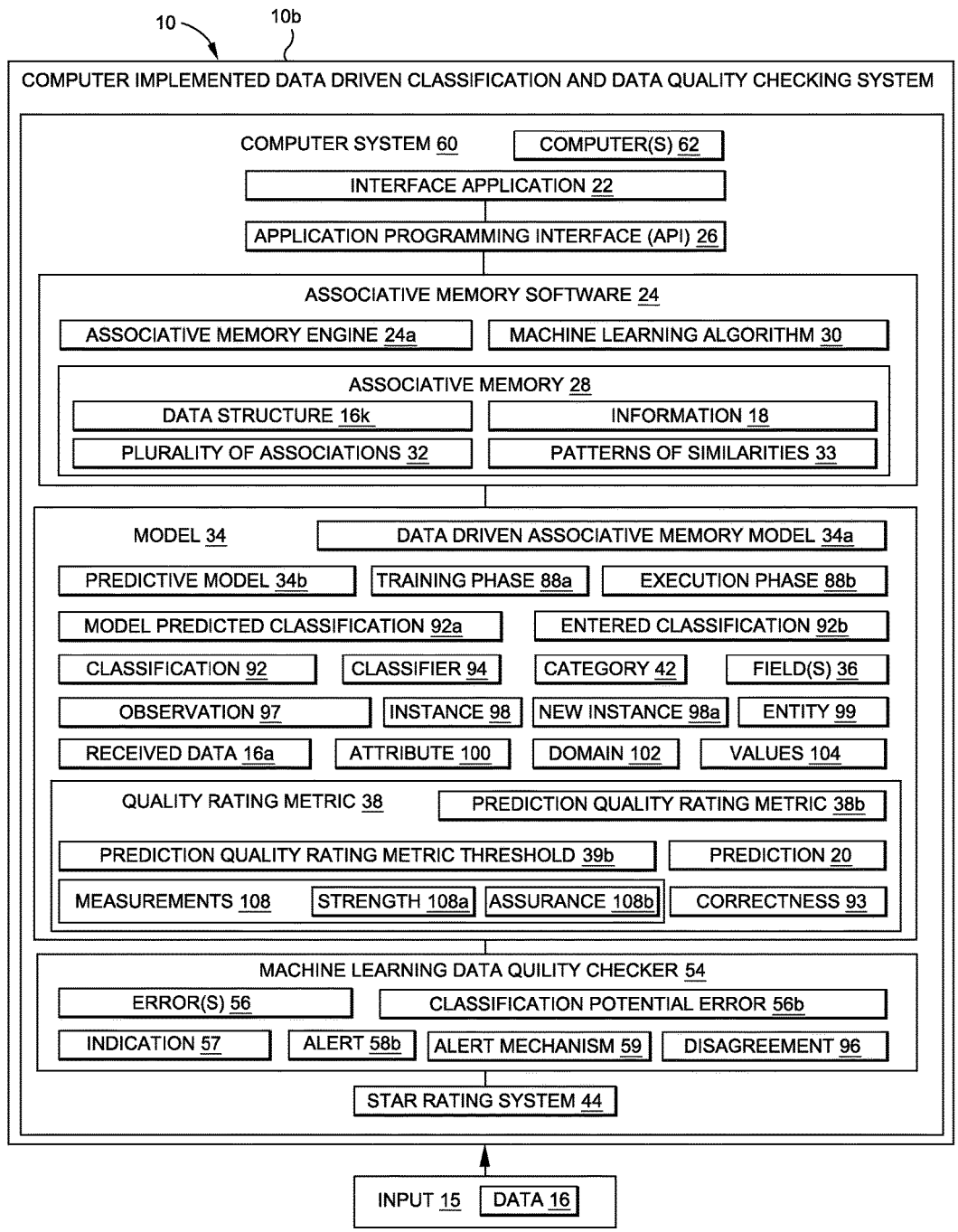
FIG. 1B is an illustration of a functional block diagram showing an exemplary embodiment of a computer implemented data driven classification and data quality checking system of the disclosure with another embodiment of a quality rating metric.
Figure 1C:
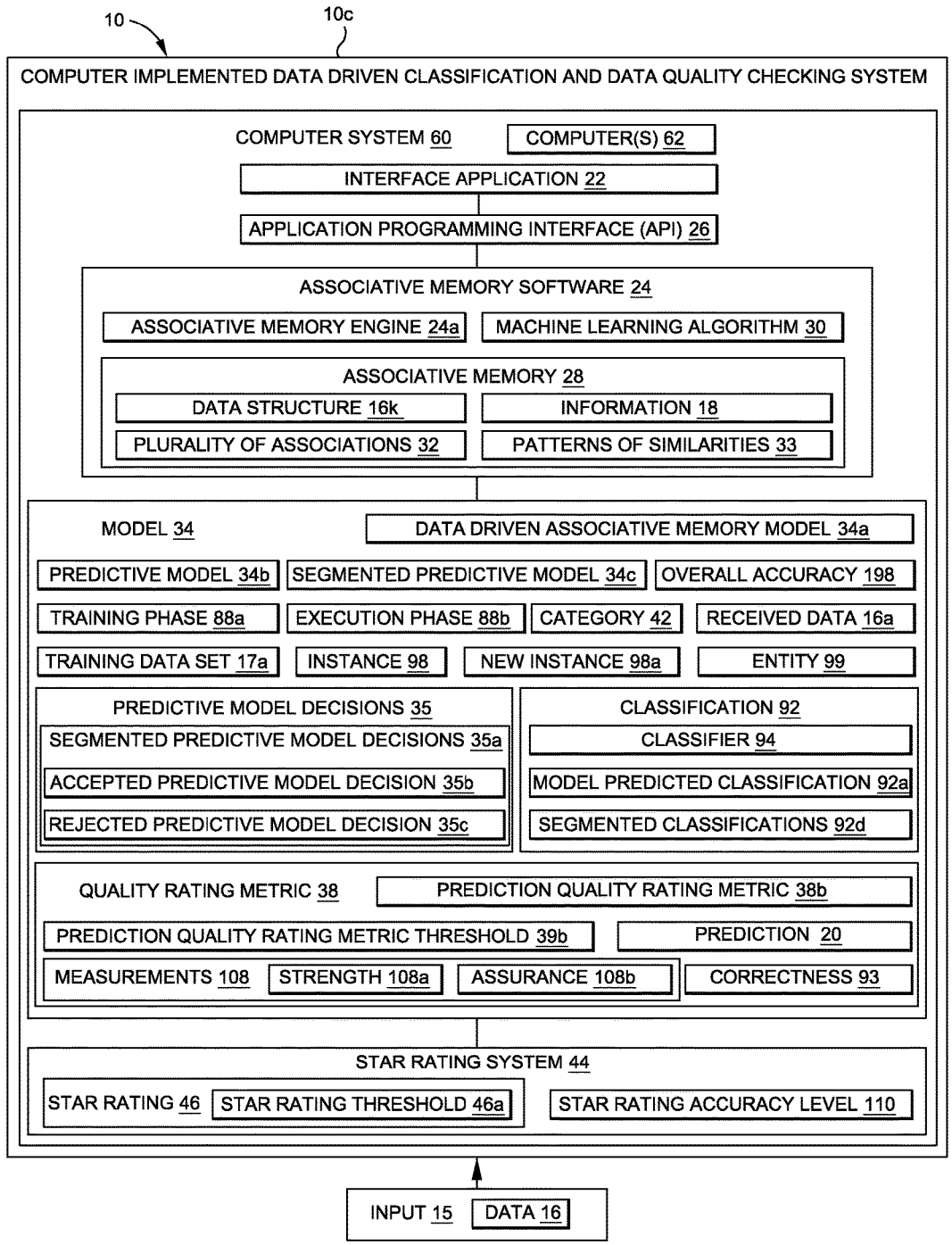
FIG. 1C is an illustration of a functional block diagram showing an exemplary embodiment of a computer implemented data driven classification and data quality checking system of the disclosure with a segmented predictive model.

The interface application 22 (see FIG. 1A) may comprise one or more of a graphical user interface (GUI) that allows interaction with the computer implemented data driven classification and data quality checking system 10 (see FIGS. 1A-1C) through graphical icons and visual indicators, a menu-driven interface, a command line interface, an alphanumeric keyboard and mouse, a touch screen, a voice recognition system, or any other system for entering the input 15 (see FIG. 1A) into the computer 62 (see FIG. 1A) of the computer implemented data driven classification and data quality checking system 10 (see FIGS. 1A-1C).

As shown in FIG. 1A, the computer implemented data driven classification and data quality checking system 10 further comprises an associative memory software 24, also referred to as an associative memory engine 24a, in communication with the interface application 22. The associative memory software 24 (see FIG. 1A) may use an application programming interface (API) 26 (see FIG. 1A), or another suitable interface connection, to connect to the interface application 22 (see FIG. 1A). An example of the application programming interface (API) 26 (see FIG. 1A) that may be used may include a JAVA application programming interface (API) computer program obtained from Oracle America, Inc. of Redwood Shores, Calif. (JAVA is a registered trademark of Oracle America, Inc. of Redwood Shores, Calif.) However, other suitable application programming interfaces may also be used.

As shown in FIG. 1A, the associative memory software 24 comprises or incorporates an associative memory 28 and a machine learning algorithm 30 enabled to identify a plurality of associations 32, such as patterns of similarities 33, in the received data 16a. The associative memory software 24 (see FIG. 1A) with its associative memory 28 (see FIG. 1A) is of a nonparametric type.

As used herein, "associative memory" means a collection of data 16 (see FIG. 1A) organized into a data structure 16k (see FIG. 1A), such that a plurality of associations 32 (see FIG. 1A) are created based upon the underlying system configuration between one element of data 16 (see FIG. 1A) and hundreds, thousands, or more other elements of data 16 (see FIG. 1A) present in the data structure 16k (see FIG. 1A), and architected to rapidly return large amounts of data 16 (see FIG. 1A) for review, for example, review by a user or one or more separate automated systems, automated computer programs, automated devices, or another suitable separate system or program. The interface application 22 (see FIG. 1A) preferably resides above the associative memory 28 (see FIG. 1A) enabling review and analysis of a large volume of results returned by the associative memory 28 (see FIG. 1A).

The associative memory 28 (see FIGS. 1A-1C) may be built using data 16 (see FIG. 1A) or information 18 (see FIG. 1A) stored in any number of data sources 16c (see FIG. 1A) and databases 21 (see FIG. 1A). In particular, the associative memory 28 (see FIG. 1A) is configured to ingest the data 16 (see FIG. 1A) stored in these various data sources 16c (see FIG. 1A) and databases 21 (see FIG. 1A). As used herein, the term "ingest" means an associative memory 28 (see FIG. 1A) incorporating new data 16 (see FIG. 1A) into existing data, i.e., received data 16a (see FIG. 1A), present in the associative memory 28 (see FIG. 1A) and then forming the plurality of associations 32 (see FIG. 1A) within the newly ingested data and/or between the newly ingested data and the previously ingested data, and the term "ingest" can also include reincorporating the previously ingested data in order to form new relationships among the previously ingested data.

An example of an associative memory software 24 (see FIG. 1A) that may be used in the computer implemented data driven classification and data quality checking system 10 (see FIGS. 1A-1C), method 200 (see FIG. 9), method 250 (see FIG. 10), and method 270 (see FIG. 11) disclosed herein may include SAFFRON associative memory software program obtained from Saffron Technology, Inc. of Cary, N.C. However, any type of computer software, computer program, or program code that has processes for analyzing data and using memory models and/or associative memory to come to conclusions or results may be implemented in accordance with the illustrative embodiments.

The computer implemented data driven classification and data quality checking system 10 (see FIGS. 1A-1C) with its associative memory 28 (see FIG. 1A) is preferably an interactive, machine learning, artificial intelligence system. The artificial intelligence implemented in the associative memory 28 (see FIGS. 1A-1C) of the computer implemented data driven classification and data quality checking system 10 (see FIG. 1A) may include a process having iterative development or learning, such as computational intelligence, for example, neural networks, fuzzy logic systems, and evolutionary computation systems.

As shown in FIG. 1A, the computer implemented data driven classification and data quality checking system 10 further comprises a model 34, such as a data driven associative memory model 34a, that may be learned or trained using the associative memory software 24. The model 34 (see FIG. 1A), such as the data driven associative memory model 34a (see FIG. 1A), is preferably configured to categorize one or more fields 36 (see FIG. 1A) of the received data 16a (see FIG. 1A), or data entry 16b (see FIG. 1A), and is further configured to analyze the received data 16a, or data entry 16b (see FIG. 1A).

As shown in FIG. 1A, the computer implemented data driven classification and data quality checking system 10 further comprises one or more quality rating metrics 38. In one embodiment, the quality rating metric 38 (see FIG. 1A) comprises a data quality rating metric 38a (see FIG. 1A) associated with the received data 16a (see FIG. 1A) and calculated by the model 34 (see FIG. 1A), such as the data driven associative memory model 34a (see FIG. 1A), by comparing the received data 16a (see FIG. 1A) with a pool of neighboring data 40 (see FIG. 1A) in the category 42 (see FIG. 1A) of field 36 (see FIG. 1A) of the received data 16a (see FIG. 1A). In another embodiment, discussed in further detail below, the quality rating metric 38 (see FIG. 1B) comprises a prediction quality rating metric 38b (see FIG. 1B) associated with correctness 93 (see FIG. 1B) of a model predicted classification 92a (see FIG. 1B), by the model 34 (see FIG. 1B), such as the data driven associative memory model 34a (see FIG. 1A), in the form of a predictive model 34b (see FIG. 1B).

As shown in FIG. 1A, the computer implemented data driven classification and data quality checking system 10 further comprises a machine learning data quality checker 54 for the received data 16a, enabled by the model 34, such as the data driven associative memory model 34a, and coupled to the interface application 22 (see FIG. 1A). The machine learning data quality checker 54 (see FIG. 1A) is preferably configured to accept the received data 16a (see FIG. 1A) (or the data entry 16b (see FIG. 1A)), and add the received data 16a (see FIG. 1A) to the pool of neighboring data 40 (see FIG. 1A), if the data quality rating metric 38a (see FIG. 1A) is greater than or equal to a data quality rating metric threshold 39a (see FIG. 1A).

The machine learning data quality checker 54 (see FIG. 1A) is further configured to solve one or more errors 56 (see FIG. 1A) in accuracy 12 (see FIG. 1A) or quality 14 (see FIG. 1A) of the received data 16a (see FIG. 1A), to prevent a potential error 56a (see FIG. 1A) in the received data 16a (see FIG. 1A), and/or to prevent a classification potential error 56b (see FIG. 1B) in a classification 92 (see FIG. 1B). For example, the machine learning data quality checker 54 (see FIG. 1A) is preferably further configured to generate and communicate via the interface application 22 (see FIG. 1A), an indication 57 (see FIG. 1A), such as an alert 58a (see FIG. 1A), of a potential error 56a (see FIG. 1A) in the received data 16a (see FIG. 1A) in the category 42 (see FIG. 1A) of field 36 (see FIG. 1A) of the received data 16a (see FIG. 1A), if the data quality rating metric 38a (see FIG. 1A) is less than the data quality rating metric threshold 39a (see FIG. 1A). The indication 57 (see FIG. 1A), such as the alert 58a (see FIG. 1A), may be generated via an alert mechanism 59 (see FIG. 1A), such as in the form of a signal, a display, a textual or graphical warning, or some other suitable alert mechanism.

As used herein, the "data quality rating metric threshold" means a predefined data quality rating metric 38a (see FIG. 1A) below which, the machine learning data quality checker 54 (see FIG. 1A) generates and communicates via the interface application 22 (see FIG. 1A), an indication 57 (see FIG. 1A), such as an alert 58a (see FIG. 1A), of a potential error 56a (see FIG. 1A) in the received data 16a (see FIG. 1A) in the category 42 (see FIG. 1A) of field 36 (see FIG. 1A) of the received data 16a (see FIG. 1A), and greater than or equal to, or above which, the machine learning data quality checker 54 (see FIG. 1A) accepts the received data 16a (see FIG. 1A), and adds and applies the received data 16a (see FIG. 1A) to the pool of neighboring data 40 (see FIG. 1A).

When the machine learning data quality checker 54 (see FIG. 1A) generates and communicates via the interface application 22 (see FIG. 1A), the indication 57 (see FIG. 1A), such as the alert 58a (see FIG. 1A), of the potential error 56a (see FIG. 1A) in the received data 16a (see FIG. 1A) in the category 42 (see FIG. 1A) of field 36 (see FIG. 1A) of the received data 16a (see FIG. 1A), the model 34 (see FIG. 1A), such as the data driven associative memory model 34a (see FIG. 1A), may optionally provide via the interface application 22 (see FIG. 1A) reference samples 40a (see FIG. 1A) of the pool of neighboring data 40 (see FIG. 1A) and suggestions 90 (see FIG. 1A) of a more relevant category 42a (see FIG. 1A) of the field 36 (see FIG. 1A) of the received data 16a (see FIG. 1A).

The computer implemented data driven classification and data quality checking system 10 (see FIG. 1A) may solve errors 56 (see FIG. 1A) in quality 14 (see FIG. 1A) of the data 16 (see FIG. 1A), for example, such as involving users manually labeling or categorizing data 16 (see FIG. 1A), may provide evidence of the potential error 56a (see FIG. 1A) in the received data 16a (see FIG. 1A), may provide evidence of the classification potential error 56b (see FIG. 1B) in the classification 92 (see FIG. 1B), may provide evidence of a disagreement 96 (see FIG. 1B) between a model predicted classification 92a (see FIG. 1B) and an entered classification 92b (see FIG. 1B), or may provide evidence of conflicts in the received data 16a (see FIG. 1A), and may suggest a more suitable category 42 (see FIG. 1A). Thus, the computer implemented data driven classification and data quality checking system 10 (see FIG. 1A) can improve the accuracy 12 (see FIG. 1A) of the received data 16a (see FIG. 1A) and the quality 14 (see FIG. 1A) of the received data 16a (see FIG. 1A).

As further shown in FIG. 1A, the computer implemented data driven classification and data quality checking system 10 may include a star rating system 44. The model 34 (see FIG. 1A), such as the data driven associative memory model 34a (see FIG. 1A), may normalize or transform the quality rating metric 38 (see FIG. 1A), such as the data quality rating metric 38a (see FIG. 1A), to the star rating system 44 (see FIGS. 1B, 2) having one or more star ratings 46 (see FIG. 2). This normalization of the data quality rating metric 38a (see FIG. 1A) is discussed in more detail below in connection with FIG. 2.

As further shown in FIG. 1A, the computer implemented data driven classification and data quality checking system 10 may further include one or more of, a cluster-based batch classification tool 116, a domain vocabulary processing tool 120, and a control set 128, all discussed in more detail below.

Now referring to FIG. 1B, there is provided the computer implemented data driven classification and data quality checking system 10, such as in the form of computer implemented data driven classification and data quality checking system 10b, having another embodiment of the quality rating metric 38, such as in the form of a prediction quality rating metric 38b. FIG. 1B is an illustration of a functional block diagram showing an exemplary embodiment of the computer implemented data driven classification and data quality checking system 10 of the disclosure with another embodiment of the quality rating metric 38, such as in the form of the prediction quality rating metric 38b.

As shown in FIG. 1B, the computer implemented data driven classification and data quality checking system 10 comprises the interface application 22 executed by one or more computers 62 in the computer system 60, the application programming interface (API) 26, and the associative memory software 24 (or associative memory engine 24a) incorporating the associative memory 28 and the machine learning algorithm 30. As discussed above, the associative memory 28 (see FIG. 1B) and the machine learning algorithm 30 (see FIG. 1B) are enabled to identify the plurality of associations 32 (see FIG. 1B), such as patterns of similarities 33 (see FIG. 1B), in the received data 16a (see FIG. 1B), and the associative memory 28 (see FIG. 1B) comprises a collection of data 16 (see FIG. 1B) or received data 16a (see FIG. 1B), or information 18 (see FIG. 1B), organized into the data structure 16k (see FIG. 1B). As shown in FIG. 1B, the input 15 of the data 16 is input into, and received by, the computer implemented data driven classification and data quality checking system 10.

The computer implemented data driven classification and data quality checking system 10 (see FIG. 1B) may be used to enter and predict a classification 92 (see FIG. 1B) of a category 42 (see FIG. 1B). As used herein, "classification", also referred to as "data classification" or "categorization", means the ability to identify which of a set of categories (or sub-populations) or group of objects (entity) a new observation or instance belongs to, and comparing it against a training data set containing instances or observations whose category membership is known or that contains preidentified characteristics. The preidentified characteristics or instances or observations whose category membership is known are used to train a model or a system, so the new observation or instance either identifies with one set or the other.

For example, with an email system, the computer implemented data driven classification and data quality checking system 10 (see FIG. 1B) may classify incoming email (i.e., a new observation) as either "retained" or "junk" email based on certain characteristics. The preidentified characteristics that make up each category (i.e., "retained" or "junk") are already known. For example, retained email typically comes from a recognized sender. Depending on the number of common matches, the computer implemented data driven classification and data quality checking system 10 (see FIG. 1B) will determine where to place the incoming email. In the terminology of machine learning, a classification system is considered an example of supervised learning, i.e., learning where a training data set of correctly-identified observations is available.

As used herein, "instance" 98 (see FIG. 1B) means a single example of data 16 (see FIG. 1B) or received data 16a (see FIG. 1B), or observation 97 (see FIG. 1B) of data 16 (see FIG. 1B) or received data 16a (see FIG. 1B), from which the model 34 (see FIG. 1B) is learned, or on which the model 34 (see FIG. 1B) is used for a prediction 20 (see FIG. 1B). Multiple occurrences of an instance 98 (see FIG. 1B) or all instances of a group of similar objects or concepts is an "entity" 99 (see FIG. 1B). For example, an entity 99 (see FIG. 1B) may comprise a physical object, an event, a concept, either concrete or abstract, such as persons and places, or some combination thereof, and entities are typically the principal data object about which data 16 (see FIG. 1B) is to be collected.

An aspect of an instance 98 (see FIG. 1B) is an "attribute" 100 (see FIG. 1B). The attribute 100 (see FIG. 1B) may comprise a characteristic, property or another type of factor for an object or entity 99 (see FIG. 1B). Examples of attributes 100 (see FIG. 1B) include specific words, symbols, values, abbreviations, and attribute patterns of an object or entity 99 (see FIG. 1B). A field 36 (see FIG. 1A) is synonymous with an attribute 100 (see FIG. 1B). The attribute 100 (see FIG. 1B) has a "domain" 102 (see FIG. 1B) defined by the attribute type, which denotes a plurality of "values" 104 (see FIG. 1B) taken by the attribute 100 (see FIG. 1B).

The classification 92 (see FIG. 1B) is preferably implemented by a classifier 94 (see FIG. 1B). The classifier 94 (see FIG. 1B) may comprise an algorithm, a model, such as model 34 (see FIG. 1B), or suitable instructions or functions that implement the classification 92 (see FIG. 1B).

As shown in FIG. 1B, the computer implemented data driven classification and data quality checking system 10 further comprises the model 34, such as the data driven associative memory model 34a, that may be learned or trained using the associative memory software 24. The model 34 (see FIG. 1B), such as the data driven associative memory model 34a (see FIG. 1B), may be in the form of a predictive model 34b (see FIG. 1B) that may be learned or trained using the associative memory software 24, and with a training phase 88a (see FIG. 1B), and an execution phase 88b (see FIG. 1B) or test phase.

During the training phase 88a (see FIG. 1B), an instance 98 (see FIG. 1B), such as a new instance 98a (see FIG. 1B), or an entity 99 (see FIG. 1B), such as an email, is received by the computer implemented data driven classification and data quality checking system 10 (see FIG. 1B), and is assigned a classification 92 (see FIG. 1B) or a category 42 (see FIG. 1B). Based on the received data 16a (see FIG. 1B) contained in the instance 98 (see FIG. 1B), such as the new instance 98a (see FIG. 1B), or in the entity 99 (see FIG. 1B), such as the email, the model 34 (see FIG. 1B), such as the data driven associative memory model 34a (see FIG. 1B), is configured to predict a model predicted classification 92a (see FIG. 1B) for the instance 98 (see FIG. 1B), such as the new instance 98a (see FIG. 1B), or the entity 99 (see FIG. 1B), such as the email, of the received data 16a (see FIG. 1B). Preferably, the data driven associative memory model 34a predicts the model predicted classification 92a for the classification 92 of the instance 98 of the received data 16a.

Next, in the training phase 88a (see FIG. 1B), the model 34 (see FIG. 1B), such as the data driven associative memory model 34a (see FIG. 1B), in the form of a predictive model 34b (see FIG. 1B), calculates the quality rating metric 38 (see FIG. 1B), such as in the form of a prediction quality rating metric 38b (see FIG. 1B). The prediction quality rating metric 38b (see FIG. 1B) calculated by the predictive model 34b (see FIG. 1B) includes measurements 108 (see FIG. 1B) of a strength 108a (see FIG. 1B) and an assurance 108b (see FIG. 1B) that establish a correctness 93 (see FIG. 1B) of the model predicted classification 92a (see FIG. 1B).

Next, in the training phase 88a (see FIG. 1B), the model 34 (see FIG. 1B), such as the data driven associative memory model 34a (see FIG. 1B), in the form of predictive model 34b (see FIG. 1B), normalizes or transforms the quality rating metric 38 (see FIG. 1B), such as in the form of the prediction quality rating metric 38b (see FIG. 1B), associated with the model predicted classification 92a (see FIG. 1B), to the star rating system 44 (see FIGS. 1B, 2) having one or more star ratings 46 (see FIG. 2). This normalization of the quality rating metric 38 (see FIG. 1B), such as in the form of the prediction quality rating metric 38b (see FIG. 1B), is discussed in more detail below in connection with FIG. 2.

As shown in FIG. 1B, the computer implemented data driven classification and data quality checking system 10 further comprises the machine learning data quality checker 54 for the received data 16a, enabled by the model 34, such as the data driven associative memory model 34a, in the form of predictive model 34b (see FIG. 1B). The machine learning data quality checker 54 (see FIG. 1B) generates and communicates via the interface application 22 (see FIG. 1B), an indication 57 (see FIG. 1B), such as an alert 58b (see FIG. 1B), of a classification potential error 56b (see FIG. 1B) in the classification 92 (see FIG. 1B) of the instance 98 (see FIG. 1B), if the correctness 93 (see FIG. 1B) of the model predicted classification 92a (see FIG. 1B) is not established. The indication 57 (see FIG. 1B), such as the alert 58b (see FIG. 1B), may be generated via the alert mechanism 59 (see FIG. 1B), such as in the form of a signal, a display, a textual or graphical warning, or some other suitable alert mechanism.

If the prediction quality rating metric 38b (see FIG. 1B) is greater than or equal to a prediction quality rating metric threshold 39b (see FIG. 1B), then the model predicted classification 92a (see FIG. 1B) is accepted and applied. If the prediction quality rating metric 38b (see FIG. 1B) is less than the prediction quality rating metric threshold 39b (see FIG. 1B, then the model predicted classification 92a (see FIG. 1B) is rejected.

As used herein, the "prediction quality rating metric threshold" means a predefined prediction quality rating metric 38b (see FIG. 1B), below which the model predicted classification 92a (see FIG. 1B) is rejected, if the correctness 93 (see FIG. 1B) of the model predicted classification 92a (see FIG. 1B) is not established, and greater than or equal to or above which the model predicted classification 92a (see FIG. 1C) is accepted and applied, if the correctness 93 (see FIG. 1B) of the model predicted classification 92a (see FIG. 1B) is established.

For example, during the execution phase 88b (see FIG. 1B), an entered classification 92b (see FIG. 1B) (such as input by an automated separate system or automated computer program, a user, or another suitable separate system) for the instance 98 (see FIG. 1B) of the received data 16a (see FIG. 1B) may be received by the computer implemented data driven classification and data quality checking system 10 (see FIG. 1B). Next, the machine learning data quality checker 54 (see FIG. 1B) generates and communicates, via the interface application 22 (see FIG. 1B), the indication 57 (see FIG. 1B), such as the alert 58b (see FIG. 1B), of the classification potential error 56b (see FIG. 1B) in the classification 92 (see FIG. 1B) of the instance 98 (see FIG. 1B). This may occur, for example, if the entered classification 92b (see FIG. 1B) does not equal the model predicted classification 92a (see FIG. 1B), such as via a disagreement 96 (see FIG. 1B) between the entered classification 92b (see FIG. 1B) and the model predicted classification 92a (see FIG. 1B), and if the star rating system 44 (see FIG. 1B), is included and used, if the star rating 46 (see FIG. 2) is equal to five (5) stars 48b (see FIG. 2).

As shown in FIG. 1B, the computer implemented data driven classification and data quality checking system 10 further comprises the star rating system 44, discussed in further detail below with respect to FIG. 2.

Now referring to FIG. 1C, there is provided the computer implemented data driven classification and data quality checking system 10, such as in the form of computer implemented data driven classification and data quality checking system 10c, having a segmented predictive model 34c. FIG. 1C is an illustration of a functional block diagram showing an exemplary embodiment of the computer implemented data driven classification and data quality checking system 10 of the disclosure with the segmented predictive model 34c segmented into the star rating system 44.

As shown in FIG. 1C, the computer implemented data driven classification and data quality checking system 10 comprises the interface application 22 executed by one or more computers 62 in the computer system 60, the application programming interface (API) 26, and the associative memory software 24 (or associative memory engine 24a) incorporating the associative memory 28 and the machine learning algorithm 30. As discussed above, the associative memory 28 (see FIG. 1C) and the machine learning algorithm 30 (see FIG. 1C) are enabled to identify the plurality of associations 32 (see FIG. 1C), such as patterns of similarities 33 (see FIG. 1C), in the received data 16a (see FIG. 1C), and the associative memory 28 (see FIG. 1C) comprises a collection of data 16 (see FIG. 1C), such as the received data 16a (see FIG. 1C), or information 18 (see FIG. 1C), organized into the data structure 16k (see FIG. 1C). As shown in FIG. 1C, the input 15 of the data 16 is input into, and received by, the computer implemented data driven classification and data quality checking system 10.

As shown in FIG. 1C, the computer implemented data driven classification and data quality checking system 10 further comprises the model 34, such as the data driven associative memory model 34a, that may be learned or trained using the associative memory software 24. The model 34 (see FIG. 1C), such as the data driven associative memory model 34a (see FIG. 1C), may be in the form of the predictive model 34b (see FIG. 1C) that may be learned or trained using the associative memory software 24 (see FIG. 1C), with a training phase 88a (see FIG. 1C), and an execution phase 88b (see FIG. 1C) or test phase. As further shown in FIG. 1C, the predictive model 34b may comprise the segmented predictive model 34c, and the predictive model 34b preferably makes predictive model decisions 35 that may comprise segmented predictive model decisions 35a.

During the training phase 88a (see FIG. 1C) of the model 34 (see FIG. 1C), such as the data driven associative memory model 34a (see FIG. 1C), in the form of predictive model 34b (see FIG. 1C), every instance 98 (see FIG. 1C), such as a new instance 98a (see FIG. 1C), or entity 99 (see FIG. 1C), such as an email, in the training data set 17a (see FIG. 1C) is preferably assigned a classification 92 (see FIG. 1C) or a category 42 (see FIG. 1C). The classification 92 (see FIG. 1C) is preferably implemented by the classifier 94 (see FIG. 1C). Based on the data 16 (see FIG. 1C) or received data 16a (see FIG. 1C) contained in the instance 98 (see FIG. 1C), such as the new instance 98a (see FIG. 1C), or in the entity 99 (see FIG. 1B)), such as an email, entered into the computer implemented data driven classification and data quality checking system 10 (see FIG. 1C), the model 34 (see FIG. 1C), such as the data driven associative memory model 34a (see FIG. 1C), in the form of predictive model 34b (see FIG. 1C), is configured to predict a model predicted classification 92a (see FIG. 1C) for the instance 98 (see FIG. 1C), such as the new instance 98a (see FIG. 1C), or entity 99 (see FIG. 1C), such as the email, of the received data 16a (see FIG. 1C).

Next, in the training phase 88a (see FIG. 1C), the model 34 (see FIG. 1C), such as the data driven associative memory model 34a (see FIG. 1C), in the form of predictive model 34b (see FIG. 1C), calculates the quality rating metric 38 (see FIG. 1C), such as in the form of prediction quality rating metric 38b (see FIG. 1C). As discussed above, the prediction quality rating metric 38b (see FIG. 1C) calculated by the predictive model 34b (see FIG. 1C) includes the measurements 108 (see FIG. 1C) of strength 108a (see FIG. 1C) and assurance 108b (see FIG. 1C) that establish the correctness 93 (see FIG. 1C) of the model predicted classification 92a (see FIG. 1C).

Next, in the training phase 88a (see FIG. 1C), the model 34 (see FIG. 1C), such as the data driven associative memory model 34a (see FIG. 1C), in the form of predictive model 34b (see FIG. 1C), normalizes or transforms the quality rating metric 38 (see FIG. 1C), such as in the form of the prediction quality rating metric 38b (see FIG. 1C), associated with the model predicted classification 92a (see FIG. 1C), to the star rating system 44 (see FIGS. 1C, 2) having one or more star ratings 46 (see FIGS. 1C, 2). Preferably, the star rating 46 (see FIG. 1C) has a star rating threshold 46a (see FIG. 1C). The normalization of the quality rating metric 38 (see FIG. 1C), such as in the form of the prediction quality rating metric 38b (see FIG. 1C), to the star rating system 44 (see FIG. 1C), is discussed in further detail below in connection with FIG. 2.

Next, in the training phase 88a (see FIG. 1C), for each star rating 46 (see FIG. 1C), a star rating accuracy level 110 (see FIG. 1C) is calculated. A star rating threshold 46a (see FIG. 1C) is then determined. Preferably, the predictive model decision 35 (see FIG. 1C) associated with or correlating to the appropriate star rating accuracy level 110 (see FIG. 1C) is used.

During the execution phase 88b (see FIG. 1C) of the model 34 (see FIG. 1C), such as the data driven associative memory model 34a (see FIG. 1C), in the form of predictive model 34b (see FIG. 1C), a new instance 98a (see FIG. 1C) or entity 99 (see FIG. 1C) is received. Based on the data 16 (see FIG. 1C) or received data 16a (see FIG. 1C) contained in the new instance 98a (see FIG. 1C) or in the entity (see FIG. 1C), the model 34 (see FIG. 1C), such as the data driven associative memory model 34a (see FIG. 1C), in the form of predictive model 34b (see FIG. 1C), predicts the classification 92 (see FIG. 1C) or category 42 (see FIG. 1C) using its classification capabilities (e.g., identification of common matches in preidentified characteristics) and calculates the prediction quality rating metric 38b (see FIG. 1C), based on measurements 108 (see FIG. 1C) of the strength 108a (see FIG. 1C) and the assurance 108b (see FIG. 1C) that establish the correctness 93 (see FIG. 1C) of the model predicted classification 92a (see FIG. 1C).

Next, in the execution phase 88b (see FIG. 1C), the model 34 (see FIG. 1C), such as the data driven associative memory model 34a (see FIG. 1C), in the form of predictive model 34b (see FIG. 1C), normalizes or transforms the quality rating metric 38 (see FIG. 1C), such as in the form of the prediction quality rating metric 38b (see FIG. 1C), associated with the model predicted classification 92a (see FIG. 1C), to the star rating system 44 (see FIG. 1C) having one or more star ratings 46 (see FIG. 1C). If the star rating 46 (see FIG. 1C) is greater than or equal to the star rating threshold 46a (see FIG. 1C), then the information 18 (see FIG. 1C) derived from the predictive model 34b (see FIG. 2) may be accepted, used, and/or applied, or the model predicted classification 92a (see FIG. 1C) may be accepted. If the star rating 46 (see FIG. 1C) is less than the star rating threshold 46a (see FIG. 1C), then the information 18 (see FIG. 1C) derived from the predictive model 34b (see FIG.

1C) may be rejected, deferred, and/or further reviewed, or the model predicted classification 92a (see FIG. 1C) may be rejected.

By segmenting the predictive model decisions 35 (see FIGS. 1C, 2) of the predictive model 34b (see FIGS. 1C, 2) into the star rating system 44 (see FIGS. 1C, 2), the predictive model decisions 35 (see FIGS. 1C, 2) comprising segmented predictive model decisions 35a (see FIGS. 1C, 2) that can be segmented or split into accepted predictive model decisions 35b (see FIGS. 1C, 2) that are accepted, used, and/or applied, and rejected predictive model decisions 35c (see FIGS. 1C, 2) that are rejected, deferred, or require further review. With the segmented predictive model 34c (see FIGS. 1C, 2) and segmented predictive model decisions 35a (see FIGS. 1C, 2), the data driven classification and data quality checking system 10 (see FIG. 1C) allows for partial utilization of the predictive model 34b (see FIGS. 1C, 2) or classifier 94 (see FIGS. 1C, 2), even if the predictive model's 34b (see FIGS. 1C, 2) or classifier's 94 (see FIGS. 1C, 2) overall accuracy 198 (see FIGS. 1C, 2) is underperforming.

Referring now to FIG. 2, the star rating system 44 that may be included in the computer implemented data driven classification and data quality checking system 10 of FIGS. 1A-1C is shown in more detail. FIG. 2 is an illustration of a functional block diagram showing an exemplary embodiment of the star rating system 44 that may be included in one or more embodiments of the computer implemented data driven classification and data quality checking system 10 (see FIGS. 1A-1C) of the disclosure. As discussed above, the model 34 (see FIG. 1A), such as the data driven associative memory model 34a (see FIG. 1A), may normalize the quality rating metric 38 (see FIG. 1A, 2), such as the data quality rating metric 38a (see FIGS. 1A, 2), to the star rating system 44 (see FIGS. 1A, 2). In addition, as discussed above, the model 34 (see FIGS. 1B-1C), such as the data driven associative memory model 34a (see FIGS. 1B-1C), in the form of predictive model 34b (see FIGS. 1B-1C), may normalize the quality rating metric 38 (see FIGS. 1B-1C, 2), such as the prediction quality rating metric 38b (see FIGS. 1B-1C, 2), associated with the model predicted classification 92a (see FIGS. 1B-1C, 2), to the star rating system 44 (see FIGS. 1B-1C, 2).

Normalization of the quality rating metric 38 (see FIG. 2) to the star rating system 44 (see FIG. 2) preferably means taking a quality rating metric 38 (see FIG. 2) having a percentage range from 0% to 100% (for example, percentage association of data, or percentage strength 108a (see FIG. 1B) and assurance 108b (see FIG. 1B) that a prediction 20 (see FIG. 2) is correct) rescaled to a star rating 46 (see FIG. 2). As shown in FIG. 2, the star rating system 44 comprises the star rating 46 having a star rating threshold 46a and a star number range 47 of one or more star(s) 48, preferably numbering from one (1) star 48a to five (5) stars 48b. However, the star rating 46 (see FIG. 2) may comprise other suitable star number ranges 47 (see FIG. 2) of stars 48 (see FIG. 2).

For example, a sample normalization of the quality rating metric 38 (see FIG. 2) to the star rating system 44 (see FIG. 2) may comprise the following: a quality rating metric in a range from 80% to 100% may be normalized or rescaled to a five (5) star rating; a quality rating metric in a range from 60% up to, but not including, 80% may be normalized or rescaled to a four (4) star rating; a quality rating metric in a range from 40% up to, but not including, 60% may be normalized or rescaled to a three (3) star rating; a quality rating metric in a range from 20% up to, but not including, 40% may be normalized or rescaled to a two (2) star rating; and a quality rating metric in a range from 0% up to, but not including, 20% may be normalized or rescaled to a one (1) star rating. However, the quality rating metric 38 (see FIG. 1A) may be normalized to the star rating system 44 (see FIG. 1A) in any number of suitable normalized values.

As further shown in FIG. 2, when the quality rating metric 38 comprises a data quality rating metric 38a associated with the received data 16a, the star rating 46 of one (1) star 48a represents a least association 50 of the received data 16a with the category 42 of field 36 of the received data 16a, and the star rating 46 of five (5) stars 48b represents a most association 52 of the received data 16a with the category 42 of field 36 of the received data 16a.

As further shown in FIG. 2, when the quality rating metric 38 comprises the prediction quality rating metric 38b associated with correctness 93 of the model predicted classification 92a and/or the correctness 93 of the predictive model decisions 35 of the predictive model 34b, the predictive model 34b may be characterized using the star rating system 44. The predictive model 34b (see FIG. 2) may also be referred to as an associative memory classifier 94a (see FIG. 2).

As shown in FIG. 2, a star rating 46 of one (1) star 48a assigns a lowest rating 49a to weaknesses 94b of the classifier 94 or classification 92, and a star rating 46 of five (5) stars 48b assigns a highest rating 49b to strengths 94c of the classifier 94 or classification 92. For example, when the model 34 (see FIG. 1B), such as the data driven associative memory model 34a (see FIG. 1B), in the form of predictive model 34b (see FIGS. 1B, 2), normalizes the prediction quality rating metric 38b (see FIGS. 1B, 2) to the star rating system 44 (see FIG. 2), preferably, the star rating 46 (see FIG. 2) of one (1) star 48a (see FIG. 2) assigns the lowest rating 49a (see FIG. 2) to weaknesses 94b (see FIG. 2) of the classifier 94 (see FIG. 2) or classification 92 (see FIG. 2), and the star rating 46 (see FIG. 2) of five (5) stars 48b (see FIG. 2) assigns the highest rating 49b (see FIG. 2) to strengths 94c (see FIG. 2) of the classifier 94 (see FIG. 2) or classification 92 (see FIG. 2).

In one embodiment, the machine learning data quality checker 54 (see FIG. 1A) may be configured to generate and communicate via the interface application 22 (see FIG. 1A), the indication 57 (see FIG. 1A), such as the alert 58a (see FIG. 1A), of the potential error 56a (see FIG. 1A) in the received data 16a (see FIG. 1A) in the category 42 (see FIG. 1A) of field 36 (see FIG. 1A) of the received data 16a (see FIG. 1A), if the star rating 46 (see FIG. 2) is less than the star rating threshold 46a (see FIG. 2). In another embodiment, the machine learning data quality checker 54 (see FIG. 1B) may be configured to generate and communicate via the interface application 22 (see FIG. 1B), the indication 57 (see FIG. 1B), such as the alert 58b (see FIG. 1B), of the classification potential error 56b (see FIG. 1B) in the classification 92 (see FIGS. 1B, 2) of the instance 98 (see FIGS. 1B, 2), if the correctness 93 (see FIGS. 1B, 2) of the model predicted classification 92a (see FIGS. 1B, 2) is not established, for example, if an entered classification 92b (see FIG. 1B) does not equal the model predicted classification 92a (see FIGS. 1B, 2), and the star rating 46 (see FIG. 2) is five (5) stars 48b (see FIG. 2).

As further shown in FIG. 2, when predictive model decisions 35 by the predictive model 34b are segmented by the star rating system 44, for each of the one or more star ratings 46, a star rating accuracy level 110 may be calculated, and the star rating threshold 46a may be determined, based on an accuracy level 112 required by a process 114.

As used herein, "star rating threshold" means a predefined minimum star rating that is needed based on an accuracy level required by a process or an industry model for a predictive model or classifier. For example, the star rating threshold 46a (see FIG. 2) may include a predefined star rating below which the predictive model decision 35 (see FIGS. 1C, 2) or the information 18 (see FIG. 2) derived from the model 34 (see FIGS. 1B-1C), such as the predictive model 34b (see FIGS. 1C, 2), is rejected, deferred, and/or further reviewed (such as manually reviewed or automatically reviewed with a separate automated system, computer program or device), if the star rating 46 (see FIG. 2) is less than the star rating threshold 46a (see FIG. 2). Further, the star rating threshold 46a (see FIG. 2) may include, for example, a predefined star rating greater than or equal to or above which the predictive model decision 35 (see FIGS. 1C, 2) or the information 18 (see FIG. 2) derived from the model 34 (see FIGS. 1B-1C), such as the predictive model 34b (see FIGS. 1C, 2), is accepted, used and/or applied, if the star rating 46 (see FIG. 2) is greater than or equal to the star rating threshold 46a (see FIG. 2).

By segmenting the predictive model decisions 35 (see FIG. 2) into the star rating system 44 (see FIG. 2), the predictive model decisions 35 (see FIG. 2) may be split or categorized into segmented predictive model decisions 35a (see FIG. 2), including: (a) accepted predictive model decisions 35b (see FIG. 2), or those predictive model decisions 35 (see FIG. 2) that meet the accuracy level 112 (see FIG. 2) of a process 114 (see FIG. 2) or industry model or requirement, and (b) rejected predictive model decisions 35c (see FIG. 2), or those predictive model decisions 35 (see FIG. 2) that do not meet the accuracy level 112 (see FIG. 2) of the process 114 (see FIG. 2) or industry model or requirement. In addition, a decision 115 (see FIG. 2) may be made regarding using specific predictive model decisions 35 (see FIG. 2) or classifiers 94 (see FIG. 2) of a category 42 (see FIG. 2) based on their associated star rating 46 (see FIG. 2).

In addition, in one embodiment, if the star rating 46 (see FIG. 2) is greater than or equal to the star rating threshold 46a (see FIG. 2), then the process 114 (see FIG. 2) may automatically use, accept, and/or apply the predictive model decision 35 (see FIG. 2), or the information 18 (see FIG. 2) derived from the predictive model 34b (see FIG. 2), or the model predicted classification 92a (see FIG. 1B). If the star rating 46 (see FIG. 2) is less than the star rating threshold 46b (see FIG. 2), then the process 114 (see FIG. 2) may reject, defer, and/or further review the predictive model decision 35 (see FIG. 2), or the information 18 (see FIG. 2) derived from the predictive model 34b (see FIG. 2), or the model predicted classification 92a (see FIG. 2). This allows the process 114 (see FIG. 2) to use the predictive model decision 35 (see FIG. 2) or the information 18 (see FIG. 2) or the model predicted classification 92a (see FIG. 2) associated with or correlating to the appropriate star rating accuracy level 110 (see FIG. 2).

As further shown in FIG. 2, the predictions 20 of the predictive model 34b may include correct predictions 194, incorrect predictions 195 and total predictions 196. As further shown in FIG. 2, the predictive model 34b has a predictive model accuracy 197 that may be represented by a predictive model percent accuracy of total predictions 197a, a predictive model percent cumulative accuracy of total predictions 197b that may be calculated, and an overall accuracy 198. The predictive model accuracy 197 (see FIG. 2) is the percent or rate of accuracy of correct predictions 194 (see FIG. 2) made by the predictive model 34b (see FIG. 2) divided by the total predictions 196 (see FIG. 2) made by the predictive model 34b (see FIG. 2).

The star rating system 44 (see FIG. 2) allows information 18 (see FIG. 2) derived from the predictive model 34b (see FIG. 2) to meet the accuracy level 112 (see FIG. 2) requirements by selecting the high performing segments. Thus, the information 18 (see FIGS. 1B-1C) from the predictive model 34b (see FIG. 2) or classifier 94 (see FIG. 2) is usable and may lead to savings and cost avoidance.

Referring now to FIG. 3, an example is shown of a segmented predictive model 34c segmented into star rating accuracy levels 110 of a star rating system 44. FIG. 3 is a table 192 showing an example of a segmented predictive model 34c segmented into star rating accuracy levels 110 of the star rating system 44 that may be included in an embodiment of the computer implemented data driven classification and data quality checking system 10 (see FIG. 1C) of the disclosure. As shown in FIG. 3, table 192 shows the star rating accuracy levels 110 comprised of stars 48 in a range of one (1) star 48a (see FIG. 2) to five (5) stars 48b (see FIG. 2).

As shown in FIG. 3, table 192 shows the number of correct predictions 194 made by the predictive model 34b (see FIGS. 1C, 2), such as the segmented predictive model 34c, out of a total of 265 correct predictions, and their respective star rating accuracy levels 110, where 50 correct predictions had a star rating accuracy level of 5 stars, 90 correct predictions had a star rating accuracy level of 4 stars, 100 correct predictions had a star rating accuracy level of 3 stars, 25 correct predictions had a star rating accuracy level of 2 stars, and 0 correct predictions had a star rating accuracy level of 1 star.

As shown in FIG. 3, table 192 further shows the number of incorrect predictions 195 made by the predictive model 34b (see FIGS. 1C, 2), such as the segmented predictive model 34c, out of a total of 185 incorrect predictions, and their respective star rating accuracy levels 110, where 0 incorrect predictions had a star rating accuracy level of 5 stars, 10 incorrect predictions had a star rating accuracy level of 4 stars, 50 incorrect predictions had a star rating accuracy level of 3 stars, 75 incorrect predictions had a star rating accuracy level of 2 stars, and 50 incorrect predictions had a star rating accuracy level of 1 star.

As shown in FIG. 3, table 192 further shows the number of total predictions 196 made by the predictive model 34b (see FIGS. 1C, 2), such as the segmented predictive model 34c, out of a total of 450 total predictions, and their respective star rating accuracy levels 110, where 50 total predictions had a star rating accuracy level of 5 stars, 100 total predictions had a star rating accuracy level of 4 stars, 150 total predictions had a star rating accuracy level of 3 stars, 100 total predictions had a star rating accuracy level of 2 stars, and 50 total predictions had a star rating accuracy level of 1 star.

As shown in FIG. 3, table 192 further shows a predictive model accuracy 197 shown by a predictive model percent accuracy of total predictions 197a (see also FIG. 2) and a predictive model percent cumulative accuracy of total predictions 197b (see also FIG. 2). As shown in FIG. 3, table 192 shows the predictive model percent accuracy of total predictions 197a (see also FIG. 2) made by the predictive model 34b (see FIGS. 1C, 2), such as the segmented predictive model 34c, having a percentage range of 0%-100%, and calculated by dividing the correct predictions 194 by the total predictions 196 for each star rating accuracy level 110. The table 192 in FIG. 3 further shows the respective star rating accuracy levels 110, where 100% accuracy 197a had a star rating accuracy level of 5 stars, 90% accuracy 197a had a star rating accuracy level of 4 stars, 66.666667% accuracy 197a had star rating accuracy level of 3 stars, 25% accuracy 197a had a star rating accuracy level of 2 stars, and 0% accuracy 197a had a star rating accuracy level of 1 star.

As shown in FIG. 3, the table 192 further shows a predictive model percent cumulative accuracy of total predictions 197b (see also FIG. 2) made by the predictive model 34b, having a percentage range of 0%-100%, and calculated by dividing the correct predictions 194 by the total predictions 195, for each star rating accuracy level 110 and each of the one or more star rating accuracy levels 110 above. The table 192 in FIG. 3 further shows the respective star rating accuracy levels 110, where 100% cumulative accuracy 197b had a star rating accuracy level of 5 stars, 93.33333333% cumulative accuracy 197b had a star rating accuracy level of 4 stars, 80% cumulative accuracy 197b had star rating accuracy level of 3 stars, 66.25% accuracy 197b had a star rating accuracy level of 2 stars, and 58.88888889% accuracy 197b had a star rating accuracy level of 1 star.

As shown in FIG. 3, the table 192 further shows a predictive model overall accuracy 198 of 58.888889%, calculated by dividing all the correct predictions of 265 correct predictions by all the total predictions of 450 total predictions for all the star rating accuracy levels 110. For the example shown in table 192, for a process 114 (see FIG. 2) that required an accuracy level 112 (see FIG. 2) above 90% (where the accuracy level 112 was compared against the predictive model percent accuracy of total predictions 197a), then looking at the predictive model percent accuracy of total predictions 197a in table 192 showed a 100% accuracy 197a had a star rating accuracy level of 5 stars, and a 90% accuracy 197a had a star rating accuracy level of 4 stars, and the star rating accuracy levels of 1-3 stars were under 90% accuracy 197a. Thus, according to the example in table 192, for the process 114 (see FIG. 2) that required an accuracy level 112 (see FIG. 2) above 90%, the process 114 (see FIG. 2), such as an industry process, could use any predictive model decision 35 (see FIG. 2) associated to the star rating accuracy levels 110 with a 5 star rating and a 4 star rating. Thus, in the example shown in table 192, only 4 stars and 5 stars met the accuracy level 112 (see FIG. 2).

Figure 4:
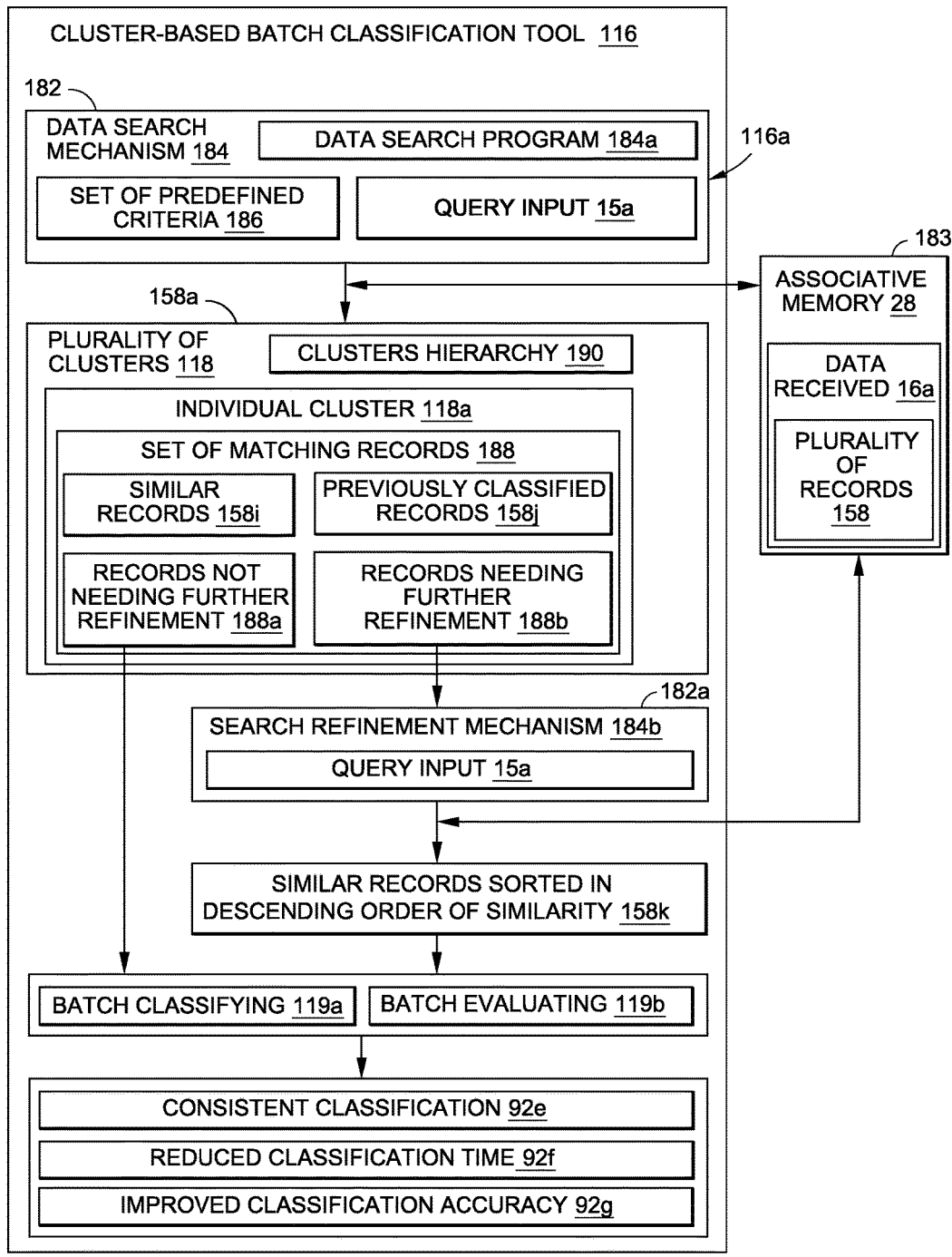
FIG. 4 is an illustration of a schematic diagram showing an exemplary embodiment of a cluster-based batch classification tool and process that may be included in one or more embodiments of the computer implemented data driven classification and data quality checking system of the disclosure.

Referring now to FIG. 4, the computer implemented data driven classification and data quality checking system 10 (see FIGS. 1A-1C) may further include a cluster-based batch classification tool 116 and a process 116a implementing the cluster-based batch classification tool 116. FIG. 4 is an illustration of a schematic diagram showing an exemplary embodiment of the cluster-based batch classification tool 116 and the process 116a that may be included in one or more embodiments of the computer implemented data driven classification and data quality checking system 10 (see FIGS. 1A-1C) of the disclosure. The cluster-based batch classification tool 116 (see FIG. 4) is in communication with the interface application 22 (see FIG. 1A) and is coupled to the associative memory 28 (see FIGS. 1A, 4) of the associative memory software 24 (see FIG. 1A).

As shown in FIG. 4, the cluster-based batch classification tool 116 and process 116a comprise a data search mechanism 184, such as a data search program 184a, for example, a keyword search or computer program search (e.g., an automated computer program or system, a set of instructions, or another suitable data search program), using a set of predefined criteria 186. The cluster-based batch classification tool 116 (see FIG. 4) and process 116a (see FIG. 4) may comprise other suitable computer programs, such as may be embodied in computer software 82c (see FIG. 8) stored on a computer memory 70 (see FIG. 8) accessible to one or more computers 62 (see FIG. 8) or one or more processor devices 66 (see FIG. 8). The process 116a (see FIG. 4) may be an automated process, may be a manual process, or a combination thereof.

As shown in FIG. 4, the process 116a comprises the step of searching 182 with the data search mechanism 184, such as the data search program 184a, of the cluster-based batch classification tool 116 (see FIG. 4), using the set of predefined criteria 186. The searching step 182 (see FIG. 4) may be performed using the data search mechanism 184 (see FIG. 4), such as the data search program 184a, of the cluster-based batch classification tool 116 (see FIG. 4), which is configured to input one or more query inputs 15a (see FIG. 4) into the associative memory 28 (see FIG. 4). As shown in FIG. 4, the associative memory 28 contains the received data 16a, such as a plurality of records 158. The cluster-based batch classification tool 116 (see FIG. 4) is coupled to the associative memory 28 (see FIG. 4) and is configured to search using the input 15 (see FIG. 1A) of the one or more query inputs 15a (see FIG. 4) into the associative memory 28 (see FIG. 4).

As shown in FIG. 4, the process 116a further comprises the step of grouping 183, by the associative memory 28 (see FIG. 4), of the plurality of records 158 (see FIG. 4) that are similar, based on the one or more query inputs 15a (see FIG. 4). The cluster-based batch classification tool 116 (see FIG. 4) is configured to receive from the associative memory 28 (see FIG. 4), the plurality of records 158 (see FIG. 4) that are similarly grouped, such as records results 158a (see FIG. 4), in the form of a plurality of clusters 118 (see FIG. 4) comprised of one or more individual clusters 118a (see FIG. 4). The plurality of clusters 118 (see FIG. 4) enable a quick evaluation of comparative classifications, establishing a clusters hierarchy 190 (see FIG. 4) amongst the individual clusters 118a (see FIG. 4).

Each individual cluster 118a (see FIG. 4) is preferably comprised of a set of matching records 188 (see FIG. 4). The associative memory 28 (see FIG. 4) uses the set of predefined criteria 186 (see FIG. 4), as well as normalized terms and phrases from the query inputs 15a (see FIG. 4), to group and return the plurality of clusters 118 (see FIG. 4), including the set of matching records 188 (see FIG. 4). The set of matching records 188 (see FIG. 4) preferably comprises similar records 158i (see FIG. 4) and previously classified records 158j (see FIG. 4). The values 104 (see FIG. 1B) for previously classified records 158j (see FIG. 4) in the set of matching records 188 (see FIG. 4) may be reviewed, for example, by one or more separate systems or devices, such as an automated computer program, system, device or apparatus, or by a user, such as an analyst, or another suitable review mechanism.

As further shown in FIG. 4, the set of matching records 188 may be divided into records not needing further refinement 188a and records needing further refinement 188b. The records not needing further refinement 188a (see FIG. 4) proceed in the process 116a (see FIG. 4) with the steps of batch classifying 119a (see FIG. 4) and batch evaluating 119b (see FIG. 4) of such records.

As shown in FIG. 4, the process 116a further comprises for the records needing further refinement 188b, the step of further search refinement 182a with a search refinement mechanism 184b, such as a further refined keyword search or computer program, and inputting one or more query inputs 15a, that are further refined, into the associative memory 28. The further search refinement step 182a (see FIG. 4) may be conducted by a user, such as the analyst, or via the one or more separate systems or devices, such as an automated computer program, system, device or apparatus. The associative memory 28 (see FIG. 4) then proceeds with further grouping 183 (see FIG. 4) of the records needing further refinement 188b (see FIG. 4), based on the one or more further refined query inputs 15a (see FIG. 4). The cluster-based batch classification tool 116 (see FIG. 4) is further configured to receive from the associative memory 28 (see FIG. 4) a group or list of similar records sorted in descending order of similarity 158k (see FIG. 4).

The similar records sorted in descending order of similarity 158k (see FIG. 4) then proceed in the process 116a (see FIG. 4) with the steps of batch classifying 119a (see FIG. 4) and batch evaluating 119b (see FIG. 4) of such records, such as by an automated computer program or system or a manual program or system. Thus, the cluster-based batch classification tool 116 (FIG. 4) and process 116a (see FIG. 4) are preferably configured, via the associative memory 28 (see FIG. 4), to refine any records needing further refinement 188b (see FIG. 4), and to receive similar records sorted in descending order of similarity 158k (see FIG. 4), allowing for additional batch classifying 119a (see FIG. 4) and batch evaluating 119b (see FIG. 4) of such records.

The cluster-based batch classification tool 116 (see FIG. 4) is preferably configured to receive the set of matching records 188 (see FIG. 4) that are similarly grouped in the plurality of clusters 118 (see FIG. 4), and further configured to enable batch classifying 119a (see FIG. 4) and batch evaluating 119b (see FIG. 4) of the set of matching records 188 (see FIG. 4) in each of the plurality of clusters 118 (see FIG. 4) simultaneously, providing a consistent classification 92e (see FIG. 4) for the set of matching records 188 (see FIG. 4). In addition, as shown in FIG. 4, the cluster-based batch classification tool 116 and process 116a preferably results in reduced classification time 92f and improved classification accuracy 92g.

By virtue of displaying all of the records that are present in the set of matching records 188 (see FIG. 4), the cluster-based batch classification tool 116 (see FIG. 4) enables visual inspection for classification or scoring consistency of previously classified records 158j (see FIG. 4) in the set of matching records 188 (see FIG. 4) at once, such as via an automated computer program or system, or via a manual program or system. The cluster-based batch classification tool 116 (see FIG. 4) also enables application of the consistent classification 92e (see FIG. 4) or scoring approach to all of the records that are present in the set of matching records 188 (see FIG. 4). By batch classifying 119a (see FIG. 4) and batch evaluating 119b (see FIG. 4) the set of matching records 188 (see FIG. 4) in this manner, such as via input from an automated computer program, system, device or apparatus, or from a user, such as an analyst, multiple records may be reviewed at once, multiple records may be classified or scored simultaneously, and records may all be sent at once for subsequent review and approval, all of which may result in reduced classification time 92f (see FIG. 4) and improved classification accuracy 92g (see FIG. 4). Further, by batch classifying 119a (see FIG. 4) and batch evaluating 119b (see FIG. 4) the set of matching records 188 (see FIG. 4) in batch-fashion, the cluster-based batch classification tool 116 (see FIG. 4) and process 116a (see FIG. 4) may increase the overall accuracy for such records.

Figure 5:
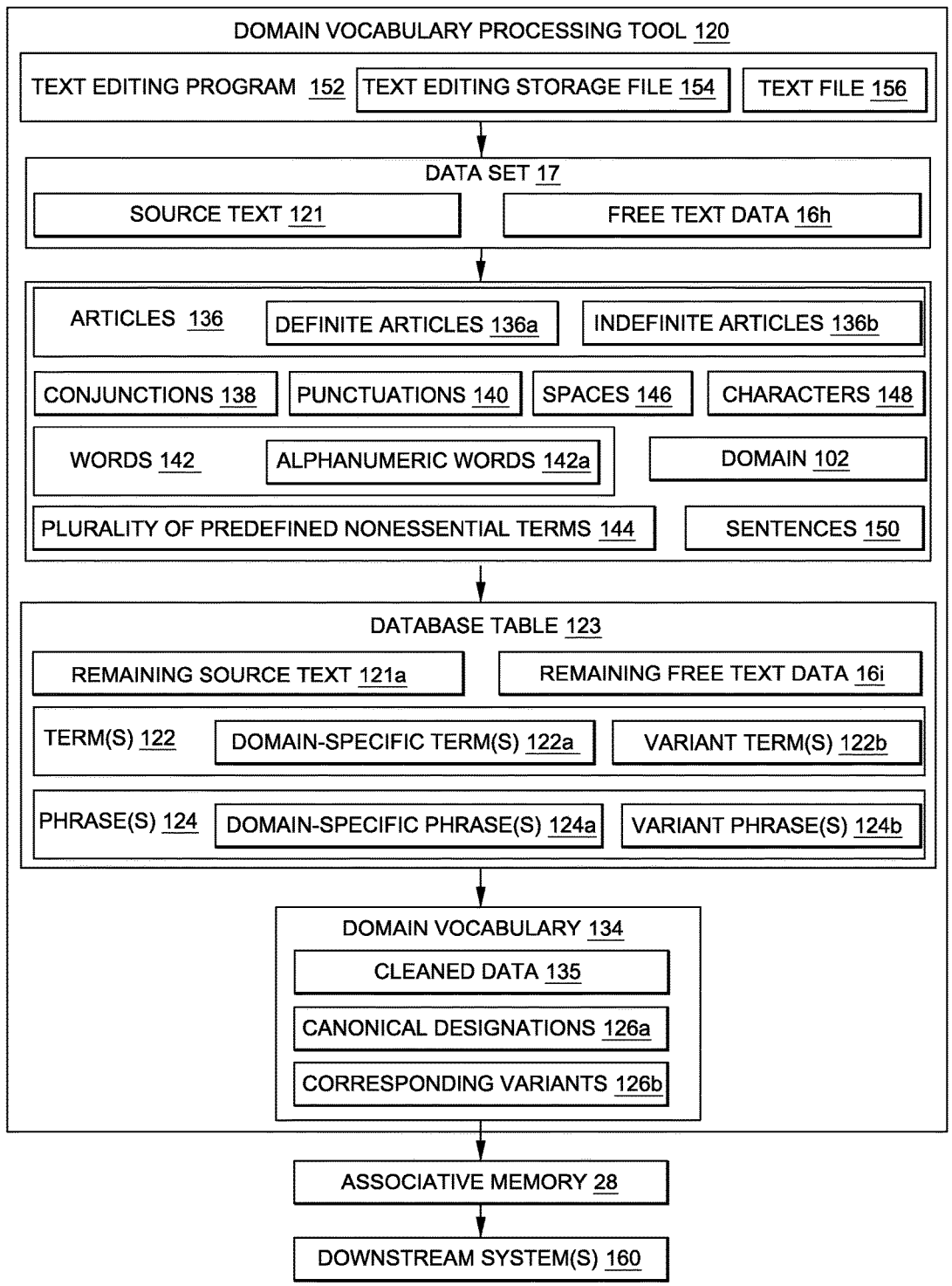
FIG. 5 is an illustration of a functional block diagram showing an exemplary embodiment of a domain vocabulary processing tool that may be included in one or more embodiments of the computer implemented data driven classification and data quality checking system of the disclosure.

The cluster-based batch classification tool 116 (see FIG. 4) and process 116a (see FIG. 4) of the computer implemented data driven classification and data quality checking system 10 (see FIGS. 1A-1C) provide the capability to group similar records 158i (see FIG. 4) together to classify or score the similar records 158i (see FIG. 4), in order to process the similar records 158i (see FIG. 4) with one or more downstream systems 160 (see FIG. 5). By grouping the similar records 158i (see FIG. 4) together, the cluster-based batch classification tool 116 (see FIG. 4) and process 116a (see FIG. 4) of the computer implemented data driven classification and data quality checking system 10 may output a plurality of records 158 (see FIG. 4) that have been subject to batch classifying 119a (see FIG. 4) and batch evaluating 119b (see FIG. 4) of the similar records 158i (see FIG. 4), to provide improved consistency of the classification or scoring, improved accuracy of the classified or scored records, and decreased labor hours and support costs achieved through classifying or scoring batches of records instead of single, individual records.

The cluster-based batch classification tool 116 (see FIG. 4) and process 116a (see FIG. 4) of the computer implemented data driven classification and data quality checking system 10 (see FIGS. 1A-1C) may provide benefit to technical industries that have similar records 158i (see FIG. 4) described differently and have a need to understand such records in a consistent manner, in order to utilize such records to make decisions, such as technical or industry decisions. Examples of industry domains that may benefit from the cluster-based batch classification tool 116 (see FIG. 4) and process 116a (see FIG. 4) include, but are not limited to, the aerospace industry, the healthcare industry, the human resources industry, and other suitable industries with volumes of records or other data that need to be classified or scored efficiently and accurately.

For example, in the aerospace industry, the records may include maintenance solutions to system failures. With improved consistency of the classification or scoring, improved accuracy of the classified or scored records, and decreased labor hours and support costs achieved through classifying or scoring batches of records instead of single, individual records, costly repairs or related maintenance-support actions may be reduced or eliminated.

In the healthcare industry, the records may include healthcare associated symptoms correlating illness. In the human resources industry, the records may include human resources related employee information.

Referring now to FIG. 5, the computer implemented data driven classification and data quality checking system 10 (see FIGS. 1A-1C) may further include a domain vocabulary process tool 120. FIG. 5 is an illustration of a functional block diagram showing an exemplary embodiment of the domain vocabulary processing tool 120 that may be included in one or more embodiments of the computer implemented data driven classification and data quality checking system 10 (see FIGS. 1A-1C) of the disclosure, to create a domain vocabulary 134 for use in the associative memory 28. The domain vocabulary process tool 120 (see FIG. 5) is preferably implemented by a process 120a (see FIG. 6), discussed in further detail with reference to FIG. 6. The domain vocabulary process tool 120 (see FIG. 5) is preferably in communication with the interface application 22 (see FIGS. 1A-1C) and is preferably coupled to the associative memory 28 (see FIGS. 1A-1C, 5). As used herein, "domain vocabulary" means the collection of canonical designations 126a (see FIG. 5) and corresponding variants 126b (see FIG. 5) that are specific to a domain 102 (see FIG. 5) (i.e., given sphere of knowledge or activity) and that have been generated from free text data 16h (see FIG. 5), source text 121 (see FIG. 5), or another suitable data set 17 (see FIG. 5) or another suitable data source 16c (see FIG. 1A).

As shown in FIG. 5, the domain vocabulary processing tool 120 preferably comprises a text editing program 152 having a text editing storage file 154. The text editing program 152 (see FIG. 5) may have a text file 156 (see FIG. 5). The text editing program 152 (see FIG. 5) may comprise a computer software program or code, or another suitable program or set of instructions. The domain vocabulary processing tool 120 (see FIG. 5) may also comprise other suitable computer program instructions, such as embodied in computer software 82c (see FIG. 8) stored on the computer memory 70 (see FIG. 8) accessible to one or more computers 62 (see FIG. 8) or one or more processor devices 66 (see FIG. 8). Preferably, the text editing program 152 (see FIG. 5) has the capability of deleting duplicate lines of text. The domain vocabulary processing tool 120 (see FIG. 5) may be automated via a suitable automated program or one or more separate systems, may be manual, or may be a combination thereof.

As shown in FIG. 5, the domain vocabulary 134 is preferably built from the data set 17 comprising free text data 16h and/or source text 121, or another suitable data source 16c (see FIG. 1A). The domain vocabulary processing tool 120 (see FIG. 5), such as in the form of the text editing program 152 (see FIG. 5), is configured to review the free text data 16h (see FIG. 5) and/or the source text 121 (see FIG. 5). The free text data 16h (see FIG. 5) and/or source text 121 (see FIG. 5) from which the domain vocabulary 134 (see FIG. 5) is built may preferably be copied and pasted into the text editing program 152 (see FIG. 5). Once the free text data 16h (see FIG. 5) and/or source text 121 (see FIG. 5) from which the domain vocabulary 134 (see FIG. 5) is built, has been processed and parsed, remaining source text 121a (see FIG. 5) or remaining free text data 16i (see FIG. 5) may be saved to the text file 156 (see FIG. 5) and/or to the text editing storage file 154 (see FIG. 5), and a copy of the remaining source text 121a (see FIG. 5) or remaining free text data 16i (see FIG. 5) may be imported into a database table 123 (see FIG. 5), such as in the form of a spreadsheet application or program, for future use or processing.

The domain vocabulary processing tool 120 (see FIG. 5), such as in the form of the text editing program 152 (see FIG. 5), is preferably configured to eliminate or parse articles 136 (see FIG. 5), such as definite articles 136a (see FIG. 5) and indefinite articles 136b (see FIG. 5), from the free text data 16h (see FIG. 5) and/or the source text 121 (see FIG. 5). The domain vocabulary processing tool 120 (see FIG. 5), such as in the form of the text editing program 152 (see FIG. 5), is further preferably configured to eliminate or parse conjunctions 138 (see FIG. 5), punctuations 140 (see FIG. 5), words 142 (see FIG. 5) such as alphanumeric words 142a (see FIG. 5), a plurality of predefined nonessential terms 144 (see FIG. 5), spaces 146 (see FIG. 5), characters 148 (see FIG. 5), and other suitable nonessential terms or characters from the free text data 16h (see FIG. 5) and/or source text 121 (see FIG. 5). The domain vocabulary processing tool 120 (see FIG. 5), such as in the form of the text editing program 152 (see FIG. 5), is further preferably configured to parse the free text data 16h (see FIG. 5) from the data set 17 (see FIG. 5) to generate individual, distinct sentences 150 (see FIG. 5).

Once the free text data 16h (see FIG. 5) and/or source text 121 (see FIG. 5) from which the domain vocabulary 134 (see FIG. 5) is built, has been processed and parsed, the remaining free text data 16i (see FIG. 5) and/or the remaining source text 121a (see FIG. 5) may be further processed and parsed. The domain vocabulary processing tool 120 (see FIG. 5), such as in the form of the text editing program 152 (see FIG. 5), is further configured to parse the remaining free text data 16i (see FIG. 5) and/or the remaining source text 121a (see FIG. 5) into a plurality of terms 122 (see FIG. 5) and phrases 124 (see FIG. 5) comprising one or more words 142 (see FIG. 5) specific to a domain 102 (see FIG. 5).

In particular, the domain vocabulary process tool 120 (see FIG. 5), such as in the form of the text editing program 152 (see FIG. 5), is configured to extract one or more term(s) 122 (see FIG. 5), such as one or more relevant domain-specific term(s) 122a (see FIG. 5), and their corresponding variant term(s) 122b (see FIG. 5), from the remaining free text data 16i (see FIG. 5) and/or the remaining source text 121a (see FIG. 5). The domain vocabulary process tool 120 (see FIG. 5), such as in the form of the text editing program 152 (see FIG. 5), is further configured to extract one or more phrase(s) 124 (see FIG. 5), such as one or more relevant domain-specific phrase(s) 124a (see FIG. 5), and their corresponding variant phrase(s) 124b (see FIG. 5), from the remaining free text data 16i (see FIG. 5) and/or the remaining source text 121a (see FIG. 5).

As further shown in FIG. 5, the domain vocabulary processing tool 120 is preferably further configured to normalize the domain-specific terms 122a and their variant terms 122b, and the domain-specific phrases 124a and their variant phrases 124b, into the canonical designations 126a and their corresponding variants 126b, respectively. As used herein, "canonical designation" means a term or phrase in a data set for which many similar ways to identify the term or phrase exist. As used herein, "corresponding variants" mean the similar terms or phrases for a given canonical designation 126a (see FIG. 5). An individual word may be a domain-specific term 122a (see FIG. 5) by itself or may be an acronym for a domain-specific phrase 124a (see FIG. 5).

The final representation of cleaned data 135 (see FIG. 5) is defined as the domain vocabulary 134 (see FIG. 5). As shown in FIG. 5, the domain vocabulary 134 is preferably input into the associative memory 28, and may be used in one or more downstream system(s) 160 (see FIG. 5).

The domain vocabulary processing tool 120 (see FIG. 5) gleans from the free text data 16h (see FIG. 5) and/or source text 121 (see FIG. 5), relevant domain-specific terms 122a (see FIG. 5) and domain-specific phrases 124a (see FIG. 5), and their respective variant terms 122b (see FIG. 5) and variant phrases 124b (see FIG. 5), for use in the associative memory 28 (see FIG. 5) of the data driven classification and data quality checking system 10 (see FIGS. 1A-1C), which preferably has improved performance with the cleaned data 135 (see FIG. 5). The domain vocabulary processing tool 120 (see FIG. 5) provides an effective approach to developing the canonical designations 126a (see FIG. 5), by extracting relevant domain-specific terms 122a (see FIG. 5) and relevant domain-specific phrases 124a (see FIG. 5) in a manual or automated fashion to enable one or more downstream system(s) 160 (see FIG. 5) that utilize free text data 16h (see FIG. 5) or source text 121 (see FIG. 5) to generate more effective results.

With better classified data, downstream systems 160 (see FIG. 5) may provide a better picture of scenarios and problems present in free text data 16h (see FIG. 5) or source text 121 (see FIG. 5). With a better picture of the situations described within the free text data 16h (see FIG. 5) or source text 121 (see FIG. 5), the downstream systems 160 (see FIG. 5) may be better able to provide insight required to generate more complete solutions to problems and avoid future problems through better performance-trend information. Advantages, such as better, more complete solutions to problems and improved problem avoidance may result in reduced product support costs and improved cost-avoidance through a better understanding of performance trends.

Figure 6:
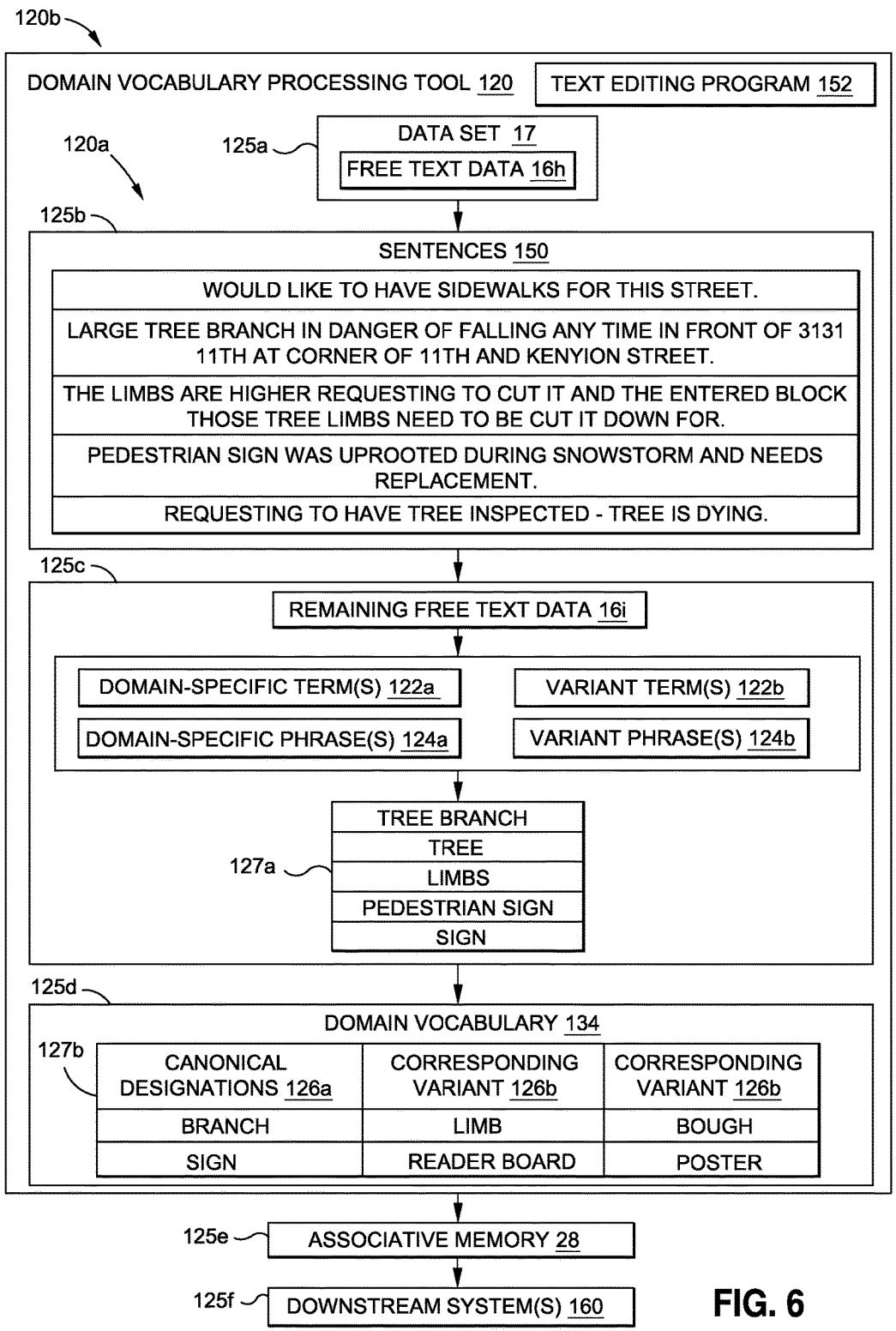
FIG. 6 is an illustration of a block flow diagram showing an example of a domain vocabulary formed using the domain vocabulary processing tool and process that may be included in one or more embodiments of the computer implemented data driven classification and data quality checking system of the disclosure.

Referring now to FIG. 6, the domain vocabulary process tool 120 is implemented via a process 120a. FIG. 6 is an illustration of a block flow diagram showing an example 120b of the domain vocabulary 134 formed using the domain vocabulary processing tool 120 and process 120a that may be included in one or more embodiments of the computer implemented data driven classification and data quality checking system 10 (see FIGS. 1A-1C) of the disclosure. The process 120a (see FIG. 6) of implementing the domain vocabulary processing tool 120 (see FIG. 6) may be an automated process, may be a manual process, or a combination thereof.

As shown in FIG. 6, the data set 17 comprising free text data 16h is input in the domain vocabulary processing tool 120, such as in the form of the text editing program 152. The text editing program 152 (see FIG. 6) preferably has the capability of deleting duplicate lines of text. During the process 120a (see FIG. 6), the domain vocabulary processing tool 120 (see FIG. 6), such as in the form of the text editing program 152 (see FIG. 6), may process the free text data 16h (see FIG. 6) automatically via a suitable automated program or separate system, or manually via instructions, program code, or a suitable computer program.

As shown in FIG. 6, the process 120a comprises the step 125a of parsing the free text data 16h from the data set 17 to generate individual, distinct sentences 150. In step 125a (see FIG. 6), the domain vocabulary processing tool 120 (see FIG. 6), such as in the form of the text editing program 152 (see FIG. 6), preferably parses or breaks the free text data 16h (see FIG. 6) following a period punctuation character to generate the individual, distinct sentences 150 (see FIG. 6).

As shown in FIG. 6, the process 120a further comprises the step 125b of parsing the individual, distinct sentences 150 to generate remaining free text data 16i using the domain vocabulary processing tool 120 (see FIG. 6), such as in the form of the text editing program 152 (see FIG. 6). In step 125b (see FIG. 6), the domain vocabulary processing tool 120 (see FIG. 6) is configured to perform one or more of the following: eliminating or parsing articles 136 (see FIG. 5), such as definite articles 136a (see FIG. 5) and indefinite articles 136b (see FIG. 5); and eliminating or parsing conjunctions 138 (see FIG. 5), punctuations 140 (see FIG. 5), words 142 (see FIG. 5) such as alphanumeric words 142a (see FIG. 5), a plurality of predefined nonessential terms 144 (see FIG. 5), spaces 146 (see FIG. 5), characters 148 (see FIG. 5), and other suitable nonessential terms or characters. The individual, distinct sentences 150 (see FIG. 6) are preferably sufficiently parsed such that all nonessential parts of speech and formatting that provide no knowledge domain related value within the domain 102 (see FIG. 5) are removed.

As shown in FIG. 6, the process 120a further comprises the step 125c of dividing the remaining free text data 16i into a table 127a of domain-specific terms 122a and their variant terms 122b that are similar, and domain-specific phrases 124a and their variant phrases 124b that are similar. As shown in FIG. 6, the table 127a lists "TREE BRANCH", "TREE", "LIMBS", "PEDESTRIAN SIGN", and "SIGN", which are terms and phrases useful to working in the corresponding knowledge domain.

In particular, in step 125c (see FIG. 6) the domain vocabulary process tool 120 (see FIG. 6), such as in the form of the text editing program 152 (see FIG. 6), is configured to extract one or more relevant domain-specific terms 122a (see FIG. 6), and their corresponding variant terms 122b (see FIG. 6), from the remaining free text data 16i (see FIG. 5), and is further configured to extract one or more relevant domain-specific phrases 124a (see FIG. 6), and their corresponding variant phrases 124b (see FIG. 6), from the remaining free text data 16i (see FIG. 6).

As shown in FIG. 6, the process 120a further comprises the step 125d of arranging the results obtained from step 125c into a table 127b of canonical designations 126a (i.e., "BRANCH", "SIGN"), and their respective corresponding variants 126b (i.e., "LIMB", "BOUGH", "READER BOARD", "POSTER"). The results are arranged into the table 127b (see FIG. 6), such that one domain-specific term 122a (see FIG. 6) or one domain-specific phrase 124a (see FIG. 6) is the canonical designation 126a (see FIG. 6), and similar variant terms 122b or variant phrases 124b are the corresponding variants 126b (see FIG. 6). This final representation of the free text data 16h (see FIG. 6) in step 125d (see FIG. 6) is defined as the domain vocabulary 134 (see FIG. 6).

As shown in FIG. 6, the process 120a further comprises the step 125e of the domain vocabulary processing tool 120 configured to input the domain vocabulary 134 into the associative memory 28 and configured to use the domain vocabulary 134 in the associative memory 28. As shown in FIG. 6, the process 120a further comprises the step 125f of using the domain vocabulary 134 in one or more downstream system(s) 160. The domain vocabulary 134 (see FIG. 6) provides a consistent representation for knowledge domain specific vocabulary for use in the associative memory 28 (see FIG. 6) and other downstream systems 160 (see FIG. 5).

An example of a domain vocabulary 134 using the domain vocabulary process tool 120 (see FIG. 6) and process 120a (see FIG. 6) was created for a knowledge domain using the following steps:

(1) Using a computer implemented text editing program capable of deleting duplicate lines of text, a data set of free text data from which the domain vocabulary is to be built was copied and pasted into the text editing program.

(2) Using the text editing program, all free text data following a period punctuation character was broken into separate lines or sentences.

(3) Using the text editing program, all duplicate line entries were deleted so that only distinct lines of free text data remained.

(4) Using the text editing program, all leading whitespace characters and other text, including quotes, dash characters, and other non-alphanumeric characters deemed to be of no value to the knowledge domain were deleted from the remaining distinct lines of free text data.

(5) Using the text editing program, all trailing punctuation characters such as periods, commas, colons, and semicolons, were deleted from the remaining distinct lines of free text data.

(6) Step (3) was repeated of using the text editing program, all duplicate line entries were deleted so that only distinct lines of text remained.

(7) The processed and parsed remaining distinct lines of free text data were examined, and using the text editing program, all leading and trailing text that did not add value to the knowledge domain was deleted. (a) The remaining distinct lines of free text data were broken or parsed at obvious points where two or more domain-specific terms or domain-specific phrases were observed. (b) Step (3) was periodically repeated to reduce any duplicate lines of free text data.

(8) Once the remaining free text data was found to be acceptable after sufficient processing and parsing using the text editing program, the remaining free text data was saved to a text file.

(9) In a separate operation, a copy of the remaining free text data from Step (8) was copied and pasted in a separate window of the text editing program.

(10) For the copy of the remaining free text data, using the text editing program, all spaces were broken into separate lines, all leading and trailing whitespace characters were deleted, and all non-alphanumeric leading and trailing characters were deleted.

(11) The processed and parsed copy of the remaining free text data was imported into a database table for future use.

(12) After performing the database import in Step (11), all duplicate entries were deleted and saved to the text file. (a) All words that provided domain knowledge were identified.

(13) The alphanumeric words in the database table created in Step (11) were selected, counted and grouped in order of descending count of occurrences.

(14) The results from Step (13) were reviewed to identify words that were relevant to the knowledge domain. (a) The text file from Step (8) was investigated for leading and trailing alphanumeric patterns surrounding a given word of interest using regular expressions or other similar techniques. (b) All phrases from the multi-word pattern results identified in Step (14(a)) which provided useful domain knowledge were identified.

(15) The phrases from Step (14(b)) were combined with the results of Step (7). All duplicate entries were deleted.

(16) The results from Step (15) were arranged into collections, such that one term or phrase was the canonical designation and similar terms were the corresponding variants, and the domain vocabulary was obtained.

Figure 7:
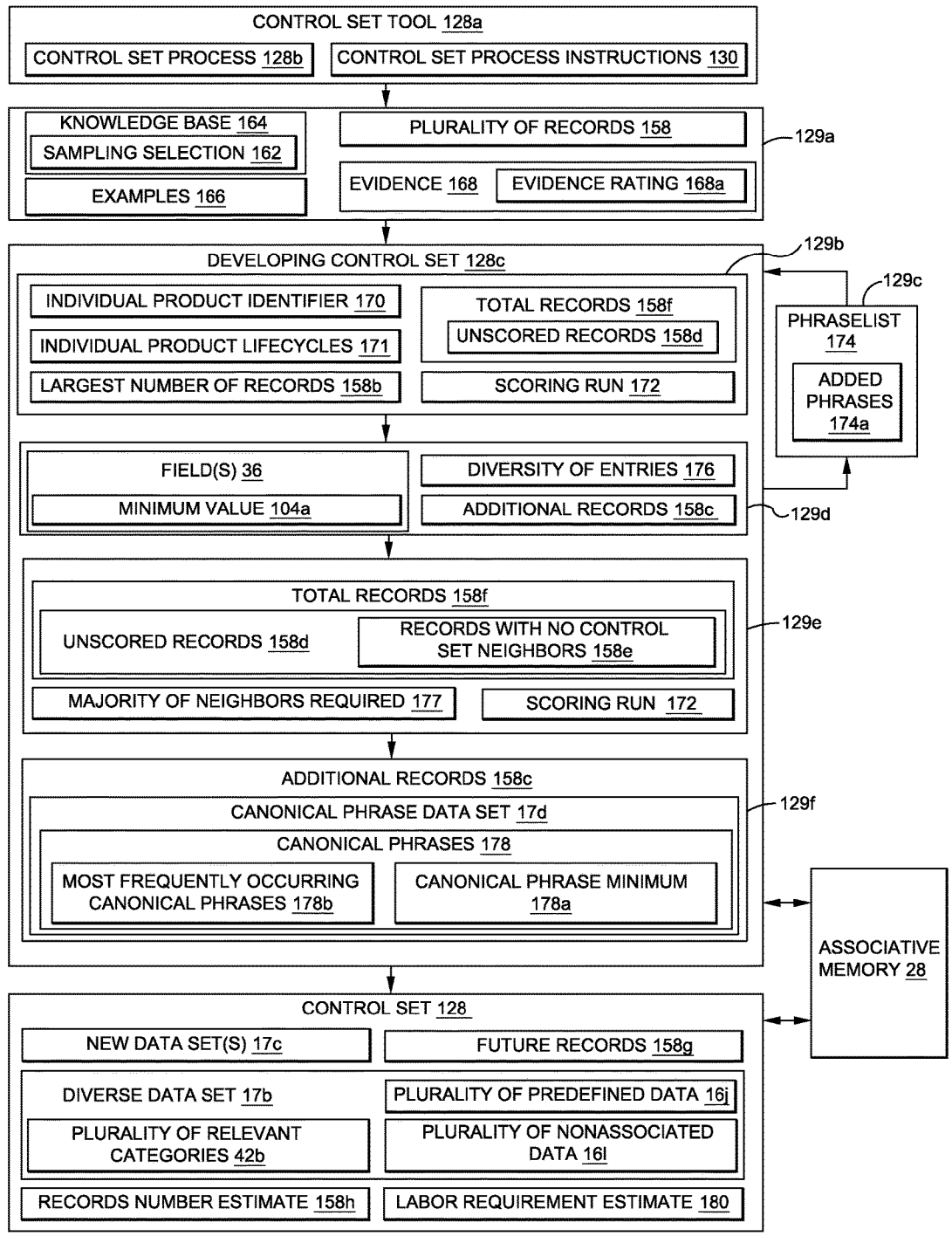
FIG. 7 is an illustration of a functional block diagram showing an exemplary embodiment of a control set coupled to an associative memory and that may be included in one or more embodiments of the computer implemented data driven classification and data quality checking system of the disclosure.

Referring now to FIG. 7, the computer implemented data driven classification and data quality checking system 10 (see FIGS. 1A-1C) may further include a control set 128 in communication with the interface application 22 (see FIG. 1A) and coupled to the associative memory 28 (see FIG. 1A) of the associative memory software 24 (see FIG. 1A) and configured for use with the associative memory 28. FIG. 7 is an illustration of a functional block diagram showing an exemplary embodiment of the control set 128 coupled to the associative memory 28 and that may be included in one or more embodiments of the computer implemented data driven classification and data quality checking system 10 (see FIGS. 1A-1C) of the disclosure.

As shown in FIG. 7, the control set 128 is formed using a control set tool 128a and a control set process 128b. As shown in FIG. 7, the control set 128 may be formed from a sampling selection 162 of a knowledge base 164, such as a plurality of records 158. The control set tool 128a (see FIG. 7) and the control set process 128b (see FIG. 7) select and calculate the plurality of records 158 (see FIG. 7) to form the control set 128 (see FIG. 7) configured for use with the associative memory 28 (see FIG. 7). Specific records for inclusion in the control set 128 (see FIG. 7) may be targeted.

To train or teach the associative memory 28 (see FIG. 7), the control set 128 (see FIG. 7) is preferably required to provide examples 166 (see FIG. 7) and evidence 168 (see FIG. 7) of a small number (e.g., sampling selection 162) of the plurality of records 158 (see FIG. 7) that the associative memory 28 (see FIG. 7) may use to accurately classify or score additional records 158c (see FIG. 7) or future records 158g (see FIG. 7). The size of the control set 128 is calculated in terms of the quantity of the plurality of records 158 (see FIG. 7). As shown in FIG. 7, the evidence 168 may include an evidence rating 168a.

The control set process 128b (see FIG. 7) is an iterative process that uses the associative memory 28 (see FIG. 7) to perform multiple scoring runs 172 (see FIG. 7) on the plurality of records 158 (see FIG. 7) to reduce the number of total records 158f (see FIG. 7). The control set tool 128a (see FIG. 7) may comprise control set process instructions 130 (see FIG. 7), such as in the form of a set of process instructions, process calculations, a computer program or code, or other suitable process instructions or programs. The control set tool 128a (see FIG. 7) and the control set process 128b (see FIG. 7) may also comprise other suitable computer programs, such as embodied in computer software 82c (see FIG. 8) stored on the computer memory 70 (see FIG. 8) accessible to one or more computers 62 (see FIG. 8) or one or more processor devices 66 (see FIG. 8).

As shown in FIG. 7, the control set process 128b comprises the step 129a of using the control set tool 128a configured to select the plurality of records 158 for the development of the control set 128. The plurality of records 158 (see FIG. 7) may be formed into a developing control set 128c (see FIG. 7).

As shown in FIG. 7, the control set process 128b further comprises the step 129b of using the control set tool 128a configured to select a largest number of records 158b for an individual product identifier 170 from the plurality of records 158 selected in step 129a. The individual product identifier 170 (see FIG. 7) may comprise an identification number, a registration number, a serial number, or another identifier unique to a product or an apparatus or another item or service. Evidence 168 (see FIG. 7) of individual product lifecycles 171 (see FIG. 7) may be captured in the developing control set 128c (see FIG. 7) with this step 129b (see FIG. 7).

As shown in FIG. 7, step 129b of the control set process 128b further comprises performing a scoring run 172 in the associative memory 28 on all total records 158f, including unscored records 158d and the developing control set 128c, once a whole product, for example, a whole aircraft, is in the developing control set 128c, so that remaining records needed may be estimated. Unscored records 158d (see FIG. 7) are those records that the developing control set 128c (see FIG. 7) or control set 128 (see FIG. 7) may use as evidence to score or classify.

As shown in FIG. 7, the control set process 128b may further comprise the step 129c of using the control set tool 128a configured to apply a phraselist 174 with added phrases 174a to the developing control set 128c developed or formed in step 129b. The added phrases 174a (see FIG. 7) added to the phraselist 174 (see FIG. 7) may assist with development and searches relating to developing the developing control set 128c (see FIG. 7) in step 129b (see FIG. 7).

As shown in FIG. 7, the control set process 128b further comprises the step 129d of using the control set tool 128a configured to add additional records 158c to achieve a minimum value 104a for one or more fields 36 in the developing control set 128c. Evidence 168 (see FIG. 7) of diversity of entries 176 (see FIG. 7) may be captured in the developing control set 128c (see FIG. 7) with this step 129d (see FIG. 7).

As shown in FIG. 7, the control set process 128b may further comprise repeating the step 129c of applying the phraselist 174 with added phrases 174a to the developing control set 128c formed in step 129d. The added phrases 174a (see FIG. 7) added to the phraselist 174 (see FIG. 7)

may assist with development and searches relating to developing the developing control set 128c (see FIG. 7) in step 129d (see FIG. 7).

As shown in FIG. 7, the control set process 128b further comprises the step 129e of using the control set tool 128a configured to add records with no control set neighbors 158e to the developing control set 128c. The records with no control set neighbors 158e (see FIG. 7) may comprise records with the evidence rating 168a (see FIG. 7) of zero (0). Evidence 168 (see FIG. 7) of a majority of neighbors required 177 (see FIG. 7) may be captured in the control set 128 (see FIG. 7) with this step 129e (see FIG. 7).

As shown in FIG. 7, the step 129e of the control set process 128b further comprises performing the scoring run 172 in the associative memory 28 frequently on all total records 158f, including the unscored records 158d and the developing control set 128c, in an effort to reduce the total number required. As shown in FIG. 7, the control set process 128b may further comprise repeating the step 129c of applying the phraselist 174 with added phrases 174a to the developing control set 128c formed in step 129e. The added phrases 174a (see FIG. 7) added to the phraselist 174 (see FIG. 7) may assist with development and searches relating to developing the developing control set 128c (see FIG. 7) in step 129e (see FIG. 7).

As shown in FIG. 7, the control set process 128b further comprises the step 129f of using the control set tool 128a configured to add additional records 158c to achieve a canonical phrase minimum 178a number of each canonical phrase 178 in the developing control set 128c in step 129f. Evidence 168 (see FIG. 7) of examples 166 (see FIG. 7) of each canonical phrase 178 (see FIG. 7) the associative memory 28 (see FIG. 7) may see during analysis of additional records 158c (see FIG. 7) and/or future records 158g (see FIG. 7) may be captured in the developing control set 128c (see FIG. 7) with this step 129f (see FIG. 7).

As shown in FIG. 7, the step 129f of the control set process 128b further comprises investigating the canonical phrases 178 that are most frequently occurring canonical phrases 178b to evaluate if additional added phrases 174a should be added to the phraselist 174.

As shown in FIG. 7, the control set process 128b may further comprise repeating the step 129c of applying the phraselist 174 with added phrases 174a to the developing control set 128 formed in step 129f. The added phrases 174a (see FIG. 7) added to the phraselist 174 (see FIG. 7) may assist with development and searches relating to developing the developing control set 128c (see FIG. 7) in step 129f (see FIG. 7).

As shown in FIG. 7, when the developing control set 128c is finalized, the control set 128 formed by the control set tool 128a and control set process 128b is obtained. The control set 128 (see FIG. 7) is preferably configured to accurately classify new data sets 17c (see FIG. 7) and is preferably configured to accurately classify or score future records 158g (see FIG. 7). The control set 128 (see FIG. 7) comprises a diverse data set 17b. The diverse data set 17b (see FIG. 7) preferably comprises a plurality of predefined data 16j (see FIG. 7) from a plurality of relevant categories 42b (see FIG. 7) generated by the associative memory 28 (see FIG. 7). The diverse data set 17b (see FIG. 7) preferably further comprises a plurality of nonassociated data 16l (see FIG. 7) not associated with the plurality of relevant categories 42b, defining a canonical phrase data set 17d (see FIG. 7) representative of canonical phrases 178 (see FIG. 7) associated with the associative memory 28 (see FIG. 7).

The control set 128 formed is flexible with the diverse data set 17b (see FIG. 7). By being able to provide a records number estimate 158h (see FIG. 7) of the number of records necessary in the control set 128 (see FIG. 7), it is possible to provide a labor requirement estimate 180 (see FIG. 7) of the labor requirements for classifying or scoring the records in the new data sets 17c (see FIG. 7). The control set tool 128a (see FIG. 7) and the control set process 128b (see FIG. 7) maximize the diversity and accuracy of the control set 128 (see FIG. 7), while minimizing the size of the control set 128 (see FIG. 7) and the labor required to develop the control set 128 (see FIG. 7). The control set 128 (see FIG. 7) may decrease the labor required for classifying or scoring records by 30%-50% as compared to the labor required for classifying or scoring records with known solutions, as many records require classification for later processing by one or more downstream systems 160 (see FIG. 5).

A control set 128 (see FIG. 7) using the control set tool 128a (see FIG. 7) and control set process 128b (see FIG. 7) was developed for an aircraft tail number of an aircraft. First, one aircraft tail number (quantity value equals "W" equals 1 (one)) with the largest number of records was selected for the development of the control set. All records were selected for the aircraft tail number with the largest number of records. Flight training aircraft, hangar queen aircraft (i.e., grounded aircraft kept so that their parts can be used in other aircraft), and other aircraft that were not good candidates were not considered in the selection of records. A scoring run should be performed once a whole aircraft is in the control set.

Next, additional records were added for each field to achieve an "X" minimum value for each field in the control set. The "X" minimum value chosen was four (4). Additional records were added for all classifiers as needed.

Next, records with no control set neighbors were added to the developing control set. A "Y %" percent value of records with 0.0 evidence rating (i.e., ECR (evidence consistency rating)) were added to the developing control set. The "Y %" value chosen was 80%, and 80% of unscored records having a 0.0 evidence rating (i.e., ECR (evidence consistency rating)) were added to the developing control set. A scoring run was performed frequently on all records in an effort to reduce the total number of records.

Next, additional records to achieve a "Z" minimum value of each canonical phrase in the developing control set were added. The "Z" minimum value of two (2) was chosen, and additional records for each defined canonical phrase to achieve two (2) minimum in the developing control set were added.

Next, an investigation was performed on canonical phrases that were the most frequently occurring canonical phrases to evaluate if more added phrases should be added to the phraselist. During each of the above steps, identified phrases were added to the phraselist and applied to the developing control set.

Figure 8:
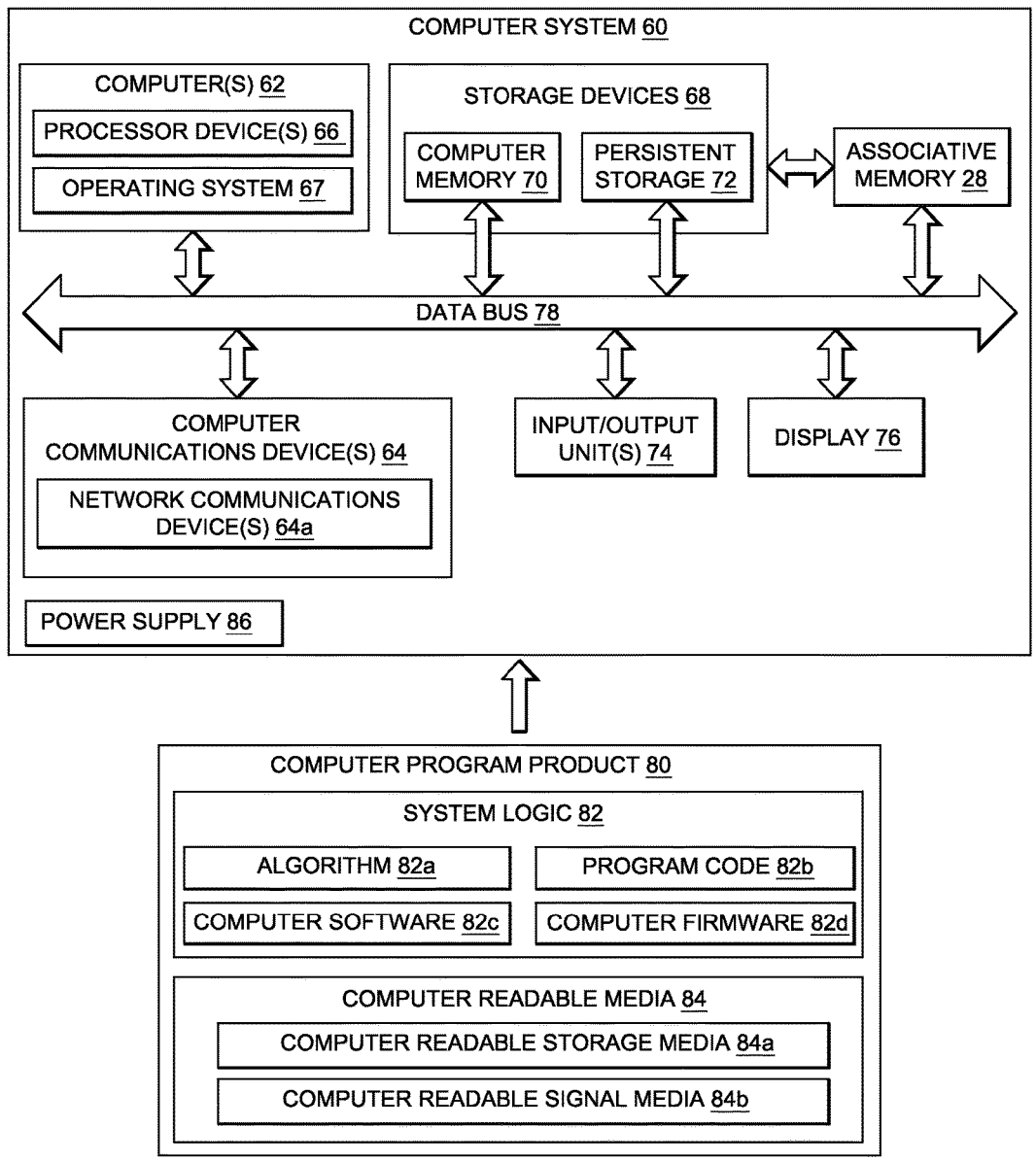
FIG. 8 is an illustration of a functional block diagram showing an exemplary embodiment of a computer system that may be included in one or more embodiments of the computer implemented data driven classification and data quality checking system of the disclosure.

Referring now to FIG. 8, the computer system 60 of the computer implemented data driven classification and data quality checking system 10 (see FIGS. 1A-1C) is shown in more detail. FIG. 8 is an illustration of a functional block diagram of an exemplary embodiment of the computer system 60 that may be included in one or more embodiments of the computer implemented data driven classification and data quality checking system 10 (see FIGS. 1A-1C) of the disclosure. As shown in FIG. 8, the computer system 60 comprises one or more computers 62, which may include one or more processor devices 66, and an operating system

67. The computer system 60 (see FIG. 8) may be used to implement the one or more computers 62 (see FIG. 8).

The one or more computers 62 (see FIG. 8) or one or more processor devices 66 (see FIG. 8) may be configured to control one or more functions of one or more elements of the interface application 22 (see FIGS. 1A-1C) through computer program instructions, such as computer software 82c (see FIG. 8) stored on a computer memory 70 (see FIG. 8) accessible to the one or more computers 62 (see FIG. 8) or the one or more processor devices 66 (see FIG. 8).

As shown in FIG. 8, the computer system 60 may further comprise one or more computer communications devices 64, such as networking communications devices 64a, for linking the computer implemented data driven classification and data quality checking system 10 (see FIGS. 1A-1C), for example, to one or more separate systems. The networking communications devices 64a (see FIG. 8) may comprise network links between various computers and devices connected together within a network data processing system via wire connections, wireless communication links, fiber optic cables, or other suitable network connections, and that may connect to a network, a server, the Internet, or another system or device.

The one or more computer communications devices 64 (see FIG. 8) may be configured to provide for communications in accordance with any of a number of wired or wireless communication standards. The one or more computers 62 (see FIG. 8) or one or more processor devices 66 (see FIG. 8) may also be configured to facilitate communications via the one or more computer communications devices 64 (see FIG. 8) by, for example, controlling hardware included within the one or more computer communications devices 64 (see FIG. 8). The one or more computer communications devices 64 (see FIG. 8) may include, for example, one or more antennas, a transmitter, a receiver, a transceiver and/or supporting hardware, including, for example, a processor for enabling communications.

As shown in FIG. 8, the computer system 60 further comprises storage devices 68, such as the computer memory 70 and persistent storage 72. The computer memory 70 (see FIG. 8) may comprise one or more of a random access memory (RAM), including dynamic and/or static RAM, on-chip or off-chip cache memory, or other suitable computer memory 70 (see FIG. 8). The persistent storage 72 (see FIG. 8) may comprise one or more of a flash memory, a hard drive, Read-Only Memory (ROM), magnetic storage devices such as hard disks, floppy disk drives, and rewritable magnetic tape, rewritable optical disk drives and/or media, non-volatile random access memory (NVRAM), or other suitable persistent storage 72 (see FIG. 8).

As shown in FIG. 8, the computer system 60 further comprises one or more input/output units 74, a display 76, a data bus 78, and a power supply 86. The one or more input/output units 74 (see FIG. 8) provide for the input and output of data 16 (see FIG. 1A) with other devices connected to the computer system 60 (see FIG. 8), such as, the computer interfaces, for example, the interface application 22 (see FIGS. 1A-1C). The one or more input/output units 74 (see FIG. 8) may comprise such devices as a keyboard, a mouse, a joystick, or other input/output devices. For example, the one or more input/output units 74 (see FIG. 8) may provide a connection for input though a keyboard and mouse, or may send output to a printer or other device.

The display 76 (see FIG. 8) provides the means to display data 16 (see FIG. 1A) or information 18 (see FIG. 1A) to a user, a separate automated system, automated computer program, automated apparatus, or automated device, or another suitable separate system, program, or device. As shown in FIG. 8, the data bus 78 provides communications between the one or more computers 62, the computer memory 70, the persistent storage 72, the computer communications devices 64, the one or more input/output units 74 and the display 76. The power supply 86 (see FIG. 8) of the computer system 60 (see FIG. 8) may comprise batteries, electricity, or other power supply elements.

As shown in FIG. 8, a computer program product 80 is preferably used in the computer system 60. The computer program product 80 (see FIG. 8) comprises a system logic 82 (see FIG. 8). As shown in FIG. 8, the system logic 82 may comprise an algorithm 82a, a program code 82b, a computer software 82c, a computer firmware 82d, or another suitable system logic 82. As shown in FIG. 8, the computer program product 80 may comprise a computer readable medium 84. The computer readable medium 84 (see FIG. 8) may comprise a computer readable storage media 84a (see FIG. 8), a computer readable signal media 84b (see FIG. 8), or another suitable computer readable medium 84 (see FIG. 8).

The system logic 82 (see FIG. 8), such as the algorithm 82a (see FIG. 8), the program code 82b (see FIG. 8), the computer software 82c (see FIG. 8), the computer firmware 82d (see FIG. 8), or another suitable system logic 82 (see FIG. 8), may be stored in and retrieved from the computer readable storage media 84a (see FIG. 8) and loaded into the one or more computers 62 (see FIG. 8), the one or more processor devices 66 (see FIG. 8), or another programmable device, to configure and direct the one or more computers 62 (see FIG. 8), the one or more processor devices 66 (see FIG. 8), or other programmable apparatus to execute operations to be performed on or by the one or more computers 62 (see FIG. 8), the one or more processor devices 66 (see FIG. 8), or other programmable apparatus, and to function in a particular way to generate a particular apparatus or article of manufacture. Execution of the system logic 82 (see FIG. 8), such as the algorithm 82a (see FIG. 8), the program code 82b (see FIG. 8), the computer software 82c (see FIG. 8), the computer firmware 82d (see FIG. 8), or another suitable system logic 82 (see FIG. 8), may produce a computer-implemented system, process or method, such that the system logic 82 (see FIG. 8), such as the algorithm 82a (see FIG. 8), the program code 82b (see FIG. 8), the computer software 82c (see FIG. 8), the computer firmware 82d (see FIG. 8), or another suitable system logic 82 (see FIG. 8), executed by the one or more computers 62 (see FIG. 8), one or more processor devices 66 (see FIG. 8), or other programmable apparatus provide operations for implementing the functions disclosed herein.

In another embodiment there is provided a computer implemented data driven classification and data quality checking system 10 (see FIG. 1C) that is configured to segment a predictive model 34b (see FIG. 1C) and predictive model decisions 35 (see FIG. 2) into the star rating system 44 (see FIG. 2). By segmenting the predictive model 34b (see FIG. 1C) and predictive model decisions 35 (see FIG. 2) into the star rating system 44 (see FIG. 2), the predictive model decisions 35 (see FIG. 2) may be segmented or split into segmented predictive model decisions 35a (see FIG. 2), including accepted predictive model decisions 35b (see FIG. 2) and rejected predictive model decisions 35c (see FIG. 2). The computer implemented data driven classification and data quality checking system 10 (see FIG. 1C) comprises an interface application 22 (see FIG. 1C) enabled to receive data 16 (see FIG. 1C).

The computer implemented data driven classification and data quality checking system 10 (see FIG. 1C) further comprises an associative memory software 24 (see FIG. 1C) in communication with the interface application 22 (see FIG. 1C) via an application programming interface (API) 26 (see FIG. 1C). The associative memory software 24 (see FIG. 1C) incorporates an associative memory 28 (see FIG. 1C) and a machine learning algorithm 30 (see FIG. 1C).

The computer implemented data driven classification and data quality checking system 10 (see FIG. 1C) further comprises a predictive model 34b (see FIG. 1C) learned using the associative memory 28 (see FIG. 1C). The predictive model 34b (see FIG. 2) may also be referred to as the associative memory classifier 94a (see FIG. 2). The predictive model 34a (see FIG. 1C) is configured to predict a model predicted classification 92a (see FIG. 1C) for a classification 92 (see FIG. 1C) of an instance 98 (see FIG. 1C) of the received data 16a (see FIG. 1C) and is configured to make predictive model decisions 35 (see FIG. 1C). The model predicted classification 92a (see FIG. 2) may comprise an associative memory classification 92c (see FIG. 2) in a category 42 (see FIG. 2).

The computer implemented data driven classification and data quality checking system 10 (see FIG. 1C) further comprises a prediction quality rating metric 38b (see FIG. 1C) calculated by the predictive model 34b (see FIG. 1C) to include measurements 108 (see FIG. 1C) of a strength 108a (see FIG. 1C) and an assurance 108b (see FIG. 1C) that establish the correctness 93 (see FIG. 1C) of the model predicted classification 92a (see FIG. 1C) or the associative memory classification 92c (see FIG. 1C). If the prediction quality rating metric 38b (see FIG. 1C) is greater than or equal to the prediction quality rating metric threshold 39b (see FIG. 1C), then the model predicted classification 92a (see FIG. 1C) is accepted and applied. If the prediction quality rating metric 38b (see FIG. 1C) is less than the prediction quality rating metric threshold 39b (see FIG. 1C), then the model predicted classification 92a (see FIG. 1C) is rejected.

The computer implemented data driven classification and data quality checking system 10 (see FIG. 1C) may further comprise the star rating system 44 (see FIGS. 1C, 2) having a star rating 46 (see FIGS. 1C, 2) of one (1) or more stars 48 (see FIG. 2), and preferably from one (1) star 48a (see FIG. 2) to five (5) stars 48b (see FIG. 2), a star rating accuracy level 110 (see FIGS. 1C, 2) calculated for each star rating 46 (see FIGS. 1C, 2), and a star rating threshold 46a (see FIGS. 1C, 2) or minimum star rating. The star rating threshold 46a (see FIGS. 1C, 2) is determined based on an accuracy level 112 (see FIG. 2) required by a process 114 (see FIG. 2), that is, a process 114 (see FIG. 2), such as a technical industry process, requires that the predictive model 34b (see FIGS. 1C, 2) reach a minimum level of accuracy, where the minimum level of accuracy may be a high level of accuracy. The predictive model 34b (see FIG. 1C) normalizes the prediction quality rating metric 38b (see FIG. 1C) to the star rating system 44 (see FIG. 1C).

A star rating 46 (see FIG. 2) of one (1) star 48a (see FIG. 2) corresponds with or assigns a lowest rating 49a (see FIG. 2) to or representing weaknesses 94b (see FIG. 2) or a least likelihood of effectiveness for the predictive model 34b (see FIG. 1C) or the associative memory classifier 94a (see FIG. 2). A star rating 46 (see FIG. 2) of five (5) stars 48b (see FIG. 2) corresponds with or assigns a highest rating 49b (see FIG. 2) to or representing strengths 94c (see FIG. 2) or a most likelihood of effectiveness for the predictive model 34b (see FIG. 2) or the associative memory classifier 94a (see FIG. 2). An n average star rating 46 may be calculated for the predictive models 34b (see FIG. 2) or the associative memory classifiers 94a (see FIG. 2).

If the star rating 46 (see FIG. 2) is greater than or equal to the star rating threshold 46a (see FIG. 2), then information 18 (see FIG. 2) derived from the predictive model 34b (see FIG. 2) is accepted and may be automatically used or applied in the process 114 (see FIG. 2), such as used by an industry in making a technical or industry decision. If the star rating 46 (see FIG. 2) is less than the star rating threshold 46a (see FIG. 2), then the information 18 (see FIG. 2) derived from the predictive model 34b (see FIG. 2) is rejected or deferred or further reviewed, such as manually by a user, or automatically by an automated separate system, computer program, apparatus or device. A decision 115 (see FIG. 2) may thus be made on using the information 18 (see FIG. 2) derived from the predictive model 34b (see FIG. 2), based on the associated star ratings 46 (see FIG. 2). The computer implemented data driven classification and data quality checking system 10 (see FIG. 1C) allows the information 18 (see FIG. 2) derived from the predictive model 34b (see FIG. 2) to meet the accuracy level 112 (see FIG. 2) requirements of the process 114 (see FIG. 2) by selecting the high performing segments.

In addition, if the star rating 46 (see FIG. 2) is greater than or equal to the star rating threshold 46a (see FIG. 2), then the model predicted classification 92a (see FIG. 2) or the associative memory classification 92c (see FIG. 2) is accepted and may be automatically used and applied in the process 114 (see FIG. 2), such as used by an industry in making a technical or industry decision. In addition, if the star rating 46 (see FIG. 2) is less than the star rating threshold 46a (see FIG. 2), then the model predicted classification 92a (see FIG. 1C) or the associative memory classification 92c (see FIG. 1C) is rejected or deferred or further reviewed, such as manually by a user, or automatically by an automated separate system, computer program, apparatus or device. A decision 115 (see FIG. 2) is thus made on using the model predicted classification 92a (see FIG. 2) or the associative memory classification 92c (see FIG. 2), based on the associated star ratings 46 (see FIG. 2).

The computer implemented data driven classification and data quality checking system 10 (see FIG. 1C) further comprises a computer system 60 (see FIGS. 1C, 8) having one or more computers 62 (see FIGS. 1C, 8) coupled to and enabling operation of the interface application 22 (see FIG. 1C) and the associative memory software 24 (see FIG. 1C).

In another embodiment there is provided a computer implemented data driven classification and data quality checking system 10 (see FIGS. 1A-1C). The computer implemented data driven classification and data quality checking system 10 (see FIGS. 1A-1C) preferably improves the accuracy 12 (see FIG. 1A) and the quality 14 (see FIG. 1A) of received data 16a (see FIG. 1A) and preferably establishes the correctness 93 (see FIGS. 1B-1C) of a predictive model 34b (see FIG. 1C).

The computer implemented data driven classification and data quality checking system 10 (see FIGS. 1A-1C) comprises a computer system 60 (see FIGS. 1A, 8) having one or more computers 62 (see FIGS. 1A, 8) coupled to and enabling operation of the interface application 22 (see FIG. 1A) coupled to the associative memory software 24 (see FIG. 1A). The interface application 22 (see FIG. 1A) is enabled to receive data 16 (see FIG. 1A). The associative memory software 24 (see FIG. 1A) incorporates an associative memory 28 (see FIG. 1A) and a machine learning algorithm 30 (see FIG. 1A) enabled to identify a plurality of associations 32 (see FIG. 1A), such as patterns of similarities 33 (see FIG. 1A), in the received data 16a (see FIG. 1A).

The computer implemented data driven classification and data quality checking system 10 (see FIGS. 1A-1C) further comprises a domain vocabulary processing tool 120 (see FIG. 1A) in communication with the interface application 22 (see FIG. 1A) and coupled to the associative memory 28 (see FIG. 1A, 5) of the associative memory software 24 (see FIG. 1A). The domain vocabulary processing tool 120 (see FIG. 1A) is preferably configured to extract relevant domain-specific terms 122a (see FIG. 5) and domain-specific phrases 124a (see FIG. 5), and their respective variant terms 122b (see FIG. 5) and variant phrases 124b (see FIG. 5), from a remaining free text data 16i (see FIG. 5) or a remaining source text 121a (see FIG. 5), which have been parsed. The domain vocabulary processing tool 120 (see FIG. 5) is further configured to normalize the domain-specific terms 122a (see FIG. 5) and the domain-specific phrases 124a (see FIG. 5), and their respective variant terms 122b (see FIG. 5) and variant phrases 124b (see FIG. 5), into canonical designations 126a (see FIG. 5) and corresponding variants 126b (see FIG. 5) for input 15 (see FIG. 1A) into the associative memory 28 (see FIG. 5).

The computer implemented data driven classification and data quality checking system 10 (see FIG. 1A) further comprises a control set 128 (see FIG. 7) in communication with the interface application 22 (see FIG. 1A) and coupled to the associative memory 28 (see FIG. 1A, 5) of the associative memory software 24 (see FIG. 1A). The control set 128 (see FIG. 7) is formed by a control set tool 128a (see FIG. 7) and a control set process 128b (see FIG. 7). The control set 128 (see FIG. 7) comprises a diverse data set 17b (see FIG. 7), and the control set 128 (see FIG. 7) is configured to classify new data sets 17b (see FIG. 7). The diverse data set 17b (see FIG. 7) may be formed from a plurality of records 158 (see FIG. 7) and unscored records 158d (see FIG. 7). The diverse data set 17b (see FIG. 7) preferably comprises a plurality of predefined data 16j (see FIG. 7) from a plurality of relevant categories 42b (see FIG. 7) generated by the associative memory 28 (see FIG. 7) and a plurality of nonassociated data 16l (see FIG. 7) not associated with the plurality of relevant categories 42b (see FIG. 7), defining a canonical phrase data set 17d (see FIG. 7) representative of canonical phrases 178 (see FIG. 7) associated with the associative memory 28 (see FIG. 7).

The computer implemented data driven classification and data quality checking system 10 (see FIGS. 1A-1C) further comprises a data driven associative memory model 34a (see FIGS. 1A-1C) learned using the associative memory software 24 (see FIGS. 1A-1C) and configured to categorize one or more fields 36 (see FIG. 1A) of the received data 16a (see FIG. 1A). The data driven associative memory model 34a (see FIGS. 1B-1C) comprises a predictive model 34b (see FIGS. 1B-1C) configured to predict a model predicted classification 92a (see FIGS. 1B-1C) for a classification 92 (see FIGS. 1B-1C) of an instance 98 (see FIGS. 1B-1C) of the received data 16a (see FIGS. 1B-1C).

The computer implemented data driven classification and data quality checking system 10 (see FIGS. 1A-1C) further comprises one or more quality rating metrics 38 (see FIGS. 1A-1C). One quality rating metric 38 (see FIGS. 1A-1C) includes or comprises a data quality rating metric 38a (see FIG. 1A) calculated by the data driven associative memory model 34a (see FIG. 1A), as a function of comparing the received data 16a (see FIG. 1A) with a pool of neighboring data 40 (see FIG. 1A) in the category 42 (see FIG. 1A) of field 36 (see FIG. 1A) of the received data 16a (see FIG. 1A). Another quality rating metric 38 includes or comprises a prediction quality rating metric 38b (see FIGS. 1B-1C) calculated by the predictive model 34b (see FIGS. 1B-1C) to include measurements 108 (see FIGS. 1B-1C) of a strength 108a (see FIGS. 1B-1C) and an assurance 108b (see FIGS. 1B-1C) that establish a correctness 93 (see FIGS. 1B-1C) of the model predicted classification 92a (see FIGS. 1B-1C).

The computer implemented data driven classification and data quality checking system 10 (see FIGS. 1A-1B) further comprises a machine learning data quality checker 54 (see FIGS. 1A-1B) for the received data 16a (see FIG. 1A), enabled by the data driven associative memory model 34a (see FIGS. 1A-1B) and coupled to the interface application 22 (see FIGS. 1A-1B). The machine learning data quality checker 54 (see FIGS. 1A-1B) is configured to accept the received data 16a (see FIG. 1A) and add the received data 16a (see FIG. 1A) to the pool of neighboring data 40 (see FIG. 1A), if the data quality rating metric 38a (see FIG. 1A) is greater than or equal to a data quality rating metric threshold 39a (see FIG. 1A). The machine learning data quality checker 54 (see FIG. 1B) is further configured to accept and apply the model predicted classification 92a (see FIG. 1B), if the correctness 93 (see FIG. 1B) of the model predicted classification 92a (see FIG. 1B) is established, and if the prediction quality rating metric 38b (see FIG. 1B) is greater than or equal to a prediction quality rating metric threshold 39b (see FIG. 1B).

The machine learning data quality checker 54 (see FIGS. 1A-1B) is further configured to generate and communicate via the interface application 22 (see FIG. 1A), an indication 57 (see FIG. 1A), such as an alert 58a (see FIG. 1A), of a potential error 56a (see FIG. 1A) in the received data 16a (see FIG. 1A) in the category 42 (see FIG. 1A) of field 36 (see FIG. 1A) of received data 16a (see FIG. 1A), if the data quality rating metric 38a (see FIG. 1A) is less than the data quality rating metric threshold 39a (see FIG. 1A). The indication 57 (see FIG. 1A), such as the alert 58a (see FIG. 1A), may be generated via an alert mechanism 59 (see FIG. 1A), such as in the form of a signal, a display, a textual or graphical warning, or some other suitable alert mechanism.

The machine learning data quality checker 54 (see FIG. 1B) is further configured to generate and communicate via the interface application 22 (see FIG. 1B), an indication 57 (see FIG. 1B), such as an alert 58b (see FIG. 1B) of a classification potential error 56b (see FIG. 1B) in the classification 92 (see FIG. 1B) of the instance 98 (see FIG. 1B) of the received data 16a (see FIG. 1B), if the correctness of the model predicted classification 92a (see FIG. 1B) is not established, or if the prediction quality rating metric 38b (see FIG. 1B) is less than the prediction quality rating metric threshold 39b (see FIG. 1B). In addition, the machine learning data quality checker 54 (see FIG. 1B) may be further configured to generate and communicate via the interface application 22 (see FIG. 1B), an indication 57 (see FIG. 1B), such as an alert 58b (see FIG. 1B) of a classification potential error 56b (see FIG. 1B) in the classification 92 (see FIG. 1B) of the instance 98 (see FIG. 1B) of the received data 16a (see FIG. 1B), if an entered classification 92b (see FIG. 1B) (such as automatically entered by an automated separate system, computer program, apparatus, or device, or manually entered by a user or analyst) does not equal the model predicted classification 92a (see FIG. 1B), for example, if there is a disagreement 96 (see FIG. 1B) between the model predicted classification 92a (see FIG. 1B) and the entered classification 92b (see FIG. 1B), and a star rating 46 (see FIG. 2) is five (5) stars 48b (see FIG. 2).

The computer implemented data driven classification and data quality checking system 10 (see FIGS. 1A-1C) further comprises a star rating system 44 (see FIGS. 1A-1C) comprising star ratings 46 (see FIGS. 1A-1C) of one or more stars 48 (see FIGS. 1A-1C). The data driven associative memory model 34a (see FIGS. 1A-1C) normalizes the one or more quality rating metrics 38 (see FIGS. 1A-1C) to the star rating system 44 (see FIGS. 1A-1C). The star rating system 44 (see FIGS. 1A-1C) further comprises a star rating accuracy level 110 (see FIG. 2) calculated for each star rating 46 (see FIG. 2), and a star rating threshold 46a (see FIG. 2 required that is determined based on an accuracy level 112 (see FIG. 2) required by a process 114 (see FIG. 2). If the star rating 46 (see FIG. 2) is greater than or equal to the star rating threshold 46a (see FIG. 2) required, then the process 114 (see FIG. 1C) accepts and uses information 18 (see FIG. 2) derived from the model predicted classification 92a (see FIG. 2). If the star rating 46 (see FIG. 2) is less than the star rating threshold 46a (see FIG. 2) required, then the process 114 (see FIG. 2) rejects the model predicted classification 92a (see FIG. 2).

The computer implemented data driven classification and data quality checking system 10 (see FIG. 1A) further comprises a cluster-based batch classification entry tool 116 (see FIGS. 1A, 4) in communication with the interface application 22 (see FIG. 1A) and coupled to the associative memory 28 (see FIG. 1A) of the associative memory software 24 (see FIG. 1A). The cluster-based batch classification entry tool 116 (see FIGS. 1A, 4) is configured to receive a set of matching records 188 (see FIG. 4) that are similarly grouped in a plurality of clusters 118 (see FIG. 4), and further configured to enable batch classifying 119a (see FIG. 4) and batch evaluating 119b (see FIG. 4) of the set of matching records 188 (see FIG. 4) in the plurality of clusters 118 (see FIG. 4) simultaneously, providing a consistent classification 92e (see FIG. 4) for the set of matching records 188 (see FIG. 4).

Figure 9:
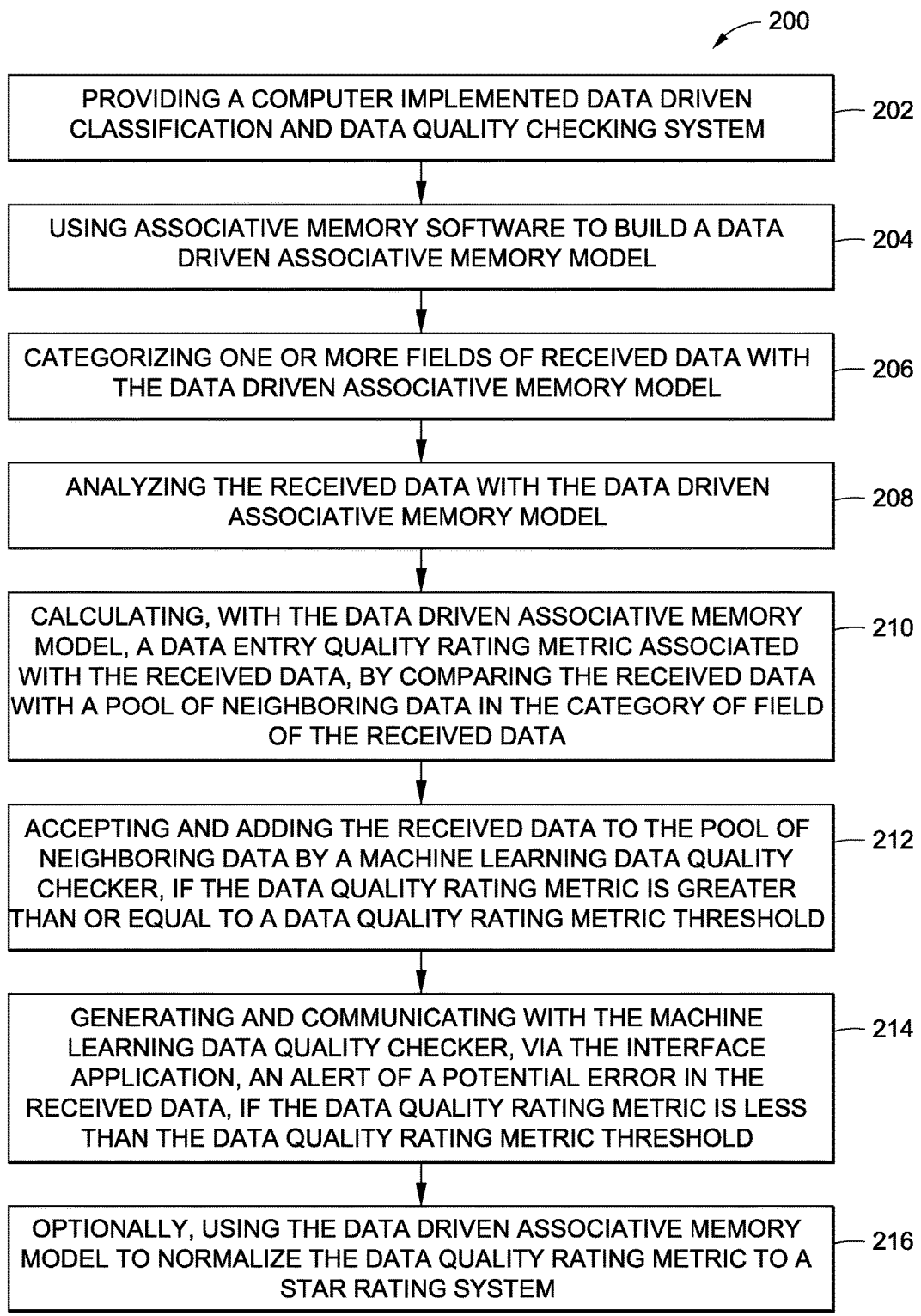
FIG. 9 is an illustration of a flow diagram showing an exemplary embodiment of a method of the disclosure.

Referring to FIG. 9, in another embodiment, there is provided a method 200 for improving accuracy 12 (see FIG. 1A) and quality 14 (see FIG. 1A) of received data 16a (see FIG. 1A). FIG. 9 is an illustration of a flow diagram showing an exemplary embodiment of the method 200 of the disclosure.

As shown in FIG. 9, the method 200 comprises the step 202 of providing a computer implemented data driven classification and data quality checking system 10 (see FIGS. 1A-1C) having or comprising an interface application 22 (see FIGS. 1A-1C) in communication with an associative memory software 24 (see FIGS. 1A-1C), via an application programming interface (API) 26 (see FIGS. 1A-1C), operating on one or more computers 62 (see FIGS. 1A-1C, 8).

As shown in FIG. 9, the method 200 further comprises the step 204 of using the associative memory software 24 (see FIGS. 1A-1C) to build a data driven associative memory model 34a (see FIGS. 1A-1B) that enables a machine learning data quality checker 54 (see FIGS. 1A-1B) for receiving data 16 (see FIGS. 1A-1C).

As shown in FIG. 9, the method 200 further comprises the step 206 of categorizing one or more fields 36 (see FIG. 1A) of received data 16a (see FIG. 1A) with the data driven associative memory model 34a (see FIG. 1A).

As shown in FIG. 9, the method 200 further comprises the step 208 of analyzing the received data 16a (see FIG. 1A) with the data driven associative memory model 34a (see FIG. 1A). As shown in FIG. 9, the method 200 further comprises the step 210 of calculating, with the data driven associative memory model 34a (see FIG. 1A), a quality rating metric 38 (see FIG. 1A), such as in the form of a data quality rating metric 38a (see FIG. 1A), associated with the received data 16a (see FIG. 1A). The quality rating metric 38 (see FIG. 1A), such as in the form of a data quality rating metric 38a (see FIG. 1A), associated with the received data 16a (see FIG. 1A) is based on comparing the received data 16a (see FIG. 1A) with a pool of neighboring data 40 (see FIG. 1A) in the category 42 (see FIG. 1A) of field 36 (see FIG. 1A) of the received data 16a (see FIG. 1A).

As shown in FIG. 9, the method 200 further comprises the step 212 accepting and adding the received data 16a (see FIG. 1A) to the pool of neighboring data 40 (see FIG. 1A) by a machine learning data quality checker 54 (see FIG. 1A), if the data quality rating metric 38a (see FIG. 1A) is greater than or equal to a data quality rating metric threshold 39a (see FIG. 1A).

As shown in FIG. 9, the method 200 further comprises the step 214 of generating and communicating with the machine learning data quality checker 54 (see FIG. 1A), via the interface application 22 (see FIG. 1A), an indication 57 (see FIG. 1A), such as an alert 58a (see FIG. 1A), of a potential error 56a (see FIG. 1A) in the received data 16a (see FIG. 1A) in the category 42 (see FIG. 1A) of field 36 (see FIG. 1A) of the received data 16a (see FIG. 1A), if the data quality rating metric 38a (see FIG. 1A) is less than the data quality rating metric threshold 39a (see FIG. 1A).

The step 214 of generating and communicating with the machine learning data quality checker 54 (see FIG. 1A), may further comprise providing by the data driven associative memory model 34a (see FIG. 1A), via the interface application 22 (see FIG. 1A), reference samples 40a (see FIG. 1A) of the pool of neighboring data 40 (see FIG. 1A), and suggestions 90 (see FIG. 1A) of a more relevant category 42a (see FIG. 1A) of field 36 (see FIG. 1A) of the received data 16a (see FIG. 1A).

As shown in FIG. 9, the method 200 may further comprise after the step 214 of generating and communicating with the machine learning data quality checker 54 (see FIG. 1A), the step 216 of optionally, using the data driven associative memory model 34a (see FIG. 1A) to normalize the data quality rating metric 38a (see FIG. 1A) to a star rating system 44 (see FIGS. 1A, 2) having star ratings 46 (see FIG. 2) comprising a star number range 47 (see FIG. 2) of stars 48 (see FIG. 2) numbering from one (1) star 48a (see FIG. 2) to five (5) stars 48b (see FIG. 2). The star rating 46 (see FIG. 2) of one (1) star 48a (see FIG. 2) represents a least association 50 (see FIG. 2) of the received data 16a (see FIG. 2) with the category 42 (see FIG. 2) of field 36 (see FIG. 2) of the received data 16a (see FIG. 2), and the star rating 46 (see FIG. 2) of five (5) stars 48b (see FIG. 2) represents a most association 52 (see FIG. 2) of the received data 16a (see FIG. 2) with the category 42 (see FIG. 2) of field 36 (see FIG. 2) of the received data 16a (see FIG. 2).

In the embodiment where the quality rating metric 38 (see FIG. 1B) is a prediction quality rating metric 38b (see FIG. 1B), the method 200 may further comprise the steps of: using the data driven associative memory model 34a (see FIG. 1B) comprising a predictive model 34b (see FIG. 1B) to predict a model predicted classification 92a (see FIG. 1B) for a classification 92 (see FIG. 1B) of an instance 98 (see FIG. 1B) of the received data 16a (see FIG. 1B) and to make predictive model decisions 35 (see FIG. 2); calculating a prediction quality rating metric 38b (see FIG. 1B) with the predictive model 34b (see FIG. 1B) to include measurements 108 (see FIG. 1B) of a strength 108a (see FIG. 1B) and an assurance 108b (see FIG. 1B) that establish a correctness 93 (see FIG. 1B) of the model predicted classification 92a (see FIG. 1B); and generating and communicating with the machine learning data quality checker 54 (see FIG. 1B), via the interface application 22 (see FIG. 1B), an indication 57 (see FIG. 1B), such as an alert 58b (see FIG. 1B) of a classification potential error 56b (see FIG. 1B) in the classification 92 (see FIG. 1B) of the instance 98 (see FIG. 1B), if the correctness 93 (see FIG. 1B) of the model predicted classification 92a (see FIG. 1B) is not established.

The method 200 may further comprise entering an entered classification 92b (see FIG. 1B) for the classification 92 (see FIG. 1B) of the instance 98 (see FIG. 1B) of received data 16a (see FIG. 1B), and the machine learning data quality checker 54 (see FIG. 1B) generating and communicating the indication 57 (see FIG. 1B), such as the alert 58b (see FIG. 1B), of the classification potential error 56b (see FIG. 1B) in the classification 92 (see FIG. 1B) of the instance 98 (see FIG. 1B), if the entered classification 92b (see FIG. 1B) does not equal the model predicted classification 92a (see FIG. 1B), for example, there is a disagreement 96 (see FIG. 1B) between the model predicted classification 92a (see FIG. 1B) and the entered classification 92b (see FIG. 1B), and the star rating 46 (see FIG. 2) is five (5) stars 48b (see FIG. 2).

In the embodiment where the prediction model 34b (see FIG. 1C) is segmented using the star rating accuracy levels 110 (see FIGS. 1C, 2) of the star rating system 44 (see FIGS. 1C, 2), the method 200 may further comprise the steps of: using the data driven associative memory model 34a (see FIG. 1C), such as in the form of predictive model 34b (see FIG. 1C), to predict the model predicted classification 92a (see FIG. 1C) for the classification 92 (see FIG. 1C) of the instance 98 (see FIG. 1C) of received data 16a (see FIG. 1C). The data driven associative memory model 34a (see FIG. 1C) is used to calculate the prediction quality rating metric 38b (see FIG. 1C) including measurements 108 (see FIG. 1C) of the strength 108a (see FIG. 1C) and the assurance 108b (see FIG. 1C) that establish the correctness 93 (see FIG. 1C) of the model predicted classification 92a (see FIG. 1C).

The data driven associative memory model 34a (see FIG. 1C), such as in the form of predictive model 34b (see FIG. 1C), is further used to normalize the prediction quality rating metric 38b (see FIG. 1C), associated with the model predicted classification 92a (see FIG. 1C), to the star rating system 44 (see FIGS. 1C, 2) having the star ratings 46 (see FIG. 2) of one or more stars 48 (see FIG. 2) and a star rating accuracy level 110 (see FIG. 2) for each star rating 46 (see FIG. 2); determining a prediction quality rating metric threshold 39b (see FIG. 1B) based on an accuracy level 112 (see FIG. 2) required for the predictive model 34b (see FIG. 2) or based on an accuracy level 112 (see FIG. 2) required by a process 114 (see FIG. 2) in order to make a decision 115 (see FIG. 2); accepting and applying the model predicted classification 92a (see FIG. 1C), if the prediction quality rating metric 38b (see FIG. 1C) is greater than or equal to the prediction quality rating metric threshold 39b (see FIG. 1C); and rejecting the model predicted classification 92a (see FIG. 1C), if the prediction quality rating metric 38b (see FIG. 1C) is less than the prediction quality rating metric threshold 39b (see FIG. 1C).

In addition, a process 114 (see FIG. 1C) may automatically use the model predicted classification 92a (see FIG. 1C), if the star rating 46 (see FIG. 1C) is greater than or equal to a star rating threshold 46a (see FIG. 2) required, and the process 114 (see FIG. 1C) rejects the model predicted classification 92a (see FIG. 1C), if the star rating 46 (see FIG. 1C) is less than the star rating threshold 46a (see FIG. 2) required.

The step 202 (see FIG. 9) of providing the computer implemented data driven classification and data quality checking system 10 (see FIG. 1A) may further comprise the step of providing a domain vocabulary processing tool 120 (see FIGS. 1A, 5) coupled to the associative memory 28 (see FIGS. 1A, 6) of the associative memory software 24 (see FIG. 1A) and in communication with the interface application 22 (see FIG. 1A). The domain vocabulary processing tool 120 (see FIGS. 1A, 5) is configured to review free text data 16h (see FIGS. 5, 6) or source text 121 (see FIG. 5), to extract relevant domain-specific terms 122a (see FIG. 5) and domain-specific phrases 124a (see FIG. 5), and their respective variant terms 122b (see FIG. 5) and variant phrases 124b (see FIG. 5), from a remaining free text data 16i (see FIGS. 5, 6) or a remaining source text 121a (see FIG. 5), that have been parsed. The domain vocabulary processing tool 120 (see FIGS. 1A, 5) is further configured to normalize the domain-specific terms 122a (see FIG. 5) and the domain-specific phrases 124a (see FIG. 5), and their respective variant terms 122b (see FIG. 5) and variant phrases 124b (see FIG. 5), into canonical designations 126a (see FIGS. 5, 6) and corresponding variants 126b (see FIGS. 5, 6) to create a domain vocabulary 134 (see FIGS. 5, 6) for input 15 (see FIG. 1A) into the associative memory 28 (see FIGS. 5, 6) of the associative memory software 24 (see FIG. 1A).

After the review of the free text data 16h (see FIGS. 5, 6) or source text 121 (see FIG. 5), the domain vocabulary processing tool 120 (see FIGS. 1A, 5) is further configured to eliminate definite articles 136a (see FIG. 5) and indefinite articles 136b (see FIG. 5) from the free text data 16h (see FIG. 5) or the source text 121 (see FIG. 5); and to eliminate conjunctions 138 (see FIG. 5), punctuations 140 (see FIG. 5), words 142 (see FIG. 5), a plurality of predefined nonessential terms 144 (see FIG. 5), spaces 146 (see FIG. 5), characters 148 (see FIG. 5), and other suitable nonessential terms or characters from the free text data 16h (see FIG. 5) or the source text 121 (see FIG. 5).

The step 202 (see FIG. 9) of providing the computer implemented data driven classification and data quality checking system 10 (see FIG. 1A) may further comprise the step of providing a control set 128 (see FIGS. 1A, 7) formed by a control set tool 128a (see FIG. 7) and a control set process 128b (see FIG. 7), and in communication with the interface application 22 (see FIG. 1A) and coupled to the associative memory 28 (see FIG. 1A, 7) of the associative memory software 24 (see FIG. 1A). The control set 128 (see FIG. 7) comprises a diverse data set 17b (see FIG. 7) and is configured to classify new data sets 17c (see FIG. 7).

As shown in FIG. 7, the diverse data set 17b may be formed from a plurality of records 158 and a plurality of unscored records 158d. The diverse data set 17b (see FIG. 7) preferably comprises a plurality of predefined data 16j (see FIG. 7) from a plurality of relevant categories 42b (see FIG. 7) generated by the associative memory 28 (see FIG. 7), and a plurality of nonassociated data 16l (see FIG. 7) not associated with the plurality of relevant categories 42b (see FIG. 7), and defining a canonical phrase data set 17d (see FIG. 7) representative of canonical phrases 178 (see FIG. 7) associated with the associative memory 28 (see FIG. 7).

The step 202 (see FIG. 9) of providing the computer implemented data driven classification and data quality checking system 10 (see FIG. 1A) may further comprise the step of providing a cluster-based batch classification tool 116 (see FIG. 4) in communication with the interface application 22 (see FIG. 1A) and coupled to the associative memory 28 (see FIG. 1A, 4) of the associative memory software 24 (see FIG. 1A). The cluster-based batch classification tool 116 (see FIG. 4) is configured to receive a set of matching records 188 (see FIG. 4) that are similarly grouped in a plurality of clusters 118 (see FIG. 4), and further configured to enable batch classifying 119*a* (see FIG. 4) and batch evaluating 119*b* (see FIG. 4) of the set of matching records 188 (see FIG. 4) in the plurality of clusters 118 (see FIG. 4) simultaneously, providing a consistent classification 92*e* (see FIG. 4) for the set of matching records 188 (see FIG. 4).

The step of providing the cluster-based batch classification tool 116 (see FIG. 4) further comprises using the associative memory 28 (see FIG. 4) to refine any records needing further search refinement 188*b* (see FIG. 4), and to return similar records sorted in descending order of similarity 158*k* (see FIG. 4), allowing for additional batch classifying 119*a* (see FIG. 4) and batch evaluating 119*b* (see FIG. 4). The step of providing the cluster-based batch classification tool 116 and using the associative memory 28 may further comprise the step of generating an output a plurality of records that have been subject to batch classifying and batch evaluating of the similar or matching records, to provide improved accuracy of the classified records, and decreased labor hours and support costs achieved through classifying batches of records.

The step 202 (see FIG. 9) of providing the computer implemented data driven classification and data quality checking system 10 (see FIG. 1A) may further comprise the step of providing a computer system 60 (see FIGS. 1A-1C, 8) having one or more computers 62 (see FIGS. 1A-1C, 8) coupled to and enabling operation of the interface application 22 (see FIGS. 1A-1C) and the associative memory software 24 (see FIGS. 1A-1C).

Figure 10:
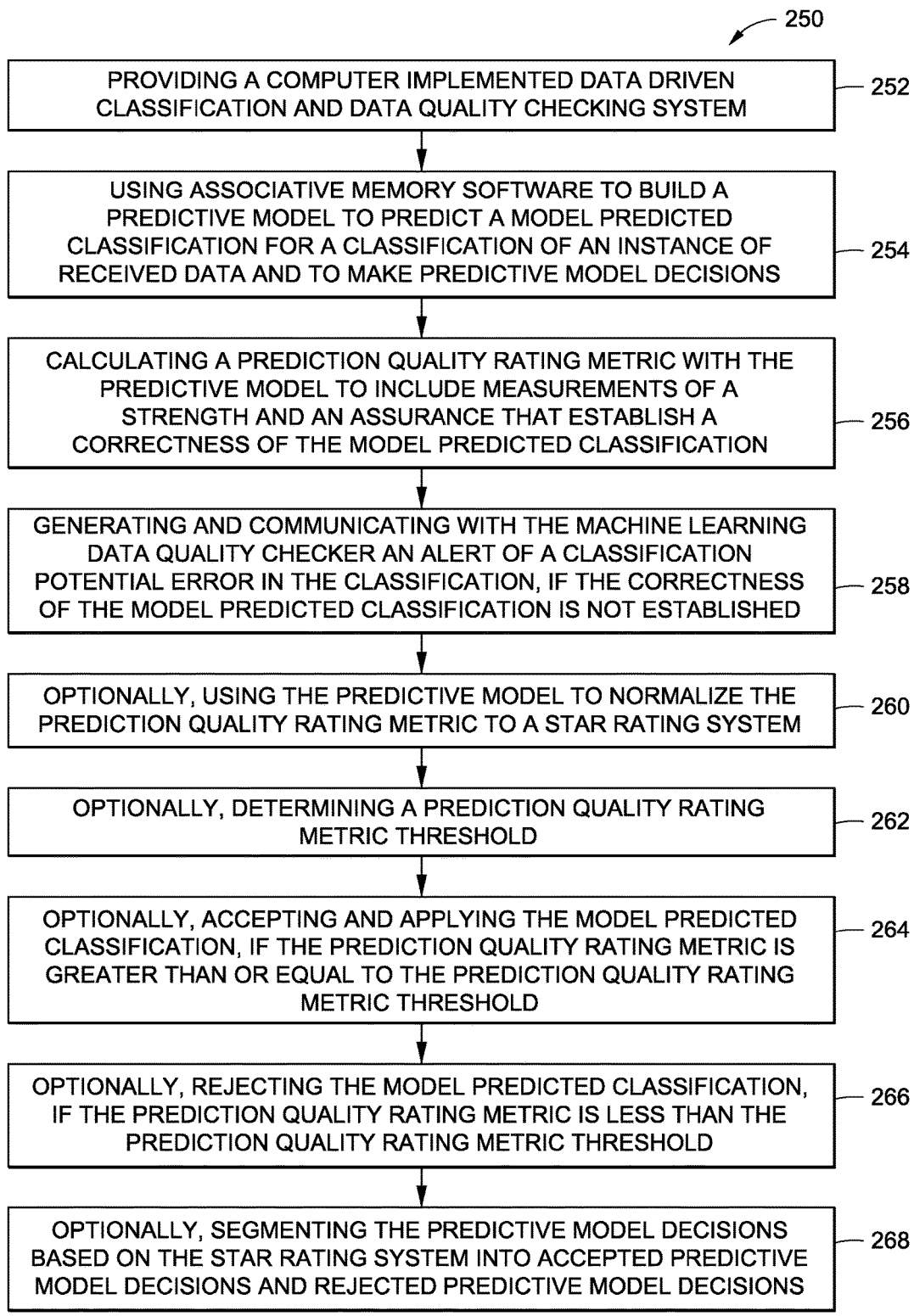
FIG. 10 is an illustration of a flow diagram showing an exemplary embodiment of another method of the disclosure.

Referring to FIG. 10, in another embodiment, there is provided a method 250 for establishing a correctness 93 (see FIGS. 1C, 2) of classifications 92 (see FIGS. 1C, 2), such as model predicted classifications 92*a* (see FIGS. 1C, 2), of the predictive model 34*b* (see FIGS. 1C, 2). FIG. 10 is an illustration of a flow diagram showing an exemplary embodiment of the method 250 of the disclosure.

As shown in FIG. 10, the method 250 comprises the step 252 of providing a computer implemented data driven classification and data quality checking system 10 (see FIGS. 1B-1C) having or comprising an interface application 22 (see FIGS. 1B-1C) in communication with an associative memory software 24 (see FIGS. 1B-1C), via an application programming interface (API) 26 (see FIGS. 1B-1C), operating on one or more computers 62 (see FIGS. 1B-1C, 8).

As shown in FIG. 10, the method 250 further comprises the step 254 of using the associative memory software 24 (see FIGS. 1B-1C) to build the predictive model 34*b* (see FIGS. 1C, 2) to predict a model predicted classification 92*a* (see FIGS. 1C, 2) for a classification 92 (see FIGS. 1C, 2) of an instance 98 (see FIGS. 1C, 2) of the received data 16*a* (see FIGS. 1C, 2) and to make predictive model decisions 35 (see FIGS. 1C, 2).

As shown in FIG. 10, the method 250 further comprises the step 256 of calculating a prediction quality rating metric 38*b* (see FIGS. 1B-1C, 2) with the predictive model 34*b* (see FIGS. 1B-1C, 2) to include measurements 108 (see FIGS. 1B-1C) of a strength 108*a* (see FIGS. 1B-1C) and an assurance 108*b* (see FIGS. 1B-1C) that establish a correctness 93 (see FIGS. 1B-1C) of the model predicted classification 92*a* (see FIGS. 1B-1C).

As shown in FIG. 10, the method 250 further comprises the step 258 of generating and communicating with the machine learning data quality checker 54 (see FIG. 1B), via the interface application 22 (see FIG. 1B), an indication 57 (see FIG. 1B), such as an alert 58*b* (see FIG. 1B), of a classification potential error 56*b* (see FIG. 1B) in the classification 92 (see FIG. 1B) of the instance 98 (see FIG. 1B), if the correctness 93 (see FIG. 1B) of the model predicted classification 92*a* (see FIG. 1B) is not established.

As shown in FIG. 10, the method 250 may further comprise the step 260 of optionally, using the predictive model 34*b* (see FIG. 1B) to normalize the prediction quality rating metric 38*b* (see FIG. 1B), associated with the model predicted classification 92*a* (see FIG. 1B), to the star rating system 44 (see FIGS. 1B, 2). As discussed in detail above, the star rating system 44 (see FIGS. 1B, 2) preferably has star ratings 46 (see FIG. 2) of one or more stars 48 (see FIG. 2) and a star rating accuracy level 110 (see FIG. 2) for each star rating 46 (see FIG. 2).

As shown in FIG. 10, the method 250 further comprises the step 262 of optionally, determining a prediction quality rating metric threshold 39*b* (see FIGS. 1B-1C) based on an accuracy level 112 (see FIG. 2) required for the predictive model 34*b* (see FIGS. 1C, 2), such as required by a process 114 (see FIG. 2) or technical industry model. As shown in FIG. 10, the method 250 further comprises the step 264 of optionally, accepting and applying the model predicted classification 92*a* (see FIGS. 1B-1C), if the prediction quality rating metric 38*b* (see FIGS. 1B-1C) is greater than or equal to the prediction quality rating metric threshold 39*b* (see FIGS. 1B-1C).

As shown in FIG. 10, the method 250 further comprises the step 266 of optionally, rejecting the model predicted classification 92*a* (see FIGS. 1B-1C), if the prediction quality rating metric 38*b* (see FIGS. 1B-1C) is less than the prediction quality rating metric threshold 39*b* (see FIGS. 1B-1C). As shown in FIG. 10, the method 250 further comprises the step 268 of optionally, segmenting the predictive model decisions 35 (see FIGS. 1C, 2) based on the star rating system 44 (see FIGS. 1C, 2) into accepted predictive model decisions 35*b* (see FIG. 2) and rejected predictive model decisions 35*c* (see FIG. 2), discussed in detail above with respect to FIG. 1C and FIG. 2.

The method 250 (see FIG. 10) may further comprise the steps of using the predictive model 34*b* (see FIGS. 1B, 1C) to normalize the prediction quality rating metric 38*b* (see FIGS. 1B, 1C), associated with the model predicted classification 92*a* (see FIGS. 1B, 1C), to a star rating system 44 (see FIGS. 1B, 1C) having star ratings 46 (see FIG. 1C) of one or more stars 48 (see FIG. 2) and a star rating accuracy level 110 (see FIGS. 1C, 2) for each star rating 46 (see FIGS. 1C, 2); determining a prediction quality rating metric threshold 39*b* (see FIGS. 1B, 1C) based on an accuracy level 112 (see FIG. 2) required for the predictive model 34*b* (see FIG. 2); accepting and applying the model predicted classification 92*a* (see FIGS. 1C, 2), if the prediction quality rating metric 38*b* (see FIG. 1C) is greater than or equal to the prediction quality rating metric threshold 39*b* (see FIG. 1C); rejecting the model predicted classification 92*a* (see FIG. 1C), if the prediction quality rating metric 38*b* (see FIG. 1C) is less than the prediction quality rating metric threshold 39*b* (see FIG. 1C); and segmenting the predictive model decisions 35 (see FIG. 1C) based on the star rating system 44 (see FIGS. 1C, 2) into accepted predictive model decisions 35*b* (see FIG. 1C) and rejected predictive model decisions 35*c* (see FIG. 1C).

The method 250 (see FIG. 10) may further comprise the steps of determining a star rating threshold 46*a* (see FIG. 2) based on the accuracy level 112 (see FIG. 2) required for the predictive model 34*b* (see FIG. 2), such as required by a process 114, a technical industry model or a process requirement; accepting the model predicted classification 92a (see FIG. 2), or using information 18 (see FIG. 2) derived from the predictive model 34b (see FIG. 2), if the star rating 46 (see FIG. 2) is greater than or equal to the star rating threshold 46a (see FIG. 2); and rejecting the model predicted classification 92a (see FIG. 2), or rejecting or deferring the information 18 (see FIG. 2) derived from the predictive model 34b (see FIG. 2), if the star rating 46 (see FIG. 2) is less than the star rating threshold 46a (see FIG. 2).

The step 252 (see FIG. 10) of the method 250 (see FIG. 10) of providing the computer implemented data driven classification and data quality checking system 10 (see FIGS. 1A-1C) may further comprise providing one or more of the following, each discussed in detail above: a domain vocabulary processing tool 120 (see FIGS. 1A, 5) in communication with the interface application 22 (see FIG. 1A) and coupled to the associative memory 28 (see FIGS. 1A, 5) of the associative memory software 24 (see FIG. 1A); a control set 128 (see FIGS. 1A, 7) formed by a control set tool 128a (see FIG. 7) and a control set process 128b (see FIG. 7), and in communication with the interface application 22 (see FIG. 1A) and coupled to the associative memory 28 (see FIGS. 1A, 7) of the associative memory software 24 (see FIG. 1A); a cluster-based batch classification tool 116 (see FIGS. 1A, 4) in communication with the interface application 22 (see FIG. 1A) and coupled to the associative memory 28 (see FIGS. 1A, 4) of the associative memory software 24 (see FIG. 1A); and/or a computer system 60 (see FIGS. 1A, 8) having one or more computers 62 (see FIGS. 1A, 8) coupled to and enabling operation of the interface application 22 (see FIG. 1A) and the associative memory software 24 (see FIG. 1A).

Figure 11:
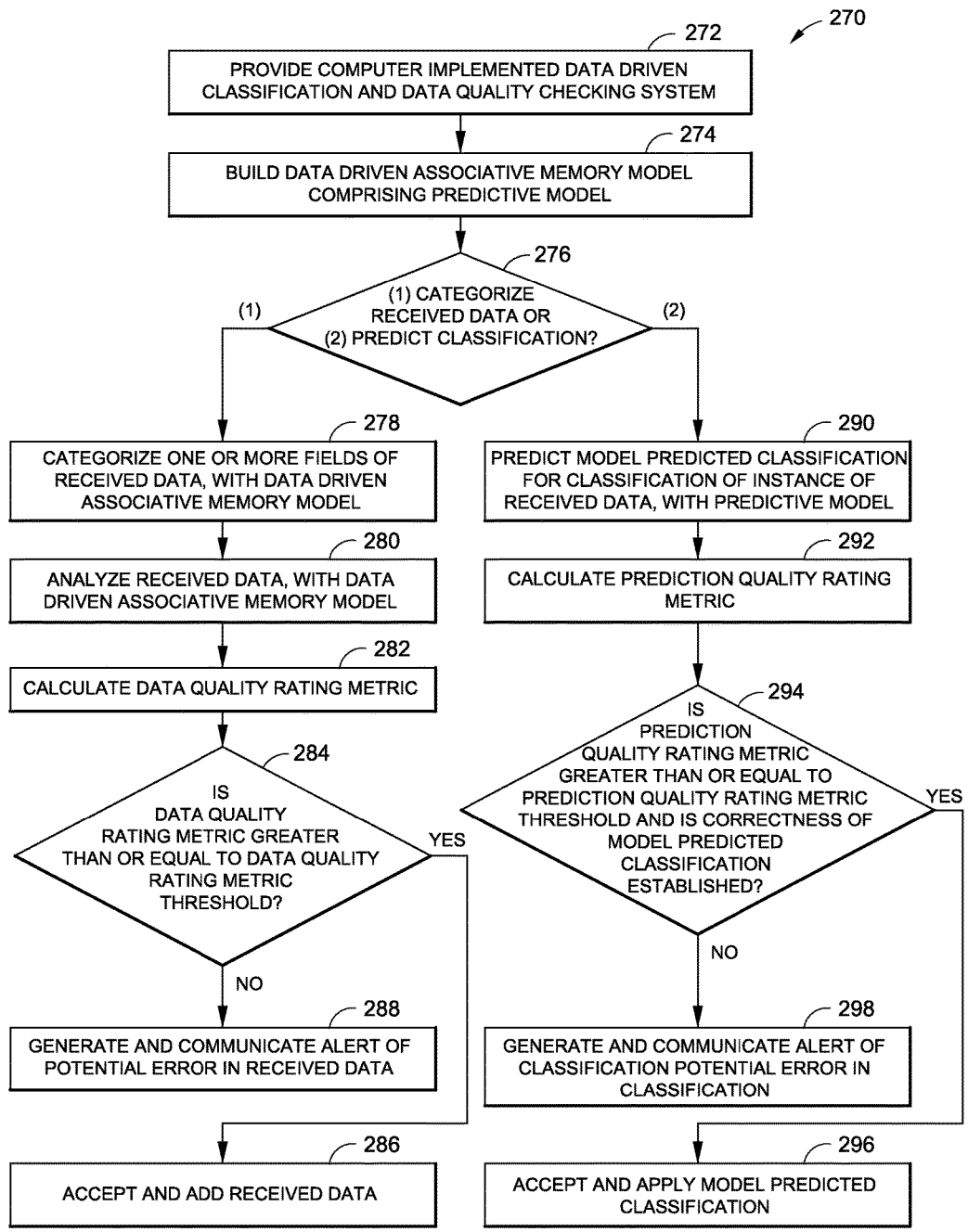
FIG. 11 is an illustration of a flow diagram showing an exemplary embodiment of another method of the disclosure.

Now referring to FIG. 11, in another embodiment there is provided a computer implemented data driven classification and data quality checking method 270. FIG. 11 is an illustration of a flow diagram showing an exemplary embodiment of the computer implemented data driven classification and data quality checking method 270 of the disclosure.

As shown in FIG. 11, the computer implemented data driven classification and data quality checking method 270 comprises beginning with the step 272 of providing an embodiment of a computer implemented data driven classification and data quality checking system 10 (see FIGS. 1A-1C), as discussed in detail above. The computer implemented data driven classification and data quality checking system 10 (see FIGS. 1A-1C) preferably comprises a computer system 60 (see FIG. 1A, 8) with one or more computers 62 (see FIGS. 1A-1C, 8) coupled to and enabling operation of an interface application 22 (see FIGS. 1A-1C). The interface application 22 (see FIGS. 1A-1C) is coupled to an associative memory software 24 (see FIGS. 1A-1C). The interface application 22 (see FIGS. 1A-1C) is preferably enabled to receive data 16 (see FIGS. 1A-1C). The associative memory software 24 (see FIGS. 1A-1C) incorporates an associative memory 28 (see FIGS. 1A-1C) and a machine learning algorithm 30 (see FIGS. 1A-1C) enabled to identify patterns of similarities 33 (see FIGS. 1A-1C) in the received data 16a (see FIGS. 1A-1C). The computer system 60 (see FIG. 8) is discussed in more detail above, with respect to FIG. 8.

The computer implemented data driven classification and data quality checking system 10 (see FIGS. 1A-1C) preferably further comprises a domain vocabulary processing tool 120 (see FIGS. 1A, 5) in communication with the interface application 22 (see FIG. 1A) and coupled to the associative memory 28 (see FIG. 1A) of the associative memory software 24 (see FIG. 1A). The domain vocabulary processing tool 120 (see FIGS. 1A, 5) is configured to extract relevant domain-specific terms 122a (see FIG. 5) and domain-specific phrases 124a (see FIG. 5), and their respective variant terms 122b (see FIG. 5) and variant phrases 124b (see FIG. 5), from a remaining free text data 16i (see FIG. 5) or a remaining source text 121a (see FIG. 5), which have been parsed. The domain vocabulary processing tool 120 (see FIG. 5) is further configured to normalize the domain-specific terms 122a (see FIG. 5) and the domain-specific phrases 124a (see FIG. 5), and their respective variant terms 122b (see FIG. 5) and variant phrases 124b (see FIG. 5), into canonical designations 126a (see FIG. 5) and corresponding variants 126b (see FIG. 5) for input 15 (see FIG. 5) into the associative memory 28 (see FIG. 5). The domain vocabulary processing tool 120 (see FIG. 5) is discussed in more detail above, with respect to FIG. 5.

The computer implemented data driven classification and data quality checking system 10 (see FIGS. 1A-1C) preferably further comprises a control set 128 (see FIGS. 1A, 7) in communication with the interface application 22 (see FIGS. 1A, 7) and coupled to the associative memory 28 (see FIGS. 1A, 7) of the associative memory software 24 (see FIGS. 1A, 7). The control set 128 (see FIG. 7) comprises a diverse data set 17b (see FIG. 7) and is configured to classify new data sets 17c (see FIG. 7). The diverse data set 17b (see FIG. 7) comprises a plurality of predefined data 16j (see FIG. 7) from a plurality of relevant categories 42b (see FIG. 7) generated by the associative memory 28 (see FIG. 7), and a plurality of nonassociated data 16l (see FIG. 7) not associated with the relevant categories 42b (see FIG. 7), defining a canonical phrase data set 17d (see FIG. 7) representative of canonical phrases 178 (see FIG. 7) associated with the associative memory 28 (see FIG. 7). The control set 128 (see FIG. 7) is discussed in more detail above, with respect to FIG. 7.

The step 272 (see FIG. 11) of the computer implemented data driven classification and data quality checking method 270 (see FIG. 11) of providing the computer implemented data driven classification and data quality checking system 10 (see FIG. 1A) may further comprise providing a star rating system 44 (see FIG. 2) comprising star ratings 46 (see FIG. 2) of one or more stars 48 (see FIG. 2). The data driven associative memory model 34a (see FIG. 1A) may normalize or transform the data quality rating metric 38a (see FIG. 2) to the star rating system 44 (see FIG. 2). In addition, the predictive model 34b (see FIG. 1B) may normalize or transform the prediction quality rating metric 38b (see FIG. 2) to the star rating system 44 (see FIG. 2). The star rating system 44 (see FIG. 2) preferably further comprises a star rating accuracy level 110 (see FIG. 2) calculated for each star rating 46 (see FIG. 2), and a star rating threshold 46a (see FIG. 2) based on an accuracy level 112 (see FIG. 2) required by a process 114 (see FIG. 2). The star rating system 44 (see FIG. 2) is discussed in more detail above, with respect to FIG. 2.

The computer implemented data driven classification and data quality checking method 270 (see FIG. 11) may further comprise using the star rating system 44 (see FIG. 2) to segment predictive model decisions 35 (see FIG. 2) by the predictive model 34b (see FIG. 2) into segmented predictive model decisions 35a (see FIG. 2) comprising accepted predictive model decisions 35b (see FIG. 2) and rejected predictive model decisions 35c (see FIG. 2). With the segmented predictive model 34c (see FIG. 2) and segmented predictive model decisions 35a (see FIG. 2), the data driven classification and data quality checking system 10 (see FIG.

1C) allows for partial utilization of the predictive model 34b (see FIG. 2) or classifier 94 (see FIG. 2), even if the predictive model's 34b (see FIG. 2) or classifier's 94 (see FIG. 2) overall accuracy 198 (see FIG. 2) is underperforming.

The step 272 (see FIG. 11) of the computer implemented data driven classification and data quality checking method 270 (see FIG. 11) of providing the computer implemented data driven classification and data quality checking system 10 (see FIG. 1A) may further comprise providing a cluster-based batch classification tool 116 (see FIGS. 1A, 4) in communication with the interface application 22 (see FIG. 1A) and coupled to an associative memory 28 (see FIGS. 1A, 4) of the associative memory software 24 (see FIG. 1A). The cluster-based batch classification tool 116 (see FIGS. 1A, 4) is preferably configured to receive a set of matching records 188 (see FIG. 4) that are similarly grouped in a plurality of clusters 118 (see FIG. 4), and further configured to enable batch classifying 119a (see FIG. 4) and batch evaluating 119b (see FIG. 4) of the set of matching records 188 (see FIG. 4) in the plurality of clusters 118 (see FIG. 4) simultaneously, providing a consistent classification 92e (see FIG. 4) for the set of matching records 188 (see FIG. 4). The cluster-based batch classification tool 116 (see FIG. 4) is discussed in more detail above, with respect to FIG. 4.

As shown in FIG. 11, the computer implemented data driven classification and data quality checking method 270 further comprises the step 274 of building a data driven associative memory model 34a (see FIGS. 1A-1B) comprising a predictive model 34b (see FIGS. 1B), learned using the associative memory software 24 (see FIGS. 1A-1B). The data driven associative memory model 34a (see FIGS. 1A-1B) enables the machine learning data quality checker 54 (see FIGS. 1A-1B) for receiving data 16 (see FIGS. 1A-1B).

As shown in FIG. 11, the computer implemented data driven classification and data quality checking method 270 further comprises the step 276 of the computer implemented data driven classification and data quality checking system 10 (see FIG. 1A) determining whether to: (1) categorize received data 16a (see FIG. 1A) or (2) predict a classification 92 (see FIG. 1B)? As shown in FIG. 11, if the computer implemented data driven classification and data quality checking system 10 decides to categorize the received data 16a (see FIG. 1A), the computer implemented data driven classification and data quality checking method 270 proceeds to step 278 of categorizing one or more fields 36 (see FIG. 1A) of received data 16a (see FIG. 1A), with the data driven associative memory model 34a (see FIG. 1A). As shown in FIG. 11, the computer implemented data driven classification and data quality checking method 270 further proceeds to step 280 of analyzing the received data 16a (see FIG. 1A), with the data driven associative memory model 34a (see FIG. 1A).

As shown in FIG. 11, the computer implemented data driven classification and data quality checking method 270 further proceeds to step 282 of calculating, with the data driven associative memory model 34a (see FIG. 1A), a data quality rating metric 38a (see FIG. 1A) associated with the received data 16a (see FIG. 1A), as a function of comparing the received data 16a (see FIG. 1A) with a pool of neighboring data 40 (see FIG. 1A) in the category 42 (see FIG. 1A) of field 36 (see FIG. 1A) of the received data 16a (see FIG. 1A).

As shown in FIG. 11, the computer implemented data driven classification and data quality checking method 270 further proceeds to step 284 of determining: is the data quality rating metric 38a (see FIG. 1A) greater than or equal to a data quality rating metric threshold 39a (see FIG. 1A)? As shown in FIG. 11, if the determination by the computer implemented data driven classification and data quality checking system 10 is "YES", that is, the data quality rating metric 38a (see FIG. 1A) is greater than or equal to a data quality rating metric threshold 39a (see FIG. 1A), then the computer implemented data driven classification and data quality checking method 270 proceeds to step 286 of accepting and adding the received data 16a (see FIG. 1A) to the pool of neighboring data 40 (see FIG. 1A). Thus, if the data quality rating metric 38a (see FIG. 1A) is greater than or equal to the data quality rating metric threshold 39a (see FIG. 1A), the machine learning data quality checker 54 (see FIG. 1A) for the received data 16a (see FIG. 1A), enabled by the data driven associative memory model 34a (see FIG. 1A), accepts and adds the received data 16a (see FIG. 1A) to the pool of neighboring data 40 (see FIG. 1A).

As shown in FIG. 11, if the determination by the computer implemented data driven classification and data quality checking system 10 is "NO", that is, the data quality rating metric 38a (see FIG. 1A) is not greater than or equal to a data quality rating metric threshold 39a (see FIG. 1A), then the computer implemented data driven classification and data quality checking method 270 proceeds to step 288 of generating and communicating with the machine learning data quality checker 54 (see FIG. 1A), via the interface application 22 (see FIG. 1A), an alert 58a (see FIG. 1A) of a potential error 56a (see FIG. 1A) in the received data 16a (see FIG. 1A). Thus, if the data quality rating metric 38a (see FIG. 1A) is less than the data quality rating metric threshold 39a (see FIG. 1A), the machine learning data quality checker 54 (see FIG. 1A), via the interface application 22 (see FIG. 1A), is configured to generate and communicate with an indication 57 (see FIG. 1A), such as an alert 58a (see FIG. 1A), of the potential error 56a (see FIG. 1A) in the received data 16a (see FIG. 1A) in the category 42 (see FIG. 1A) of field 36 (see FIG. 1A) of the received data 16a (see FIG. 1A).

The step 288 of generating and communicating by the machine learning data quality checker 54 (see FIG. 1A) may further comprise providing by the data driven associative memory model 34a (see FIG. 1A), via the interface application 22 (see FIG. 1A), reference samples 40a (see FIG. 1A) of the pool of neighboring data 40 (see FIG. 1A) and suggestions 90 (see FIG. 1A) of a more relevant category 42a (see FIG. 1A) of field 36 (see FIG. 1A) of the received data 16a (see FIG. 1A).

As shown in FIG. 11, if the computer implemented data driven classification and data quality checking system 10 decides to predict the classification 92 (see FIG. 1B), the computer implemented data driven classification and data quality checking method 270 proceeds to step 290 of predicting a model predicted classification 92a (see FIG. 1B) for the classification 92 (see FIG. 1B) of an instance 98 (see FIG. 1B) of the received data 16a (see FIG. 1B), and predicts the model predicted classification 92a (see FIG. 1B) with the predictive model 34b (see FIG. 1B). As shown in FIG. 11, the computer implemented data driven classification and data quality checking method 270 further proceeds to step 292 of calculating, with the predictive model 34b (see FIG. 1B), a prediction quality rating metric 38b (see FIG. 1B) to include measurements 108 (see FIG. 1B) of a strength 108a (see FIG. 1B) and an assurance 108b (see FIG. 1B) that establish a correctness 93 (see FIG. 1B) of the model predicted classification 92a (see FIG. 1B).

As shown in FIG. 11, the computer implemented data driven classification and data quality checking method 270 further proceeds to step 294 of determining: is the prediction quality rating metric 38b (see FIG. 1B) greater than or equal to a prediction quality rating metric threshold 39b (see FIG. 1B) and is correctness 93 (see FIG. 1B) of the model predicted classification 92a (see FIG. 1B) established? As shown in FIG. 11, if the determination by the computer implemented data driven classification and data quality checking system 10 is "YES", that is, the prediction quality rating metric 38b (see FIG. 1B) is greater than or equal to a prediction quality rating metric threshold 39b (see FIG. 1B), and the correctness 93 (see FIG. 1B) of the model predicted classification 92a (see FIG. 1B) is established, then the computer implemented data driven classification and data quality checking method 270 proceeds to step 296 of accepting and applying the model predicted classification 92a (see FIG. 1B). Thus, if the prediction quality rating metric 38b (see FIG. 1B) is greater than or equal to the prediction quality rating metric threshold 39b (see FIG. 1B), and if the correctness 93 (see FIG. 1B) of the model predicted classification 92a (see FIG. 1B) is established, then the machine learning data quality checker 54 (see FIG. 1B), enabled by the predictive model 34b (see FIG. 1B), is configured to accept and apply the model predicted classification 92a (see FIG. 1B).

As shown in FIG. 11, if the determination by the computer implemented data driven classification and data quality checking system 10 is "NO", that is, the prediction quality rating metric 38b (see FIG. 1B) is not greater than or equal to a prediction quality rating metric threshold 39b (see FIG. 1B), or the correctness 93 (see FIG. 1B) of the model predicted classification 92a (see FIG. 1B) is not established, then the computer implemented data driven classification and data quality checking method 270 proceeds to step 298 of generating and communicating with the machine learning data quality checker 54 (see FIG. 1A), via the interface application 22 (see FIG. 1A), an alert 58b (see FIG. 1B) of a classification potential error 56b (see FIG. 1B) in the classification 92, and rejecting the model predicted classification 92a (see FIG. 1B). Thus, if the prediction quality rating metric 38b (see FIG. 1B) is less than the prediction quality rating metric threshold 39b (see FIG. 1B), or if the correctness 93 (see FIG. 1B) of the model predicted classification 92a (see FIG. 1B) is not established, then the machine learning data quality checker 54 (see FIG. 1B), enabled by the predictive model 34b (see FIG. 1B), via the interface application 22 (see FIG. 1B), generates and communicates an indication 57 (see FIG. 1B), such as the alert 58b (see FIG. 1B), of the classification potential error 56b (see FIG. 1B) in the classification 92 (see FIG. 1B) of the instance 98 (see FIG. 1B), and the model predicted classification 92a (see FIG. 1B) is rejected.

Figure 12:
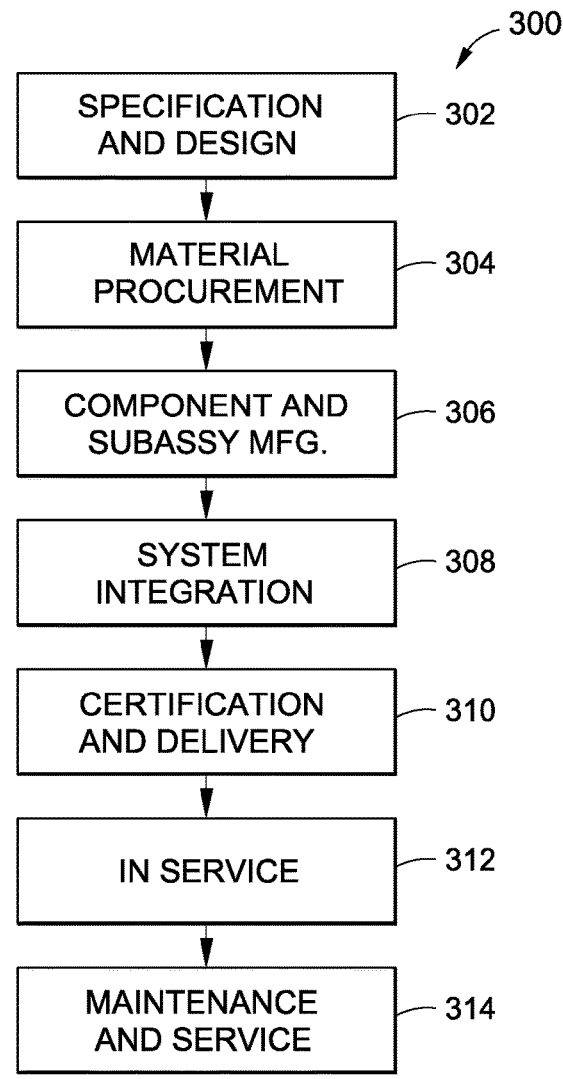
FIG. 12 is an illustration of a flow diagram of an aircraft manufacturing and service method; and, FIG. 13 is an illustration of a block diagram of an aircraft.
Figure 13:
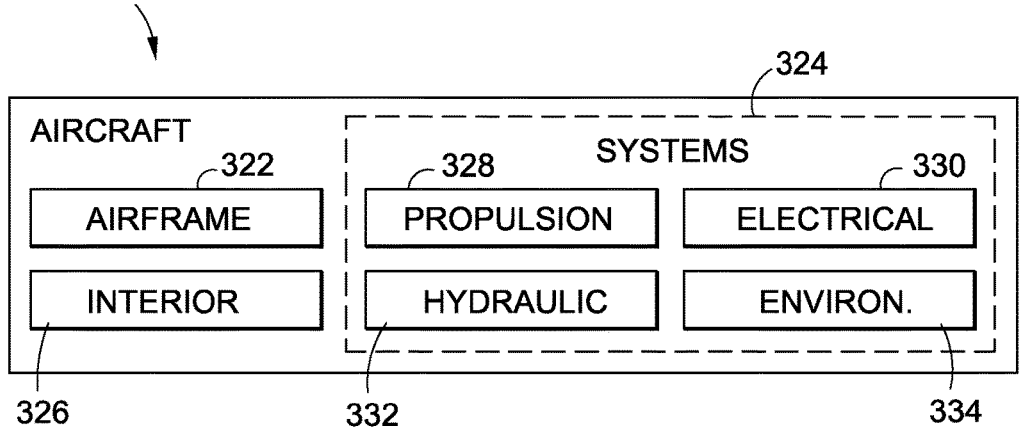

FIG. 12 is an illustration of a flow diagram of an aircraft manufacturing and service method 300. FIG. 13 is an illustration of a block diagram of an aircraft 320. Referring to FIGS. 12-13, embodiments of the disclosure may be described in the context of the aircraft manufacturing and service method 300, as shown in FIG. 12, and the aircraft 320, as shown in FIG. 13.

During pre-production, exemplary aircraft manufacturing and service method 300 may include specification and design 302 of the aircraft 320 and material procurement 304. During manufacturing, component and subassembly manufacturing 306 and system integration 308 of the aircraft 320 takes place. Thereafter, the aircraft 320 may go through certification and delivery 310 in order to be placed in service 312. While in service 312 by a customer, the aircraft 320 may be scheduled for routine maintenance and service 314 (which may also include modification, reconfiguration, refurbishment, and other suitable services).

Each of the processes of exemplary aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and supplier. An operator may include, without limitation, an airline, leasing company, military entity, service organization, and other suitable operators.

As shown in FIG. 13, the aircraft 320 produced by exemplary aircraft manufacturing and service exemplary method 300 may include an airframe 322 with a plurality of systems 324 and an interior 326. Examples of the plurality of systems 324 (see FIG. 13) may include one or more of a propulsion system 328 (see FIG. 13), an electrical system 330 (see FIG. 13) a hydraulic system 332 (see FIG. 13) and an environmental system 334 (see FIG. 13). Any number of other systems may be included. Although an aerospace example is shown, the principles of the disclosure may be applied to other industries, such as the automotive industry, the trucking industry, the watercraft industry such as for ships and submarines, the warehouse industry, and other suitable industries.

Methods and systems embodied herein may be employed during any one or more of the stages of the exemplary aircraft manufacturing and service method 300. For example, components or subassemblies corresponding to component and subassembly manufacturing 306 may be fabricated or manufactured in a manner similar to components or subassemblies produced while the aircraft 320 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 320. Similarly, one or more of apparatus embodiments, method embodiments, or a combination thereof, may be utilized while the aircraft 320 is in service 312, for example and without limitation, to maintenance and service 314.

Disclosed embodiments of the interactive, computer implemented data driven classification and data quality checking system 10 (see FIGS. 1A-1C) and method 200 (see FIG. 9) for improving accuracy 12 (see FIG. 1A) and quality 14 (see FIG. 1A) of received data 16a (see FIG. 1A), and method 250 (see FIG. 10) of establishing a correctness 93 (see FIG. 1B) of classifications 92 (see FIG. 1B) of a predictive model 34b (see FIG. 1B), and the computer implemented data driven classification and data quality checking method 270 (see FIG. 11), all use an associative memory 28 (see FIGS. 1A-1C) to learn a data driven associative memory model 34a (see FIGS. 1A-1C) to compute one or more quality rating metrics 38 (see FIGS. 1A-1C) and may preferably include a star rating system 44 (see FIGS. 1A-1C, 2). The computer implemented data driven classification and data quality checking system 10 (see FIGS. 1A-1C) and method 200 (see FIG. 9), method 250 (see FIG. 10), and method 270 (see FIG. 11) provide for a machine learning data quality checker 54 (see FIG. 1A) for received data 16a (see FIG. 1A), enabled by a data driven associative memory model 34a (see FIG. 1A) that solves data quality errors 56 (see FIG. 1A) involving users manually labeling or categorizing information 18 (see FIGS. 1A-1C), provides an indication 57 (see FIGS. 1A-1B), such as in the form of alert 58a or alert 58b, that the information 18 (see FIGS. 1A-1C) entered could be erroneous, and provides evidence of the conflicts, and makes suggestions 90 (see FIG. 1A) of a more relevant category 42a (see FIG. 1A). The computer implemented data driven classification and data quality checking system 10 (see FIGS. 1A-1C) and method 200 (see FIG. 9), method 250 (see FIG. 10), and method 270 (see FIG. 11) further provide for a data driven model associative memory model 34a (see FIGS. 1A-1C) learned using the associative memory software 24 (see FIGS. 1A-1C) incorporating the associative memory 28 (see FIGS. 1A-1C) and the machine learning algorithm 30 (see FIGS. 1A-1C), that is able to learn, infer, and derive a plurality of associations 32 (see FIGS. 1A-1C) and rules without stating them explicitly.

In addition, disclosed embodiments of the computer implemented data driven classification and data quality checking system 10 (see FIGS. 1A-1C) and method 250 (see FIG. 10) and method 270 (see FIG. 11) provide for segmenting predictive model decisions 35 (see FIG. 2) of the predictive model 34b (see FIG. 2) into a star rating system 44 (see FIG. 2), which segments predictive model decisions 35 (see FIG. 2) into segmented predictive model decisions 35a (see FIGS. 1C, 2) comprising accepted predictive model decisions 35b (see FIGS. 1C, 2) that meet the accuracy level 112 (see FIG. 2) required and rejected predictive model decisions 35c (see FIGS. 1C, 2) not meeting the accuracy level 112 (see FIG. 2) required. With the segmented predictive model 34c (see FIG. 1C) and the segmented predictive model decisions 35a (see FIGS. 1C, 2), the data driven classification and data quality checking system 10 (see FIG. 1C) allows the process 114 (see FIG. 2) to partially utilize the predictive model 34b (see FIG. 2) or classifier 94 (see FIG. 2), even if the predictive model's 34b (see FIG. 2) or classifier's 94 (see FIG. 2) overall accuracy 198 (see FIG. 2) is underperforming. The star rating system 44 (see FIG. 2) allows information 18 (see FIG. 2) derived from the predictive model 34b (see FIG. 2) to meet the accuracy level 112 (see FIG. 2) requirements by selecting the high performing segments. Thus, the information 18 (see FIG. 2) from the predictive model 34b (see FIG. 2) or classifier 94 (see FIG. 2) is usable and may lead to savings and cost avoidance.

Further, disclosed embodiments of the computer implemented data driven classification and data quality checking system 10 (see FIGS. 1A-1C), method 200 (see FIG. 9), method 250 (see FIG. 10), and method 270 (see FIG. 11) provide a cluster-based batch classification tool 116 (see FIG. 4) and process 116a (see FIG. 4) for grouping similar records 158i (see FIG. 4) together to facilitates batch classifying 119a (see FIG. 4) and batch evaluating 119b (see FIG. 4) of the similar records 158i (see FIG. 4). This may result in improved consistency of the classification or scoring, reduced classification time, improved accuracy of the classified or scored records, and decreased labor hours and support costs achieved through classifying or scoring batches of records instead of single, individual records. Time may be saved with the capability of reviewing multiple records at once, classifying or scoring multiple records simultaneously, and sending the records at once for subsequent review and approval. With improved consistency of the classification or scoring, improved accuracy of the classified or scored records, and decreased labor hours and support costs achieved through classifying or scoring batches of records instead of single, individual records, costly repairs or related maintenance-support actions may be reduced or eliminated.

Moreover, disclosed embodiments of the computer implemented data driven classification and data quality checking system 10 (see FIGS. 1A-1C), method 200 (see FIG. 9), method 250 (see FIG. 10), and method 270 (see FIG. 11) provide a domain vocabulary processing tool 120 (see FIG. 5) and process 120a (see FIG. 6) that parses from free text data 16h (see FIG. 5) and/or source text 121 (see FIG. 5), relevant domain-specific terms 122a (see FIG. 5) and domain-specific phrases 124a (see FIG. 5), and their respective variant terms 122b (see FIG. 5) and variant phrases 124b (see FIG. 5), for use in the associative memory 28 (see FIG. 5), which may improve performance of the system 10 (see FIGS. 1A-1C) with the cleaned data 135 (see FIG. 5). The domain vocabulary processing tool 120 (see FIG. 5) provides an effective approach to developing the canonical designations 126a (see FIG. 5), by extracting relevant domain-specific terms 122a (see FIG. 5) and relevant domain-specific phrases 124a (see FIG. 5) in a manual or automated fashion to enable one or more downstream system(s) 160 (see FIG. 5) that utilize free text data 16h (see FIG. 5) or source text 121 (see FIG. 5) to generate more effective results. With better classified data, downstream systems 160 (see FIG. 5) may provide a better picture of scenarios and problems present in free text data 16h (see FIG. 5) or source text 121 (see FIG. 5). With a better picture of the situations described within the free text data 16h (see FIG. 5) or source text 121 (see FIG. 5), the downstream systems 160 (see FIG. 5) may be better able to provide insight required to generate more complete solutions to problems and avoid future problems through better performance-trend information.

Further, disclosed embodiments of the computer implemented data driven classification and data quality checking system 10 (see FIGS. 1A-1C), method 200 (see FIG. 9), method 250 (see FIG. 10), and method 270 (see FIG. 11) provide a control set 128 (see FIGS. 1A, 7) for the associative memory 28 (see FIG. 1A) that maximizes the diversity and accuracy of the control set 128 (see FIGS. 1A, 7), while minimizing the size of the control set 128 (see FIGS. 1A, 7) and the labor required to develop it. The control set 128 (see FIG. 7) may decrease the labor required for classifying or scoring records by 30% to 50%, as compared to the labor required for classifying or scoring records with known solutions. Specific records may be targeted for inclusion in the control set 128 (see FIG. 1A).

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation. Any claimed embodiment of the disclosure does not necessarily include all of the embodiments of the disclosure.

What is claimed is:
1. A computer implemented data driven classification and data quality checking system comprising:
    a computer system comprising a computer having a processor device, an operating system, and storage devices comprising a computer memory and a persistent storage;

an interface application coupled to the computer system and executed by the processor device of the computer to receive data;

an associative memory software coupled to the computer system and executed by the processor device of the computer, to identify a plurality of associations in the received data, the associative memory software in communication with the interface application;

a data driven associative memory model learned using the associative memory software, the data driven associative memory model executed by the processor device of the computer and stored by the computer in the storage devices, the data driven associative memory model comprising a predictive model;

one or more fields of received data categorized and analyzed by the data driven associative memory model executed by the processor device of the computer;

a data quality rating metric associated with the received data and calculated by the data driven associative memory model executed by the processor device of the computer, by comparing the received data with a pool of neighboring data in the category of field of the received data;

a machine learning data quality checker for the received data, enabled by the data driven associative memory model executed by the processor device of the computer, and coupled to the interface application, and wherein the received data is added to the pool of neighboring data by the machine learning data quality checker, if the data quality rating metric is greater than or equal to a data quality rating metric threshold;

an alert of a potential error in the received data in the category of field of the received data, if the data quality rating metric is less than the data quality rating metric threshold, the alert generated and communicated by the machine learning data quality checker, via the interface application, and executed by the processor device of the computer;

a domain vocabulary processing tool executed by the processor device of the computer and stored by the computer in the storage devices, and in communication with the interface application and coupled to an associative memory of the associative memory software, the domain vocabulary processing tool comprising a text editing program having a text editing storage file, and wherein relevant domain-specific terms and domain-specific phrases, and their respective variant terms and variant phrases, are extracted by the domain vocabulary processing tool, from a remaining free text data or a remaining source text, which have been parsed, and further wherein the domain-specific terms and the domain-specific phrases, and their respective variant terms and variant phrases, are normalized by the domain vocabulary processing tool, into canonical designations and corresponding variants to create a domain vocabulary for input into an associative memory of the associative memory software, the domain vocabulary comprising knowledge domain specific vocabulary and is input into a control set tool; and a control set formed by the control set tool and a control set process executed by the processor device of the computer and stored by the computer in the storage devices, the control set in communication with the interface application and coupled to an associative memory of the associative memory software, wherein the control set utilizes associations within the associative memory to generate a diverse data set, wherein the diverse data set comprises a plurality of predefined data from a plurality of relevant categories generated by the associative memory and a plurality of nonassociated data not associated with the plurality of relevant categories, the diverse data set thereby defining a canonical phrase data set representative of canonical phrases associated with the associative memory, wherein new data sets are classified by the control set, and wherein the control set tool comprising control set process instructions to perform scoring in the associative memory on a plurality of records of the received data, to reduce a total number of the plurality of records required; and wherein the computer implemented data driven classification and data quality checking system provides an improved accuracy of the received data and of classified or scored records, provides an improved quality of the received data, and establishes a correctness of classifications of the predictive model.

2. The system of claim 1 further comprising reference samples of the pool of neighboring data and suggestions of a more relevant category of field of the received data, the reference samples and the suggestions provided by the data driven associative memory model, via the interface application, when the alert of the potential error in the received data in the category of field of the received data is generated and communicated by the machine learning data quality checker, via the interface application, and executed by the processor device of the computer.

3. The system of claim 1 wherein the data is obtained from one or more databases comprising a records database, and a parts management database, including an aircraft parts management database.

4. The system of claim 1 further comprising a star rating system having a star rating of one or more stars, a star rating accuracy level calculated for each star rating, and a star rating threshold, the data driven associative memory model normalizing the data quality rating metric to the star rating system.

5. The system of claim 1 wherein (a) a model predicted classification for a classification of an instance of the received data is predicted by the predictive model, (b) a prediction quality rating metric to include measurements of a strength and an assurance that establish a correctness of the model predicted classification is calculated by the predictive model, and (c) the prediction quality rating metric associated with the model predicted classification is normalized by the predictive model to a star rating system having a star rating of one or more stars.

6. The system of claim 5 wherein an alert of a classification potential error in the classification of the instance is generated and communicated by the machine learning data quality checker, via the interface application, and executed by the processor device of the computer, if the correctness of the model predicted classification is not established.

7. The system of claim 5 wherein if the prediction quality rating metric is greater than or equal to a prediction quality rating metric threshold, then the model predicted classification is accepted and applied, and if the prediction quality rating metric is less than the prediction quality rating metric threshold, then the model predicted classification is rejected.

8. The system of claim 1 wherein the text editing program has a text file and comprises a computer software program.

9. The system of claim 1 wherein the control set is formed from a sampling selection of the plurality of records, and examples and evidence of the sampling selection is provided by the control set.

10. The system of claim 1 further comprising a cluster-based batch classification tool in communication with the interface application and coupled to an associative memory of the associative memory software, wherein a set of matching records that are similarly grouped in a plurality of clusters are received by the cluster-based batch classification tool, and further wherein batch classifying and batch evaluating of the set of matching records in the plurality of clusters simultaneously is enabled by the cluster-based batch classification tool, providing a consistent classification for the set of matching records.

11. The system of claim 10 wherein any records needing further search refinement are refined by the cluster-based batch classification tool, and similar records sorted in descending order of similarity are returned by the cluster-based batch classification tool, allowing for additional batch classifying and batch evaluating.

12. The system of claim 1 wherein the data comprises at least one of raw data, structured data, semi-structured data, unstructured data, and free text data, and further wherein the semi-structured data comprises data that uses tags or markers to identify elements within the data.

13. The system of claim 1 wherein the associative memory software comprises an associative memory and a machine learning algorithm enabled to identify a plurality of associations across the received data.

14. A computer implemented data driven classification and data quality checking system comprising:
 a computer system comprising a computer having a processor device, an operating system, and storage devices comprising a computer memory and a persistent storage;
 an interface application coupled to the computer system and executed by the processor device of the computer to receive data;
 an associative memory software coupled to the computer system and executed by the processor device of the computer, to identify a plurality of associations in the received data, the associative memory software in communication with the interface application, and incorporating an associative memory and a machine learning algorithm;
 a predictive model learned using the associative memory software, the predictive model executed by the processor device of the computer and stored by the computer in the storage devices, and a model predicted classification for a classification of an instance of received data predicted by the predictive model and configured to make predictive model decisions made by the predictive model;
 a prediction quality rating metric calculated by the predictive model executed by the processor device of the computer, to include measurements of a strength and an assurance that establish a correctness of the model predicted classification;
 wherein if the prediction quality rating metric is greater than or equal to a prediction quality rating metric threshold, then the model predicted classification is accepted and applied, and if the prediction quality rating metric is less than the prediction quality rating metric threshold, then the model predicted classification is rejected;
 a domain vocabulary processing tool executed by the processor device of the computer and stored by the computer in the storage devices, and in communication with the interface application and coupled to an associative memory of the associative memory software, the domain vocabulary processing tool comprising a text editing program having a text editing storage file, and wherein relevant domain-specific terms and domain-specific phrases, and their respective variant terms and variant phrases, are extracted by the domain vocabulary processing tool, from a remaining free text data or a remaining source text, which have been parsed, and further wherein the domain-specific terms and the domain-specific phrases, and their respective variant terms and variant phrases, are normalized by the domain vocabulary processing tool, into canonical designations and corresponding variants to create a domain vocabulary for input into an associative memory of the associative memory software, the domain vocabulary comprising knowledge domain specific vocabulary and is input into a control set tool; and
 a control set formed by the control set tool and a control set process executed by the processor device of the computer and stored by the computer in the storage devices, the control set in communication with the interface application and coupled to an associative memory of the associative memory software,
 wherein the control set utilizes associations within the associative memory to generate a diverse data set, wherein the diverse data set comprises a plurality of predefined data from a plurality of relevant categories generated by the associative memory and a plurality of nonassociated data not associated with the plurality of relevant categories, the diverse data set thereby defining a canonical phrase data set representative of canonical phrases associated with the associative memory,
 wherein new data sets are classified by the control set,
 and wherein the control set tool comprising control set process instructions to perform scoring in the associative memory on a plurality of records of the received data, to reduce a total number of the plurality of records required; and
 wherein the computer implemented data driven classification and data quality checking system provides an improved accuracy of the received data and of classified or scored records, provides an improved quality of the received data, and establishes a correctness of classifications of the predictive model.

15. The system of claim 14 further comprising a star rating system having a star rating of one or more stars, a star rating accuracy level calculated for each star rating, and a star rating threshold, the predictive model normalizing the prediction quality rating metric to the star rating system.

16. The system of claim 15 wherein if the star rating is greater than or equal to the star rating threshold, then information derived from the predictive model is accepted, and if the star rating is less than the star rating threshold, then the information derived from the predictive model is rejected.

17. The system of claim 14 wherein the data is obtained from one or more databases comprising a records database, and a parts management database, including an aircraft parts management database.

18. A computer implemented data driven classification and data quality checking system comprising:
 a computer system having one or more computers each computer having a processor device, an operating system, and storage devices comprising a computer memory and a persistent storage;
an interface application coupled to the computer system and executed by the processor device of one of the one or more computers to receive data;
an associative memory software coupled to the computer system and executed by the processor device of the one computer of the one or more computers, to identify patterns of similarities in the received data, the associative memory software in communication with the interface application;
a domain vocabulary processing tool executed by the processor device of the one computer of the one or more computers and stored in the storage devices by the one computer of the one or more computers, the domain vocabulary processing tool in communication with the interface application and coupled to the associative memory of the associative memory software, the domain vocabulary processing tool comprising a text editing program having a text editing storage file, and wherein relevant domain-specific terms and domain-specific phrases, and their respective variant terms and variant phrases, are extracted by the domain vocabulary processing tool, from a remaining free text data or a remaining source text, which have been parsed, and further wherein the domain-specific terms and the domain-specific phrases, and their respective variant terms and variant phrases, are normalized by the domain vocabulary processing tool, into canonical designations and corresponding variants to create a domain vocabulary for input into the associative memory, the domain vocabulary comprising knowledge domain specific vocabulary and is input into a control set tool;
a control set in communication with the interface application and coupled to the associative memory of the associative memory software, the control set formed by the control set tool and a control set process executed by the processor device of the one computer of the one or more computers and stored in the storage devices by the one computer of the one or more computers,
wherein the control set utilizes associations within the associative memory to generate a diverse data set, wherein the diverse data set comprises a plurality of predefined data from a plurality of relevant categories generated by the associative memory and a plurality of nonassociated data not associated with the plurality of relevant categories, the diverse data set thereby defining a canonical phrase data set representative of canonical phrases associated with the associative memory,
wherein new data sets are classified by the control set,
and wherein the control set tool comprising control set process instructions to perform scoring in the associative memory on a plurality of records of the received data, to reduce a total number of the plurality of records required;
a data driven associative memory model learned using the associative memory software, the data driven associative memory model executed by the processor device of the one computer of the one or more computers and stored by the one of the one or more computers in the storage devices, and one or more fields of the received data categorized by the data driven associative memory model executed by the processor device of the one computer of the one or more computers, the data driven associative memory model comprising a predictive model wherein a model predicted classification for a classification of an instance of the received data is predicted by the predictive model;
one or more quality rating metrics including:
a data quality rating metric calculated by the data driven associative memory model executed by the processor device of the one computer of the one or more computers, as a function of comparing the received data with a pool of neighboring data in the category of field of the received data; and
a prediction quality rating metric calculated by the predictive model to include measurements of a strength and an assurance that establish a correctness of the model predicted classification;
a machine learning data quality checker for the received data, enabled by the data driven associative memory model executed by the processor device of the one computer of the one or more computers, and coupled to the interface application, and
the received data accepted and added by the machine learning data quality checker to the pool of neighboring data, if the data quality rating metric is greater than or equal to a data quality rating metric threshold; and
the model predicted classification accepted and applied by the machine learning data quality checker, if the correctness of the model predicted classification is established, and if the prediction quality rating metric is greater than or equal to a prediction quality rating metric threshold,
wherein an alert of a potential error in the received data in the category of field of the received data is generated and communicated by the machine learning data quality checker, via the interface application, and executed by the processor device of the one computer of the one or more computers, if the data quality rating metric is less than the data quality rating metric threshold; and
an alert of a classification potential error in the classification of the instance of the received data is generated and communicated by the machine learning data quality checker, via the interface application, and executed by the processor device of the one computer of the one or more computers, if the correctness of the model predicted classification is not established, or if the prediction quality rating metric is less than the prediction quality rating metric threshold, and
wherein the computer implemented data driven classification and data quality checking system provides an improved accuracy of the received data and of classified or scored records, provides an improved quality of the received data, and establishes a correctness of classifications of the predictive model.

19. The system of claim 18 further comprising a star rating system comprising star ratings of one or more stars, the data driven associative memory model normalizing the one or more quality rating metrics to the star rating system, the star rating system further comprising a star rating accuracy level calculated for each star rating, and a star rating threshold based on an accuracy level required by a process.

20. The system of claim 18 further comprising a cluster-based batch classification tool in communication with the interface application and coupled to an associative memory of the associative memory software, wherein a set of matching records that are similarly grouped in a plurality of clusters are received by the cluster-based batch classification tool, and further wherein configured to enable batch classifying and batch evaluating of the set of matching records in the plurality of clusters simultaneously is enabled by the cluster-based batch classification tool, providing a consistent classification for the set of matching records.

* * * * *